US008254231B2

(12) United States Patent
Iriyama

(10) Patent No.: US 8,254,231 B2

(45) Date of Patent: Aug. 28, 2012

(54) DRIVING DEVICE AND METHOD, PROGRAM, AND RECORDING MEDIUM

(75) Inventor: Toshihisa Iriyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 24 days.

(21) Appl. No.: 12/906,386

(22) Filed: Oct. 18, 2010

(65) Prior Publication Data

US 2011/0128835 A1 Jun. 2, 2011

(30) Foreign Application Priority Data

Nov. 27, 2009 (JP) ................................. 2009-269405

(51) Int. Cl.
*G11B 7/00* (2006.01)

(52) U.S. Cl. .................................................... 369/53.17

(58) Field of Classification Search ............... 369/53.22, 369/53.1, 53.12, 53.15, 53.17, 44.37, 275.3, 369/53.42, 44.14
See application file for complete search history.

(56) References Cited

U.S. PATENT DOCUMENTS 5,828,632 A * 10/1998 Nagai ........................ 369/47.24
6,141,312 A * 10/2000 Masters et al. .................. 369/97

FOREIGN PATENT DOCUMENTS

JP 6-314473 11/1994
JP 7-56690 3/1995

* cited by examiner

*Primary Examiner* — Nabil Hindi

(74) *Attorney, Agent, or Firm* — Oblon, Spivak, McClelland, Maier & Neustadt, L.L.P.

(57) ABSTRACT

A driving device includes: n pickups; n first control means for respectively controlling the pickups; and a second control means for controlling the n first control means so as to divide data into n pieces of data and to write divided data on a predetermined disc through the n pickups, wherein, when a notification that defect is detected is received from at least one first control means from among the n first control means while data is being written on the disc, the second control means determines a replacement destination, notifies information regarding the replacement destination to the n first control means, and determines the replacement destination in a region where data is continuously read at the time of reproducing of the disc.

9 Claims, 29 Drawing Sheets

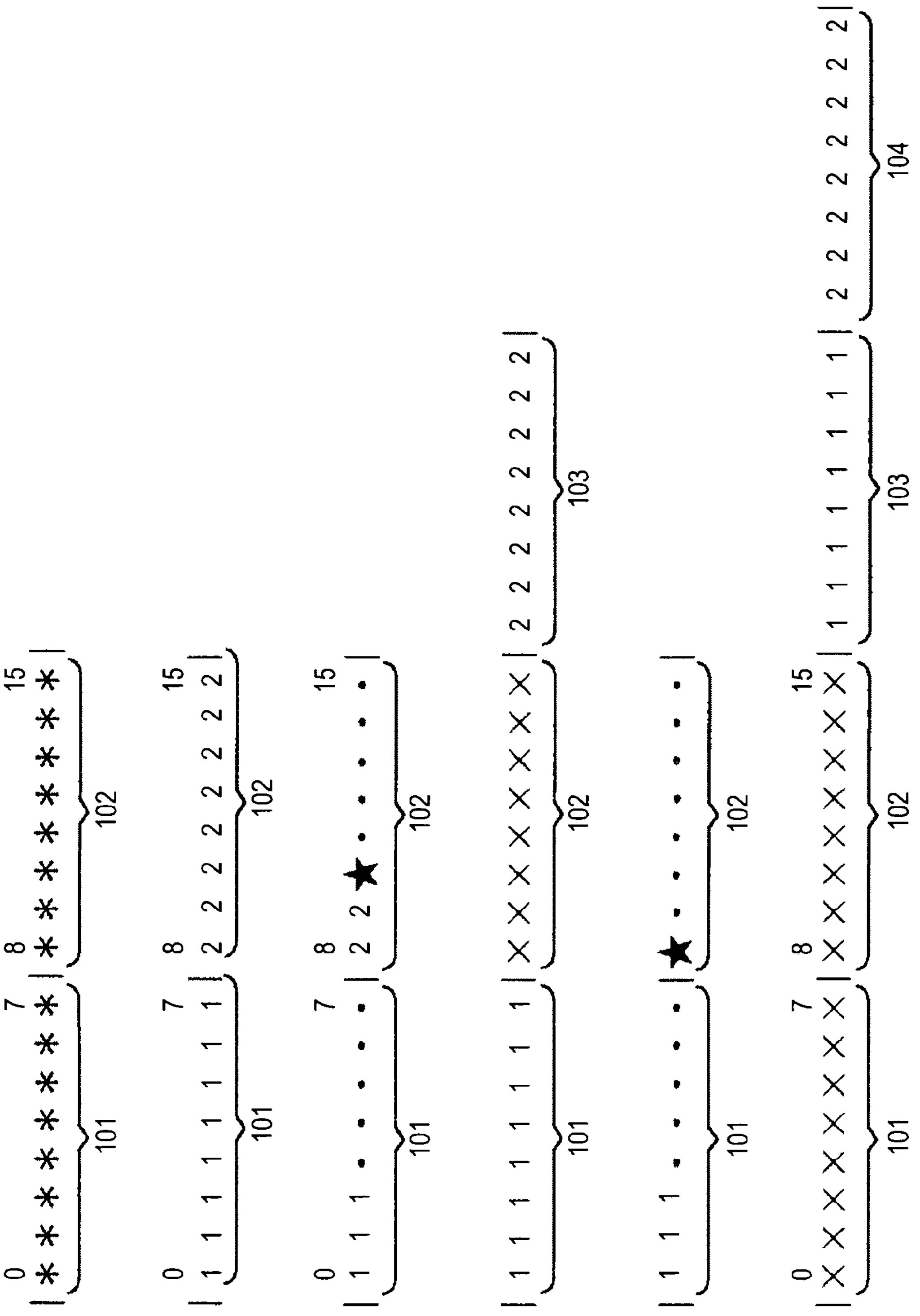

| 0 | | | | | | | 7 | 8 | | | | | | | 15 |
|---|---|---|---|---|---|---|---|---|---|---|---|---|---|---|---|
| * | * | * | * | * | * | * | * | * | * | * | * | * | * | * | * |

$\underbrace{\phantom{* * * * * * * *}}_{101}$ $\underbrace{\phantom{* * * * * * * *}}_{102}$

| 0 | | | | | | | 7 | 8 | | | | | | | 15 |
|---|---|---|---|---|---|---|---|---|---|---|---|---|---|---|---|
| 1 | 1 | 1 | 1 | 1 | 1 | 1 | 1 | 2 | 2 | 2 | 2 | 2 | 2 | 2 | 2 |

$\underbrace{\phantom{1 1 1 1 1 1 1 1}}_{101}$ $\underbrace{\phantom{2 2 2 2 2 2 2 2}}_{102}$

| 0 | | | | | | | 7 | 8 | | | | | | | 15 |
|---|---|---|---|---|---|---|---|---|---|---|---|---|---|---|---|
| 1 | 1 | 1 | · | · | · | · | · | 2 | 2 | ★ | · | · | · | · | · |

$\underbrace{\phantom{1 1 1 . . . . .}}_{101}$ $\underbrace{\phantom{2 2 * . . . . .}}_{102}$

| 1 | 1 | 1 | 1 | 1 | 1 | 1 | 1 | × | × | × | × | × | × | × | × | 2 | 2 | 2 | 2 | 2 |
|---|---|---|---|---|---|---|---|---|---|---|---|---|---|---|---|---|---|---|---|---|

$\underbrace{\phantom{1 1 1 1 1 1 1 1}}_{101}$ $\underbrace{\phantom{x x x x x x x x}}_{102}$ $\underbrace{\phantom{2 2 2 2 2}}_{103}$

| 1 | 1 | 1 | · | · | · | · | · | ★ | · | · | · | · | · | · | · |
|---|---|---|---|---|---|---|---|---|---|---|---|---|---|---|---|

$\underbrace{\phantom{1 1 1 . . . . .}}_{101}$ $\underbrace{\phantom{* . . . . . . .}}_{102}$

| 0 | | | | | | | 7 | 8 | | | | | | | 15 | | | | | | | | | | | |
|---|---|---|---|---|---|---|---|---|---|---|---|---|---|---|---|---|---|---|---|---|---|---|---|---|---|---|
| × | × | × | × | × | × | × | × | × | × | × | × | × | × | × | × | 1 | 1 | 1 | 1 | 1 | 1 | 1 | 2 | 2 | 2 | 2 | 2 | 2 | 2 |

$\underbrace{\phantom{x x x x x x x x}}_{101}$ $\underbrace{\phantom{x x x x x x x x}}_{102}$ $\underbrace{\phantom{1 1 1 1 1 1 1}}_{103}$ $\underbrace{\phantom{2 2 2 2 2 2 2}}_{104}$ 0 4 8 12
251 252 253 254

0 4 8 12
1 1 1 1 2 2 2 2 3 3 3 3 4 4 4 4
251 252 253 254

0 4 8 12
1 1 2 2 3 3 4 4
251 252 253 254

1 1 1 1 2 2 2 2 3 3 3 3 4 4 4 4
251 252 253 254 255

1 1 1 1 2 2 2 2 3 3 3 3 4 4 4 4
251 252 253 254 255 256 257 258

251
252
253
254
255
256
257
258

DRIVING DEVICE AND METHOD, PROGRAM, AND RECORDING MEDIUM

BACKGROUND OF THE INVENTION

1. Field of the Invention

The present invention relates to a driving device and method, a program, and a recording medium. In particular, the present invention relates to a driving device and method which improves speed of recording onto or reproducing from a predetermined disc, a program, and a recording medium.

2. Description of the Related Art

In recent years, recording and reproducing of high-quality video data are becoming widespread. Such high-quality video data tends to have a large volume. Accordingly, the amount of data to be written on a predetermined disc at the time of recording increases, thus it is necessary to write data on a disc at a high speed. It has been therefore proposed to increase the number of rotations of a spindle so as to increase a recording speed.

However, if the number of rotations of the spindle is increased, sound of the rotation may increase, and the sound may be recorded. For this reason, it has been a preferable solution to improve the recording speed by increasing the number of rotations of the spindle in a recording apparatus. When the recording speed is improved by increasing the number of rotations of the spindle, there have been a restriction on a recording rate depending on the characteristics of a disc medium, a restriction on the processing ability of a signal processing LSI, and a physical restriction on the rotation of the disc at a high speed.

Thus, it is thought that optical systems having the same specification are provided for two channels, and recording processing is performed using the two channels simultaneously. In an apparatus having two channels, it is thought that the two channels are provided at opposite positions to each other, and each of the channels is provided with a slider. With this configuration, it becomes possible to slider-control the individual channels independently, and to perform a recording operation on a predetermined disc simultaneously. Therefore, it becomes possible to improve the recording speed (for example, see JP-A-06-314473 and JP-A-07-056690).

SUMMARY OF THE INVENTION

If the recording speed is improved, for example, it becomes possible to record large-volume video data with high image quality. Meanwhile, at the time of reproducing, it is necessary to read large-volume video data. For this reason, data is preferably continuous. However, when continuous data is divided and recorded through a plurality of channels, if defect occur in one or multiple channels, data may not be recorded continuously. When data is not recorded continuously, it may be too late to read data from a recording medium at the time of reproducing. Accordingly, when defect occurs at the time of recording, there is demand for determination of a replacement destination such that data is continuously recorded, and for continuous recording of data.

Thus it is desirable to continuously record data even when defect occur at the time of recording.

According to an embodiment of the invention, there is provided a driving device including n pickups, n first control means for respectively controlling the pickups, and a second control means for controlling the n first control means so as to divide data into n pieces of data and to write divided data on a predetermined disc through the n pickups. When a notification that defect is detected is received from at least one first control means from among the n first control means while data is being written on the disc, the second control means determines a replacement destination, notifies information regarding the replacement destination to the n first control means, and determines the replacement destination in a region where data is continuously read at the time of reproducing of the disc.

The replacement destination may be determined in accordance with a pickup where the defect has been detected.

The replacement destination may be determined in accordance with whether the disc is a rewritable recording medium or not.

The replacement destination may be determined in accordance with whether a place where the defect occurs is a place at the head of a region where divided data is written.

The replacement destination may be determined in accordance with the number of pickups where the defect has been detected.

According to another embodiment of the invention, there is provided a method of driving a driving device. The driving device includes n pickups, n first control means for respectively controlling the pickups, and a second control means for controlling the n first control means so as to divide data into n pieces of data and to write divided data on a predetermined disc through the n pickups. The method includes a step of, when a notification that defect is detected is received from at least one first control means from among the n first control means while data is being written on the disc, causing the second control means to determine a replacement destination, to notify information regarding the replacement destination to the n first control means, and to determine the replacement destination in a region where data is continuously read at the time of reproducing of the disc.

According to still another embodiment of the invention, there is provided a computer-readable program which causes a driving device to execute processing. The driving device includes n pickups, n first control means for respectively controlling the pickups, and a second control means for controlling the n first control means so as to divide data into n pieces of data and to write divided data on a predetermined disc through the n pickups. The processing includes a step of, when a notification that defect is detected is received from at least one first control means from among the n first control means while data is being written on the disc, causing the second control means to determine a replacement destination, to notify information regarding the replacement destination to the n first control means, and to determine the replacement destination in a region where data is continuously read at the time of reproducing of the disc.

According to yet another embodiment of the invention, there is provided a recording medium recorded thereon a computer-readable program causing a driving device to execute processing. The driving device includes n pickups, n first control means for respectively controlling the pickups, and a second control means for controlling the n first control means so as to divide data into n pieces of data and to write divided data on a predetermined disc through the n pickups. The processing includes a step of, when a notification that defect is detected is received from at least one first control means from among the n first control means while data is being written on the disc, causing the second control means to determine a replacement destination, to notify information regarding the replacement destination to the n first control means, and to determine the replacement destination in a region where data is continuously read at the time of reproducing of the disc.

In the driving device and method, the program, and the recording medium according to the embodiments of the invention, n pickups are respectively controlled, and data is divided into n pieces of data and written on a predetermined disc through the n pickups. If defect is detected while data is being written on the disc, a replacement destination is determined, and information regarding the replacement destination is notified to control means for respectively controlling the n pickups. The replacement destination is determined in a region where data is read continuously at the time of reproducing of the disc.

According to the embodiments of the invention, it becomes possible to determine a replacement destination such that data is recorded continuously even when defect occurs at the time of recording.

BRIEF DESCRIPTION OF THE DRAWINGS

FIGS. 7A to 7F are diagrams illustrating a way to determine a replacement destination.

DESCRIPTION OF PREFERRED EMBODIMENTS

Hereinafter, embodiments of the invention will be described with reference to the drawings.

[First Embodiment]

Figure 1:
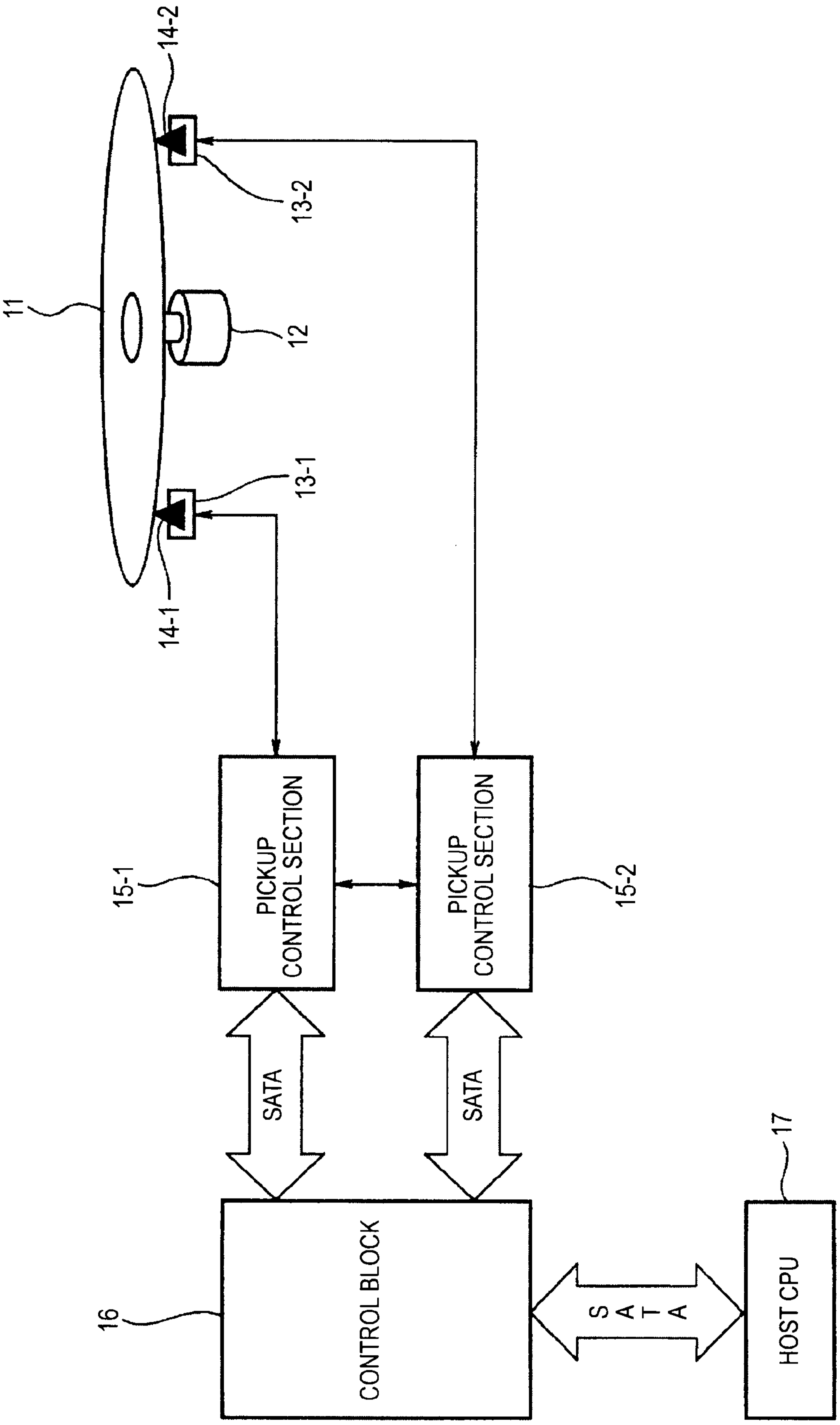
FIG. 1 is a diagram showing the configuration of an embodiment of a driving device to which the invention is applied.

FIG. 1 is a diagram showing the configuration of an embodiment of a driving device to which the invention is applied. The embodiment of the invention is directed to an apparatus which drives a predetermined disc to record data onto the disc or to reproduce recorded data from the disc.

A driving device shown in FIG. 1 drives a disc 11 serving as a predetermined disc. The disc 11 is, for example, a DVD (Digital Versatile Disc) or a BD (Blu-ray Disc). The driving device includes a spindle motor 12, an optical head 13-1, an optical head 13-2, an optical pickup 14-1, an optical pickup 14-2, a pickup control section 15-1, a pickup control section 15-2, a control block 16, and a host CPU (Central Processing Unit) 17.

The spindle motor 12, the optical head 13-1, the optical head 13-2, the optical pickup 14-1, the optical pickup 14-2, the pickup control section 15-1, the pickup control section 15-2, and the control block 16 constitute a drive system. Hereinafter, when no distinction has to be made between the optical head 13-1 and the optical head 13-2, the optical head 13-1 and the optical head 13-2 are simply referred to as optical heads 13. The same is applied to other portions.

The driving device shown in FIG. 1 includes the two optical heads 13-1 and 13-2. The optical pickup 14-1 is provided in one optical head 13-1, and the optical pickup 14-2 is provided in the optical head 13-2. The optical head 13-1 (optical pickup 14-1) is controlled by the pickup control section 15-1, and the optical head 13-2 (optical pickup 14-2) is controlled by the pickup control section 15-2.

However, the optical head 13-1 (optical pickup 14-1) and the optical head 13-2 (optical pickup 14-2) have to operate in cooperation when data is written simultaneously, and a signal which enables the optical head 13-1 (optical pickup 14-1) and the optical head 13-2 (optical pickup 14-2) to operate in cooperation is sent from the control block 16. The pickup control section 15-1 and the pickup control section 15-2 are configured to perform SATA (Serial Advanced Technology Attachment) communication with the control block 16. The control block 16 itself is configured to perform SATA communication so as to receive an instruction from the host CPU 17.

As described below with reference to FIG. 3, control of the spindle motor 12 has to be performed by only one of the pickup control section 15-1 and the pickup control section 15-2. Hence, only one of the pickup control section 15-1 and the pickup control section 15-2 is configured to perform control of the spindle motor 12.

Figure 2:
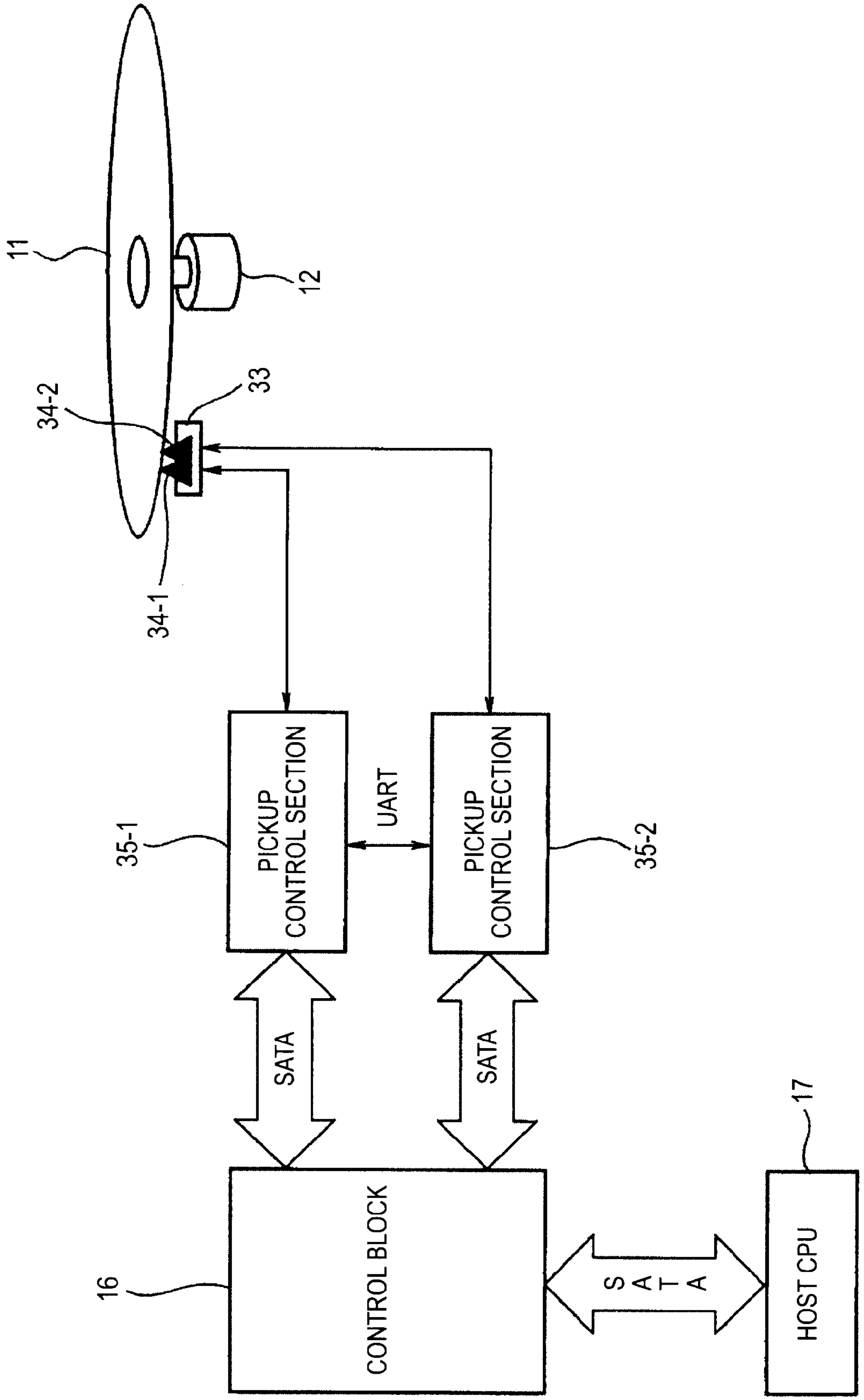
FIG. 2 is a diagram showing another configuration of a driving device to which the invention is applied.

FIG. 2 is a diagram showing another configuration of an embodiment of a driving device to which the invention is applied. The driving device shown in FIG. 2 drives a disc 11 serving as a predetermined disc. The driving device shown in FIG. 2 includes a spindle motor 12, an optical head 33, an optical pickup 34-1, an optical pickup 34-2, a pickup control section 35-1, a pickup control section 35-2, a control block 16, and a host CPU 17.

In the driving device shown in FIG. 2, one optical head 33 is provided with two optical pickups 34-1 and 34-2. The optical pickup 34-1 is controlled by the pickup control section 35-1, and the optical pickup 34-2 is controlled by the pickup control section 35-2. In such a configuration, the optical head 33 is controlled by either the pickup control section 35-1 or the pickup control section 35-2. Similarly to the driving device shown in FIG. 1, control of the spindle motor 12 or the like is performed by only one of the pickup control section 35-1 and the pickup control section 35-2.

The driving device shown in FIG. 2 is configured such that a signal is transferred between the pickup control section 35-1 and the pickup control section 35-2 so as to enable the pickup control section 35-1 and the pickup control section 35-2 to operate in cooperation. The pickup control section 35-1 and the pickup control section 35-2 are configured to perform communication with the control block 16. The control block 16 and the host CPU 17 are configured such that communication is performed.

Figure 3:
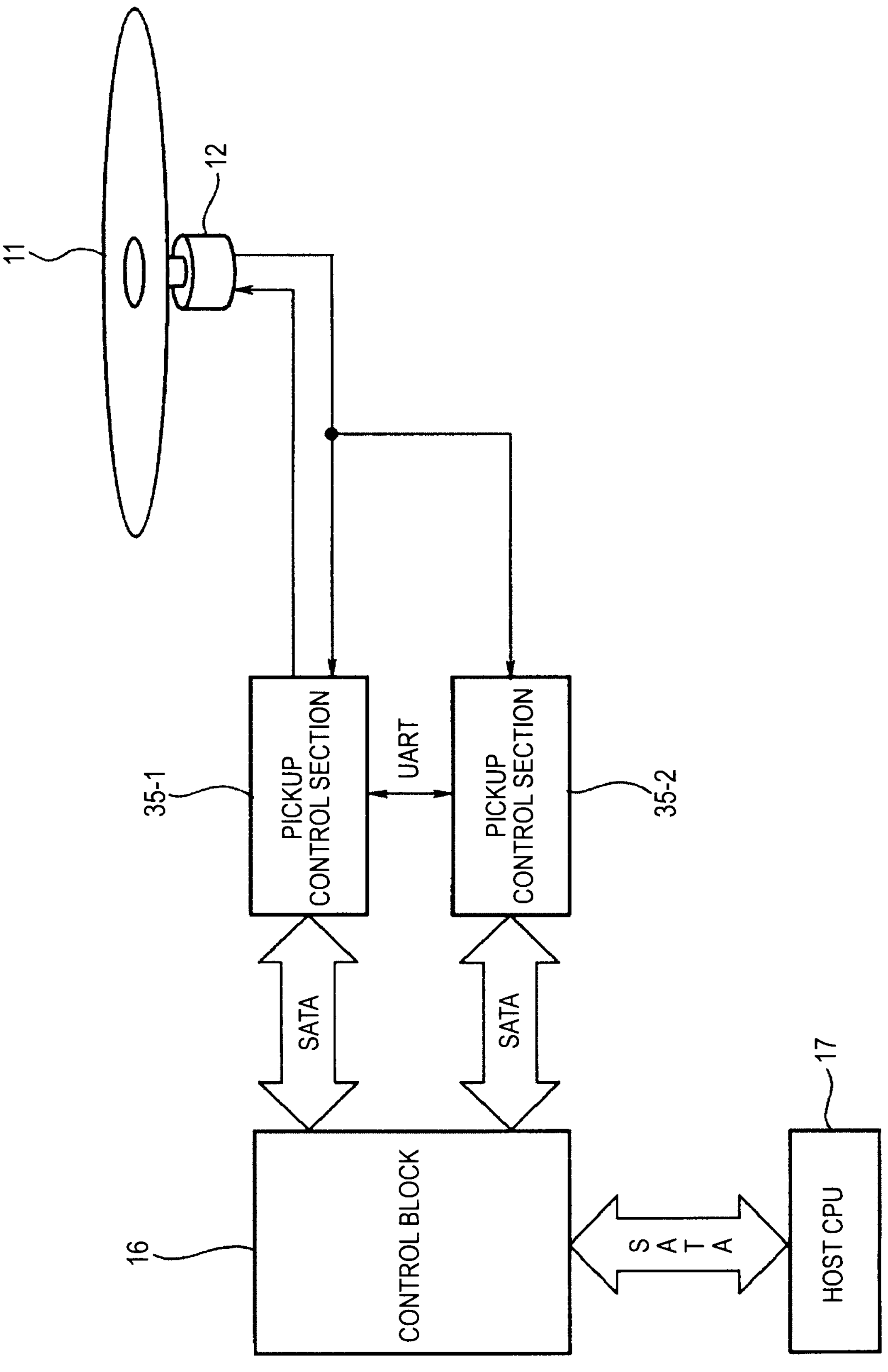
FIG. 3 is a diagram illustrating control of a spindle motor.

FIG. 3 is a diagram illustrating control of the spindle motor 12 in the driving device shown in FIG. 1 or 2 (in FIG. 3, description will be provided of the driving device shown in FIG. 2). The rotation of the disc 11 is controlled by the spindle motor 12, and a signal for controlling the spindle motor 12 is supplied from the pickup control section 35-1. The spindle motor 12 is configured to supply an FG (Frequency Generator) signal representing a rotation speed to the pickup control section 35-1 and the pickup control section 35-2.

The pickup control section 35-1 and the pickup control section 35-2 have to have the FG signal so as to control the optical pickup 34, thus the FG signal is supplied to the pickup control section 35-1 and the pickup control section 35-2. When a setting is made such that the pickup control section 35-1 controls the spindle motor 12, the pickup control section 35-1 is configured to create a signal for controlling the spindle motor 12 and to supply the signal to the spindle motor 12.

Figure 4:
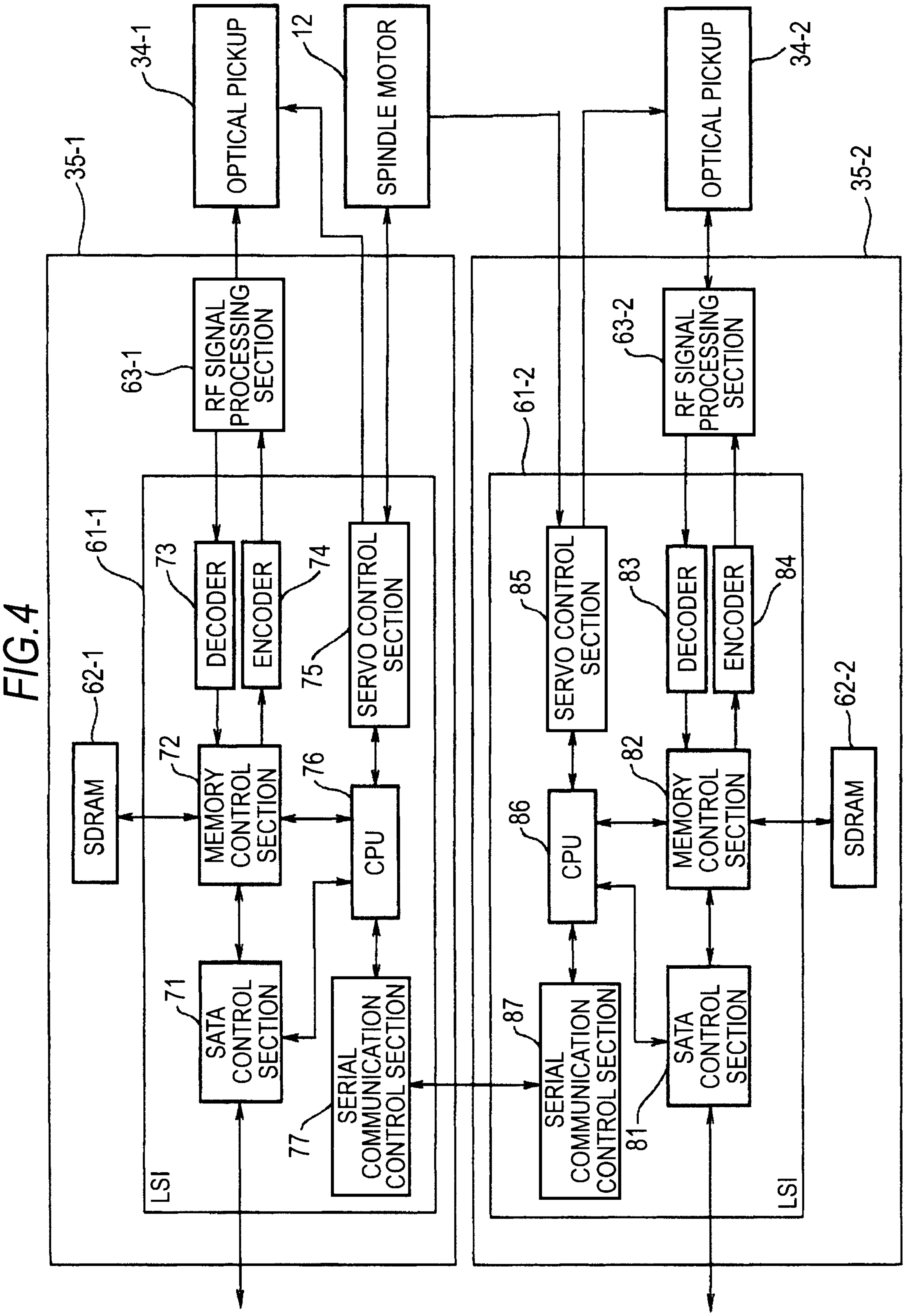
FIG. 4 is a diagram showing an example of the internal configuration of the driving device.

FIG. 4 is a diagram showing an example of the internal configuration of the driving device shown in FIG. 2. Although the driving device shown in FIG. 2 is described as an example, like the driving device shown in FIG. 1, a driving device which has two optical heads 13 respectively provided with the optical pickups 34 has the same internal configuration.

The pickup control section 35-1 includes an LSI (Large Scale Integrated) 61-1, a SDRAM (Synchronous Dynamic Random Access Memory) 62-1, and an RF (Radio Frequency) signal processing section 63-1. The LSI 61-1 includes a SATA (Serial Advanced Technology Attachment) control section 71, a memory control section 72, a decoder 73, an encoder 74, a servo control section 75, a CPU 76, and a serial communication control section 77.

Similarly, the pickup control section 35-2 includes an LSI 61-2, a SDRAM 62-2, and an RF signal processing section 63-2. The LSI 61-2 includes a SATA control section 81, a memory control section 82, a decoder 83, an encoder 84, a servo control section 85, a CPU 86, and a serial communication control section 87.

The pickup control section 35-1 controls the optical pickup 34-1 to supply data to the optical pickup 34-1 or to receive data from the optical pickup 34-1. At the time of a reproducing operation, data from the optical pickup 34-1 is supplied to the decoder 73 of the LSI 61-1 through the RF signal processing section 63-1. The decoder 73 decodes a supplied signal through a predetermined decoding scheme and supplies data to the memory control section 72.

The memory control section 72 stores data supplied to the SDRAM 62-1 or read data stored in the SDRAM 62-1 under the control of the CPU 76. The SDRAM 62-1 is used as a buffer.

When a recording operation is performed, data is read from the SDRAM 62-1 and data is supplied to the encoder 74 under the control of the memory control section 72. The encoder 74 encodes supplied data through a predetermined encoding scheme and supplies data to the optical pickup 34-1 through the RF signal processing section 63-1.

The SATA control section 71 performs control at the time of communication with the control block 16 (FIG. 2). The serial communication control section 77 controls communication with the pickup control section 35-2. That is, as described above, since the optical pickup 34-1 and the optical pickup 34-2 operate in cooperation, the pickup control section 35-1 and the pickup control section 35-2 have to share information, thus the serial communication control section 77 controls communication therefor.

The servo control section 75 performs servo-related control, such as focus or tracking of the optical pickup 34-1 (optical head 33). The servo control section 75 also controls the rotation of the spindle motor 12.

Similarly to the pickup control section 35-1, the pickup control section 35-2 controls the optical pickup 34-2 to control recording or reproducing. However, unlike the servo control section 75 of the pickup control section 35-1, the servo control section 85 of the pickup control section 35-2 is configured to receive the FG signal from the spindle motor 12 while not to send a control signal to the spindle motor 12.

As described above, the pickup control section 35-1 and the pickup control section 35-2 which respectively control the two optical pickups 34 have the same configuration and perform the same processing, but a configuration is made such that the pickup control section 35-1 controls the spindle motor 12. With such a configuration, the same LSI can be used and cost can be reduced. In addition, the serial communication control section 77 (87) for sharing information is provided, enabling a cooperative operation.

For such an LSI, for example, an LSI which is used in a drive of a personal computer or the like may be used. Such an LSI is comparatively cheap, reducing the total cost of the driving device.

[Processing Regarding Read of Defect Information]

Next, the operation of the driving device will be described in connection with a specific example. First, operation when the disc 11 is inserted into the drive (not shown) will be described with reference to a flowchart of FIG. 5. When the disc 11 is inserted into the drive, information regarding the disc 11 is read from the disc 11, while read information has to be managed by the control block 16 which controls the pickup control section 35-1 and the pickup control section 35-2.

While both the pickup control section 35-1 and the pickup control section 35-2 do not have to read information regarding the disc 11, it should suffice that one control section reads information and notifies information to the control block 16. Here, description will be continued assuming that the pickup control section 35-1 reads information. The pickup control section 35-1 includes SATA for communication with the control block 16. The pickup control section 35-2 also includes SATA for communication with the control block 16.

As described below, the pickup control section 35-1 and the pickup control section 35-2 include a communication line for notifying occurrence of defect or the like to another pickup control section 35. Such communication is performed through UART (Universal Asynchronous Receiver Transmitter) communication. In order to perform such communication, the pickup control section 35-1 and the pickup control section 35-2 are configured to include two communication lines (two serial interfaces).

Information which is read when the disc 11 is inserted is information regarding defect. Further, as described below, when data is written onto the disc 11, if defect occurs, information regarding defect is written onto the disc 11. Such information is managed by the control block 16.

In Step S21, the pickup control section 35-1 reads medium information. The read medium information includes defect information (defect). The defect information is read from the disc 11. Defect is a deficit of signal due to the disc 11 being hurt or contaminated. The disc 11 has a DMS (Defect Management Structure) recorded as defect information at four places. The DMS is constituted by a DDS (Disc Definition Structure) representing defect structure information of the disc 11 and a DFL (Defect List) as a defect list.

In Step S21, the pickup control section 35-1 controls the optical pickup 34-1 to read medium information (defect information (DMS)). At this time, when the DMS is recorded at four places of the disc 11, the DMS is read at the four places. While the pickup control section 35-1 reads the medium information, the control block 16 requests the pickup control section 35-1 for the medium information.

In Step S23, the pickup control section 35-1 which has received such a request from the control block 16 in Step S22 notifies the position of the DFL to the control block 16. The pickup control section 35-1 notifies the location of the DFL at one place adapted from the information of the DDS from among the read DMS at the four places to the control block 16.

In Step S42, the control block 16 receives the notification from the pickup control section 35-1. When receiving the notification, in Step S43, the control block 16 request the pickup control section 35-1 for the defect information. When receiving such a request in Step S24, in Step S25, the pickup control section 35-1 reads the defect information. At this time, the pickup control section 35-1 reads the defect information only from the location of the DFL at one place adapted by the pickup control section 35-1.

In Step S26, the pickup control section 35-1 which has read the defect information notifies the read defect information to the control block 16. In Step S44, the control block 16 receives the notification.

In this way, the defect information read by the pickup control section 35-1 can be managed by the control block 16. The control block 16 controls not only the pickup control section 35-1 but also the pickup control section 35-2. Thus, if the control block 16 manages the defect information, the pickup control section 35-1 and the pickup control section 35-2 can share the same defect information.

When receiving the defect information, the control block 16 recognizes that it is ready to access the disc 11, and then sends a command of a medium access system. Here, it is assumed that a command is sent which instructs to write data onto the disc 11.

If a command is sent from the control block 16, the pickup control section 35-1 and the control block 16 respectively control the optical pickup 34-1 and the optical pickup 34-2 to execute data write onto the disc 11. When data write is executed, if defect occurs due to any reason, information regarding defect is written onto the disc 11. Such information, that is, defect information is managed by the control block 16. An instruction which enables write away from a portion where defect occurs (an instruction regarding determination of a replacement destination described below) is sent from the control block 16.

[Processing when Defect Occurs During Recording]

Next, processing when defect occurs during write will be described with reference to a flowchart of FIG. 6.

If the above-described processing is performed and data can be written onto the disc 11, the indication that such a state is reached is notified from the control block 16 to the host CPU 17. Thereafter, the control block 16 is put in a state where it waits for an instruction from the host CPU 17. The pickup control section 35-1 and the pickup control section 35-2 are put in a state where it waits for an instruction from the control block 16.

In Step S61, if the control block 16 receives a write command from the host CPU 17, in Step S62, the write command is issued for each channel. If the write command is issued for each channel, in Step S81, the pickup control section 35-1 receives the write command, and in Step S101, the pickup control section 35-2 receives the write command.

If the write command is received, the pickup control section 35-1 and the pickup control section 35-2 respectively control the optical pickup 34-1 and the optical pickup 34-2 to perform data write onto the disc 11 on the basis of an instruction from the control block 16. Such write is repeatedly performed while a write request is sent from the host CPU 17. However, it is assumed that defect occurs while write is continued.

In Step S82, if the pickup control section 35-1 detects occurrence of defect, in Step S83, a request to stop a write operation is sent to the pickup control section 35-2. The pickup control section 35-1 stops the own write operation. The pickup control section 35-1 sends a stop request to the pickup control section 35-2, and performs an error notification, that is, notifies occurrence of defect to the control block 16.

In Step 5102, when receiving the stop request from the pickup control section 35-1, in Step S103, the pickup control section 35-2 stops the write operation. If the write operation has stopped, the pickup control section 35-2 notifies the stop of the write operation to the control block 16. If the write operation has stopped, the pickup control section 35-2 is put in a state where it waits for an instruction from the control block 16.

The control block 16 receives the error notification from the pickup control section 35-1 in Step S63, and receives the stop notification from the pickup control section 35-2 in Step S64. In Step S65, the control block 16 determines a replacement destination. For example, when the disc 11 is hurt and data is not written in the relevant region, data that will be written in the relevant region is written in another region of the disc instead. For this reason, a region which becomes a replacement destination is determined in Step S65. With regard to a way to determine a replacement destination, as described below, determination is made such that data is arranged so as to be continuously read at the time of reproducing.

In Step S65, if the region of the replacement destination where data is written instead of the region where defect occurs is determined, in Step S66, a write command is issued and output to the pickup control section 35-1 and the pickup control section 35-2. If the write command is issued by the control block 16, in Step S85, the pickup control section 35-1 receives the write command, and in Step S105, the pickup control section 35-2 receives the write command. When receiving the write command, the pickup control section 35-1 and the pickup control section 35-2 respectively control the optical pickup 34-1 and the optical pickup 34-2 to perform data write onto the disc 11 on the basis of an instruction from the control block 16. That is, data write is performed to the region of the replacement destination.

If data write onto the disc 11 ends as instructed, a notification indicating the end of data write is sent. That is, in Step S86, the pickup control section 35-1 sends a notification indicating the end of write to the control block 16, and in Step 5106, the pickup control section 35-2 sends a notification indicating the end of write to the control block 16. The notifications indicating the end of write sent from the respective pickup control sections 35 are received by the control block 16 in Steps S67 and S68.

When receiving the notification indicating the end of data write from each channel, in Step S69, the control block 16 checks the end of the write operation, and sends to the host CPU 17 a notification indicating the end of data write as instructed. Then, the control block 16 progresses to a state where it waits for an instruction from the host CPU 17.

When defect occurs during the write operation, such processing is performed by each of the control block 16, the pickup control section 35-1, and the pickup control section 35-2. Although in the description with reference to the flowchart of FIG. 6, a case has been described where the pickup control section 35-1 detects defect, when the pickup control section 35-2 detects defect, the pickup control section 35-2 performs the above-described processing performed by the pickup control section 35-1. That is, when the pickup control section 35-2 detects defect, the pickup control section 35-2 sends a request to stop the write operation to the pickup control section 35-1, and sends an error notification to the control block 16.

As described above, when the error notification and the stop notification are received from the pickup control section 35, the control block 16 determines a replacement destination.

[Determination of Replacement Destination]

Next, processing related to determination of a replacement destination performed in Step S65 will be described. An example will be described where continuous write data requested by the host CPU 17 has 16 blocks and is divided into two channels, in this case, the optical pickup 34-1 and the optical pickup 34-2.

In order that 16 blocks are written onto the disc 11 by the two optical pickups 34, 8 blocks are assigned to each optical pickup 34. If one block is expressed by "*", assignment is made as shown in FIG. 7A. The 8 blocks of the blocks 0 to 7 are written in a predetermined region 101 of the disc 11 by the optical pickup 34-1 under the control of the pickup control section 35-1. The 8 blocks of the blocks 8 to 15 are written in a predetermined region 102 of the disc 11 by the optical pickup 34-2 under the control of the pickup control section 35-2.

Since the region 101 and the region 102 are continuous regions, the 16 blocks of the blocks 0 to 15 are continuously written in that order. The blocks written onto the disc 11 by the optical pickup 34-1 are expressed by "1", and the blocks written onto the disc 11 by the optical pickup 34-2 are expressed by "2". If the blocks 0 to 15 are normally written onto the disc 11, an expression can be made as shown in FIG. 7B.

When data is normally written onto the disc 11, as described above, data written by the optical pickup 34-1 and data written by the optical pickup 34-2 are continuously written, such that data can be continuously read at the time of reproducing. Even when an apparatus at the time of reproducing has only one optical pickup, data can be continuously read. Even when an apparatus includes two or more optical pickups, data can be continuously read. Since data is written by the two optical pickups 34, data can be written onto the disc 11 at double speed.

When defect occurs during write, data is recorded as follows. In the following description, "*" in the drawing indicates a place where defect occurs. "•" indicates a place where write is not performed. "×" indicates a place where write is inhibited.

When defect occurs in the optical pickup 34-2, for example, as shown in FIG. 7C, when defect occurs while the 10th block (hereinafter, referred to as block 10; the same is applied to other blocks) is being written, a region 102 is skipped as an unused region. An unused region refers to a region where data write is not performed. It is thought that data write in the region 102 is skipped and, for example, write is performed as shown in FIG. 7D.

That is, since no defect occurs in a region 101 and no defect occurs in a head portion of the region 102, in other words, in a portion adjacent to the region 101, it can be determined that write can be performed, and even when write is performed, there is little possibility that defect occurs. For this reason, the blocks 0 to 7 are written in the region 101 by the optical pickup 34-1.

The state shown in FIG. 7C is a state where the blocks 0 to 3 are already written in the region 101, and then the blocks 4 to 7 are written by the optical pickup 34-1. Thus, the blocks 0 to 7 are written in the region 101.

The region 102 where defect occurs can be determined to be a region where there is a high possibility that defect occurs again when write is continued after defect has occurred. Thus, the region 102 is set as an unused region and becomes a region where write is not performed. Then, the blocks 8 to 15 that will be written in the region 102 are written in a region 103 which is a region continuous to the region 102. That is, the replacement destination of the region 102 is determined to be the region 103, and write is performed to the region 103. If no defect occurs in the region 103, as shown in FIG. 7D, the blocks 0 to 7 are written in the region 101, the region 102 becomes an unused region, and the blocks 8 to 15 are written in the region 103.

As described below, although the replacement destination differs in accordance with whether the disc 11 is a rewritable recording medium or a non-rewritable recording medium, in this case, the same replacement destination is determined.

In the state shown in FIG. 7C, defect is detected in a state where the blocks 8 and 9 have already been written in the region 102 by the optical pickup 34-2. Defect is detected in a state where the blocks 3 to 7 are not written in the region 101. With regard to the region where the blocks 3 to 7 will be written, previous and subsequent write normally end. For this reason, there is little possibility that defect occurs, thus as described above, write is continued.

However, like a state shown in FIG. 7E, it is thought that, when defect occurs at the head of the region 102, for example, there is a high possibility that defect occurs at a place of the region 101 adjacent to a place where defect occurs. In the state shown in FIG. 7E, a place where the block 7 will be written is adjacent to a place where defect has occurred and the block 8 will be written, there is a possibility that defect occurs.

When defect occurs at the head of the region, as shown in FIG. 7F, the region 101 and the region 102 are set as an unused region, and data is written in the region 103 and a region 104. As shown in FIG. 7F, the region 103 and the region 104 are continuous regions, and the blocks 0 to 15 are written in the continuous regions. Thus, data is recorded onto the disc continuously in order. Therefore, continuous read is performed in time at the time of reproducing.

A case where defect occurs in the region 101 where write is performed by the optical pickup 34-1 will be described with reference to FIGS. 8A to 8D. In this case, a region where defect occurs is set as an unused region, and replacement destinations are determined such that data is continuously recorded.

Figures 8A, 8B, 8C, 8D:
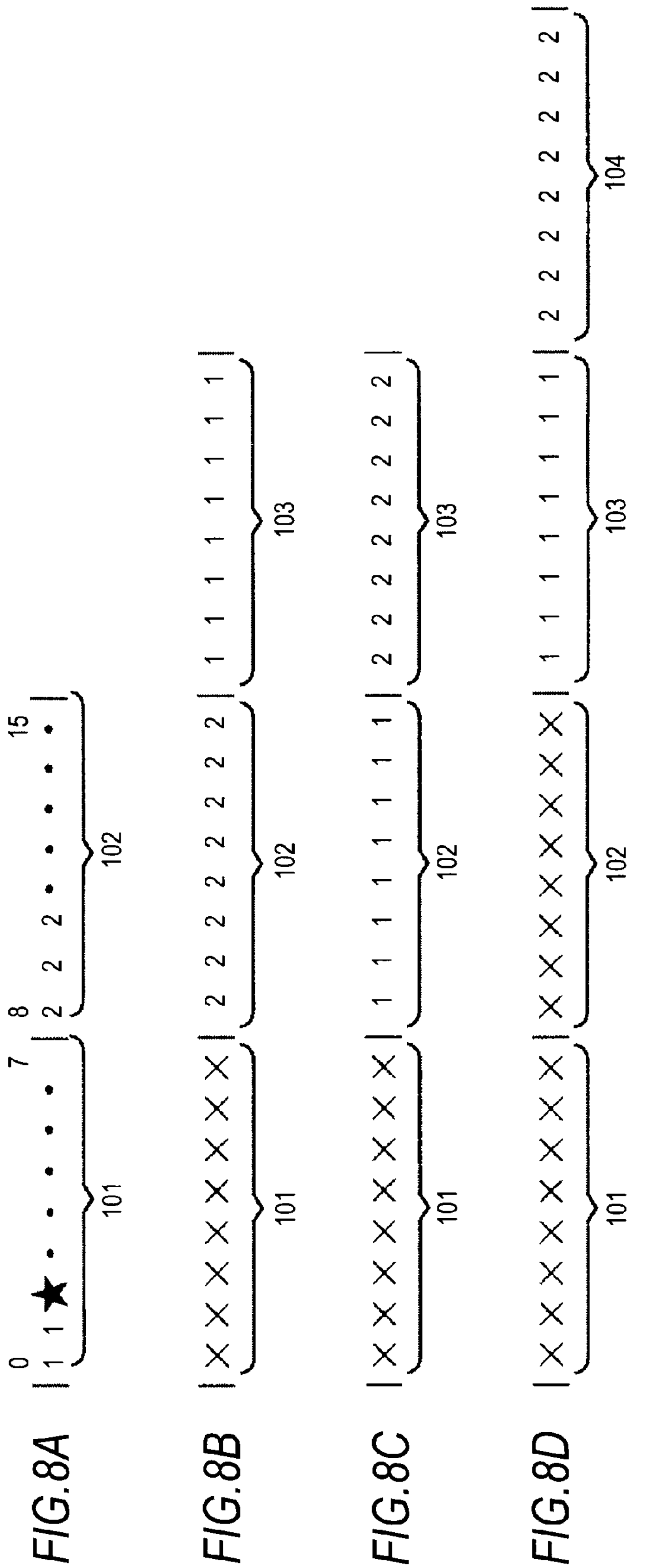
FIGS. 8A to 8D are diagrams illustrating a way to determine a replacement destination.

As shown in FIG. 8A, for example, it is assumed that defect occurs when the block 2 is written. At this time, it is assumed that no defect occurs in the region 102 where write is performed by the optical pickup 34-2. In such a case, first, the region 101 where defect occurs is a region where there is a high possibility that defect occurs even when data is written as it is. Thus, the region 101 is set as an unused region. In the region 102 where no defect occurs, write is already normally performed. Therefore, even when write is continued as it is, there is a high possibility that no defect occurs.

As shown in FIG. 8B, it is thought that write by the optical pickup 34-2 is continued and the blocks 8 to 15 are written in the region 102, and the region 103 continuous to the region 102 is set as the replacement destination of the region 101 and the blocks 0 to 7 are recorded in the region 103. However, in such a case, the blocks 0 to 7 are recorded after the blocks 8 to 15, continuity of the blocks 0 to 15 is lost. That is, data is discontinuously recorded.

Thus, data is recorded as shown in FIG. 8C or 8D. FIG. 8C shows a case where the disc 11 is a rewritable recording medium (Re-writable recording medium). FIG. 8D shows a case where the disc 11 is a non-rewritable recording medium (write-once medium).

When the disc 11 is a rewritable recording medium, blocks (data) which are already written in the region 102 can be deleted and blocks (data) can be newly written. Since the blocks 8 to 10 are already written in the region 102, it is checked that the region 102 is a writable region. Thus, as shown in FIG. 8C, the blocks 8 to 10 (the state of FIG. 8A) which are already written in the region 102 are deleted and the blocks 0 to 7 are written in the region 102. That is, in this case, the replacement destination of the region 101 is set as the region 102. In other words, the optical pickup 34-1 writes, in the region 102, data that will be written in the region 101.

Meanwhile, the region 103 is designated as the replacement destination of the region 102, and the optical pickup 34-2 writes the blocks 7 to 15 in the region 103. In this way, the replacement destinations are determined and write is performed, such that, as shown in FIG. 8C, the blocks 0 to 15 are written continuously in the region 102 and the region 103.

When the disc 11 is not a rewritable recording medium, a replacement destination is determined as shown in FIG. 8D, and write is performed. That is, the region 101 where defect has occurred is set as an unused region, and the region 103 becomes the replacement destination of the region 101. The region 102 where no defect occurs and data is already written is set as an unused region, and the region 104 becomes the replacement destination of the region 102. The replacement destinations of the region 101 and the region 102 are respectively set to the region 103 and the region 104. Then, the blocks 0 to 15 are written continuously in the region 103 and the region 104.

In this way, the replacement destinations are determined and write is performed, such that, as shown in FIG. 8D, the blocks 0 to 15 are written continuously in the region 103 and the region 104.

Figure 9A:
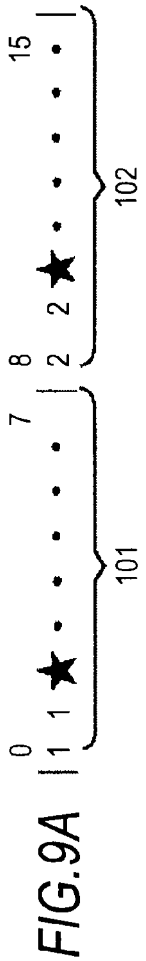
FIGS. 9A and 9B are diagrams illustrating a way to determine a replacement destination.
Figure 9B:
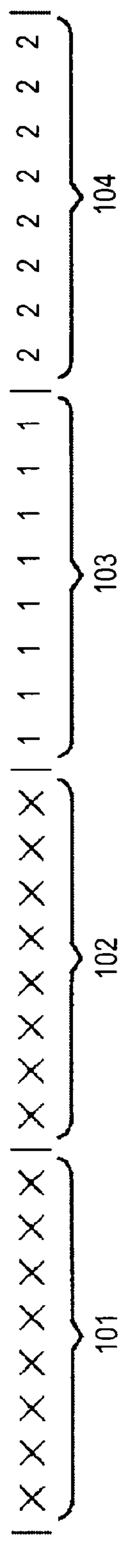

A case where defect occurs in the region 101 where write is performed by the optical pickup 34-1, and defect also occurs in the region 102 where write is performed by the optical pickup 34-2 will be described with reference to FIGS. 9A and 9B. In this case, a region where defect occurs is set as an unused region, and replacement destinations are determined such that data is recorded continuously.

Thus, in this case, the region 101 and the region 102 where defect occurs are set as an unused region. In this case, the region 101 and the region 102 are set as an unused region, regardless of whether the disc 11 is a rewritable recording medium or not. Then, the replacement destinations of the region 101 and the region 102 are respectively set to the region 103 and the region 104. The blocks 0 to 15 are written continuously in the region 103 and the region 104.

In this way, the replacement destinations are determined and write is performed, such that, as shown in FIG. 8E, the blocks 0 to 15 are written continuously in the region 103 and the region 104.

Figure 6:
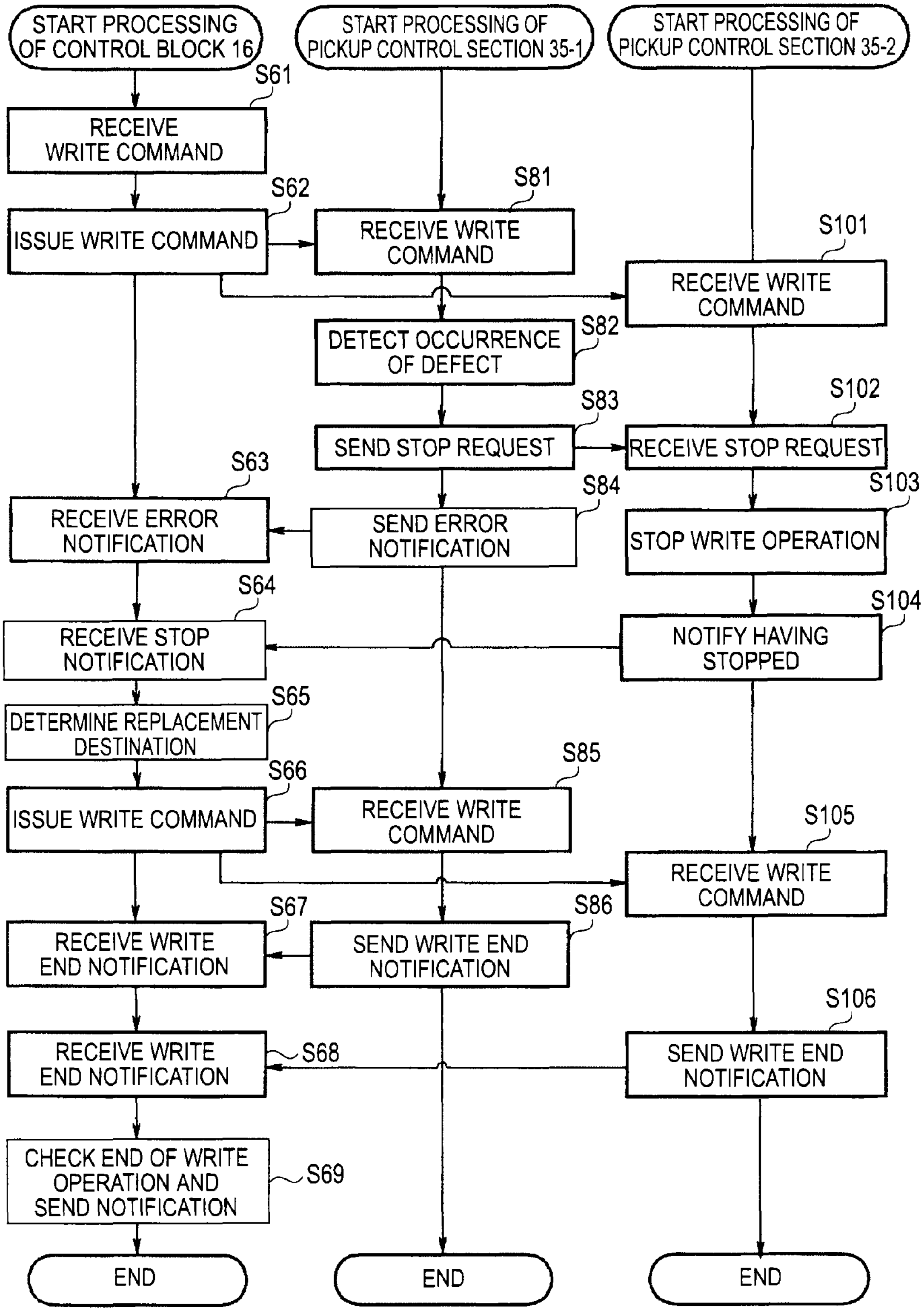
FIG. 6 is a flowchart illustrating the operation of the driving device.

Further description will be provided with reference to the flowchart of FIG. 6. The flowchart of FIG. 6 illustrates processing in a situation shown in FIGS. 8A to 8D. That is, the flowchart of FIG. 6 illustrates processing when the pickup control section 35-1 detects defect. In such a case, the control block 16 receives the error notification in Step S63 and receives the stop notification in Step S64.

The control block 16 receives the error notification to recognize occurrence of defect in the pickup control section 35-1. However, when only the error notification is received, it is impossible to recognize the state of FIGS. 8A to 8D or the state of FIGS. 9A and 9B, that is, it is impossible to recognize whether only the pickup control section 35-1 detects defect or both the pickup control section 35-1 and the pickup control section 35-2 detect defect.

As described with reference to the flowchart of FIG. 6, after (as occasion demands, before) the error notification has been received, the stop notification is received from the pickup control section 35-2, such that it is possible to recognize the state of FIGS. 8A to 8D, that is, detection of defect only by the pickup control section 35-1. Thus, in such as case, when the replacement destination is determined in Step S65, it is determined whether or not the disc 11 is a rewritable recording medium, the replacement destination is determined from the determination result as described with reference to FIG. 8C or 8D.

When in Step S64, the error notification, not the stop notification, is received from the pickup control section 35-2, the control block 16 can recognize that both the pickup control section 35-1 and the pickup control section 35-2 detect defect. Thus, the replacement destinations are determined as described with reference to FIG. 9B.

When the error notification received in Step S63 is a notification from the pickup control section 35-2 and the stop notification received in Step S64 is a notification from the pickup control section 35-1, the control block 16 recognizes the state described with reference to FIG. 7C and determines a replacement destination as described with reference to FIG. 7D.

When the error notification received in Step S63 is a notification from the pickup control section 35-2, it is determined that a place where the error (defect) occurs is a head portion, and the stop notification received in Step S64 is a notification from the pickup control section 35-1, the control block 16 recognizes the state described with reference to FIG. 7C and determines a replacement destination as described with reference to FIG. 7F.

In order for the control block 16 to perform such processing, when the error notification is received, a replacement destination is determined after it is checked that a pickup control section 35 other than a pickup control section 35 which sends the error notification stops a write operation, in other words, after it is checked that no defect occurs in another pickup control section 35.

In this way, a replacement destination is determined, such that, even when defect occurs, data can be written continuously on a disc.

As described above, data is divided into two pieces of data and recorded in a recording medium simultaneously by two pickups, if defect is detected by a pickup (referred to as a first pickup) which writes first-half data to be written and defect is detected by a pickup (referred to as a second pickup) which writes second-half data to be written (the situation described with reference to FIGS. 9A and 9B), two regions where write has been performed are set as an unused regions, and two regions adjacent and continuous to the regions are set as a replacement destination.

When defect is detected only in the second pickup and defect is detected at the head (the situation described with reference to FIG. 7E), similarly to a case where defect is detected by both of the first pickup and the second pickup, two regions where write has been performed are set as an unused region, and two regions adjacent and continuous to the regions are set as a replacement destination.

Thus, in this case, when data is recorded by two pickups, and defect is detected by the second pickup which records the second-half portion of data, all regions where write is to be performed are set as an unused region, and replacement destinations are set for all regions.

When defect is detected only in the second pickup, and defect is detected in a portion other than the head (the situation described with reference to FIG. 7C), if the disc 11 is a rewritable recording medium, only a region where defect occurs is set as an unused region, and one region adjacent and continuous to the region is set as a replacement destination.

Thus, in this case, when data is recorded by two pickups, and defect is detected by the second pickup which records the second half portion of data, a region where defect occurs is set as an unused region, and a replacement destination of the region is set. With regard to a region where no defect occurs, write is continued.

When defect is detected only in the second pickup, and defect is detected in a portion other than the head (the situation described with reference to FIG. 7C), if the disc 11 is a non-rewritable recording medium, similarly to a case where defect is detected by both of the first pickup and the second pickup, two regions where write has been performed are set as an unused region, and two regions adjacent and continuous to the regions are set as a replacement destination.

Thus, in this case, when data is recorded by two pickups, and defect is detected by the second pickup which records the second half portion of data, all regions where write is to be performed are set as an unused region, and replacement destinations are set for all regions.

When defect is detected by the first pickup (the situation described with reference to FIG. 8A), and it is determined that the type of the recording medium is a rewritable recording medium, a replacement destination is set such that data is written in a region where no defect is detected and a region continuous to the region. When the recording medium is a non-rewritable recording medium, two regions where write has been performed are set as an unused region, and two regions adjacent and continuous to the regions are set as a replacement destination.

Thus, when data is recorded by two pickups, and the recording medium is a non-rewritable medium, if defect is detected by the first pickup which records the first half portion of data, defect is detected by the second pickup which records the second half portion of data, or defect is detected by both of the first pickup and the second pickup, all regions where write is to be performed are set as an unused region, and replacement destinations are set for all regions.

When the recording medium is a writable medium, and defect is detected only in the first pickup, a replacement destination is set for a region where write is performed by the second pickup.

[Second Embodiment]

Although in the above-described first embodiment, a one-head two-pickup driving device has been described as an example, a second embodiment of the invention will be described in connection with a driving device which includes two one-head two-pickup assemblies.

Figure 10:
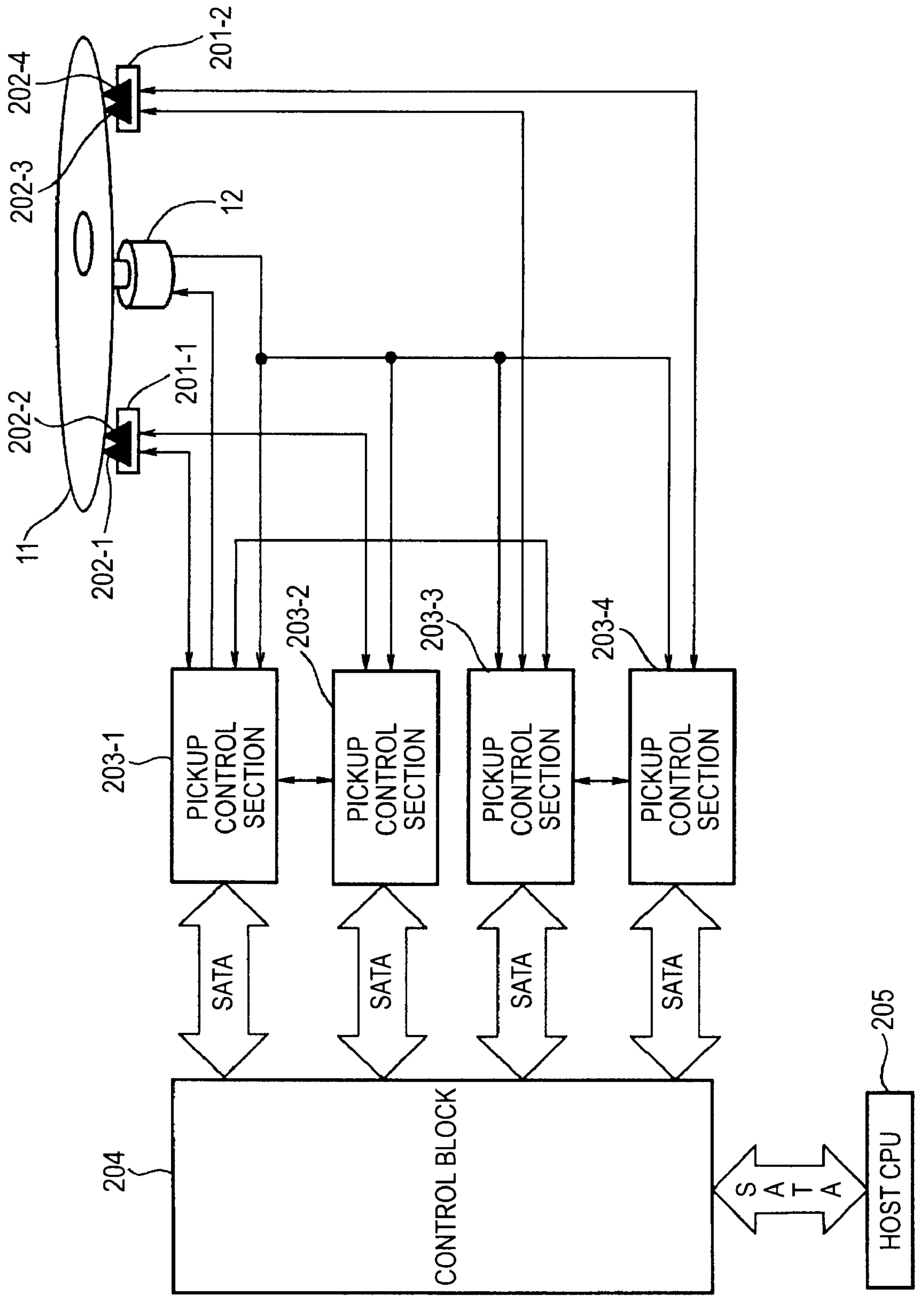
FIG. 10 is a diagram showing still another configuration of the driving device to which the invention is applied.

FIG. 10 is a diagram showing the configuration of a driving device which includes two one-head two-pickup assemblies. The driving device shown in FIG. 10 includes a spindle motor 12, an optical head 201-1, an optical head 201-2, an optical pickup 202-1, an optical pickup 202-2, an optical pickup 202-3, an optical pickup 202-4, a pickup control section 203-1, a pickup control section 203-2, a pickup control section 203-3, a pickup control section 203-4, a control block 204, and a host CPU 205.

The driving device shown in FIG. 10 includes the two optical heads 201-1 and 201-2. The optical head 201-1 is provided with the two optical pickups 202-1 and 202-2, and the optical head 201-2 is provided with the two optical pickups 202-3 and 202-4. The driving device shown in FIG. 10 includes two one-head two-pickup assemblies. The optical head 201-1 and the optical head 201-2 are provided to be opposite each other at 180 degrees.

The pickup control section 203-1 controls the optical pickup 202-1, the pickup control section 203-2 controls the optical pickup 202-2, the pickup control section 203-3 controls the optical pickup 202-3, and the pickup control section 203-4 controls the optical pickup 202-4.

For example, when defect is detected, each of the pickup control sections 203-1 to 203-4 performs communication with other pickup control sections 203 to transfer information. That is, the pickup control section 203-1 and the pickup control section 203-2 are configured to perform communication through UART communication, and the pickup control section 203-3 and the pickup control section 203-4 are also configured to perform communication through UART communication. The pickup control section 203-1 and the pickup control section 203-3 are configured to perform communication through UART communication. The pickup control section 203-1 and the pickup control section 203-3 perform communication, such that the optical head 201-1 which is controlled by the pickup control section 203-1 and the optical head 201-3 which is controlled by the pickup control section 203-3 can operate in cooperation.

Each of the pickup control sections 203-1 to 203-4 is configured to perform SATA communication with the control block 204. The control block 204 is configured to perform SATA communication with the host CPU 205.

Description will be provided as to control of the spindle motor 12 in the driving device shown in FIG. 10. The rotation of the disc 11 is controlled by the spindle motor 12, and a signal for controlling the spindle motor 12 is supplied from the pickup control section 203-1. The spindle motor 12 is configured to supply an FG (Frequency Generator) signal representing a rotation speed to the pickup control sections 203-1 to 203-4.

The pickup control section 203-1 to 203-4 have to have the FG signal so as to respectively control the optical pickups 202-1 to 202-4, thus the FG signal is supplied to the pickup control sections 203-1 to 203-4. When a setting is made such that the pickup control section 203-1 controls the spindle motor 12, only the pickup control section 203-1 is configured to create a signal for controlling the spindle motor 12 and to supply the signal to the spindle motor 12.

The pickup control sections 203-1 to 203-4 have the same configuration as the pickup control section 35-1 or the pickup control section 35-2 shown in FIG. 4. Thus, detailed description thereof will be omitted.

Figure 11:
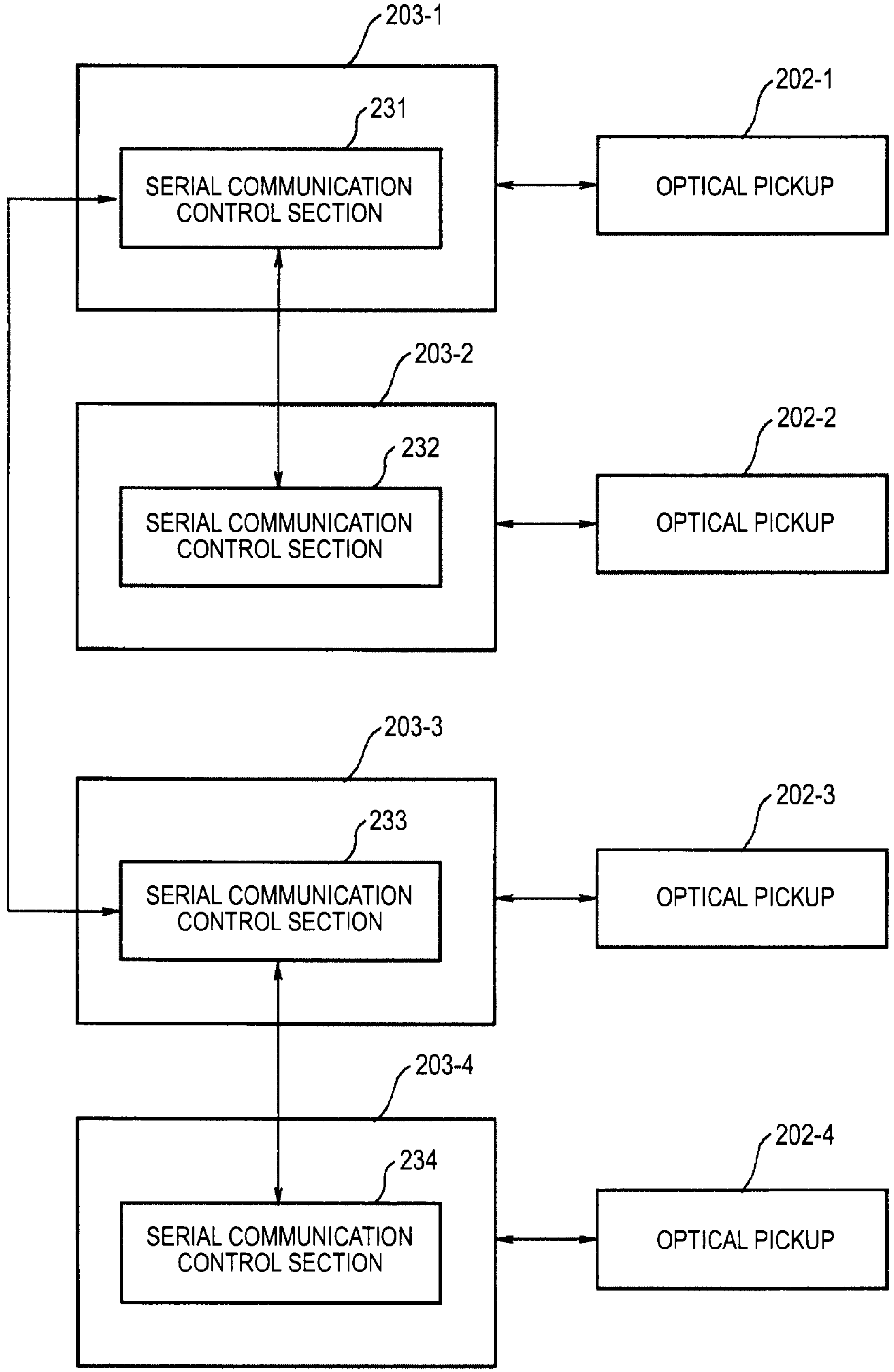
FIG. 11 is a diagram illustrating connection regarding communication.

As shown in FIG. 11, the pickup control section 203-1 has a serial communication control section 231 therein. The pickup control section 203-2 has a serial communication control section 232 therein. The pickup control section 203-3 has a serial communication control section 233 therein. The pickup control section 203-4 has a serial communication control section 234 therein.

The pickup control sections 203-1 to 203-4 perform communication so as to operate in cooperation, and the communication is performed under the control of the serial communication control sections 231 to 234. That is, as shown in FIG. 11, the pickup control section 203-1 and the pickup control section 203-2 perform UART communication through the serial communication control section 231 and the serial communication control section 232, realizing sharing of information, for example, sharing of information regarding a stop notification of an operation which is sent when defect is detected. Similarly, the pickup control section 203-3 and the pickup control section 203-4 perform UART communication through the serial communication control section 233 and the serial communication control section 234, realizing sharing of information.

The pickup control section 203-1 and the pickup control section 203-3 perform UART communication through the serial communication control section 231 and the serial communication control section 233, realizing sharing of information. The communication is performed, such that the optical head 201-1 which is controlled by the pickup control section 203-1 and the optical head 201-3 which is controlled by the pickup control section 203-3 can operate in cooperation.

Only the pickup control section 203-1 from among the pickup control sections 203-1 to 203-4 perform processing, such as control of the spindle motor 12 or read of a place where defect occurs when the disc 11 is inserted in to the drive (not shown). That is, the pickup control section 203-1 is configured to serve as a master and to perform processing which is unable to be performed by other pickup control sections 203-2 to 203-4.

The pickup control section 203-1 controls the optical head 201-1, but the pickup control section 203-2 does not control the optical head 201-1. Thus, with this relationship, the pickup control section 203-1 serves as a master. The pickup control section 203-3 controls the optical head 201-2, but the pickup control section 203-4 does not control the optical head 201-2. Thus, with this relationship, the pickup control section 203-3 serves as a master.

Here, description will be continued assuming that the pickup control section 203-1 serves as a master and the pickup control section 203-3 serves a sub-master.

As described above, the pickup control sections 203-1 to 203-4 which respectively control the four optical pickups 202-1 to 202-4 has the same configuration and perform the same processing, but a configuration is made such that the pickup control section 203-1 from among the pickup control sections 203-1 to 203-4 controls the spindle motor 12 or the like. With such a configuration, the pickup control section 203 can be constituted by using the same LSI and cost can be reduced. In addition, the serial communication control sections 231 to 234 for sharing information are provided, enabling a cooperative operation.

For such an LSI, for example, an LSI which is used in a drive of a personal computer or the like may be used. Such an LSI is comparatively cheap, reducing the total cost of the driving device.

Next, the operation of the driving device will be described in connection with a specific example. First, the operation when the disc 11 is inserted into the drive (not shown) will be described. In the driving device which includes the four optical pickups 202-1 to 202-4, the operation which is performed when the disc 11 is inserted is the same as in the driving device shown in FIG. 1. That is, processing regarding read of defect information is the same as described with reference to the flowchart of FIG. 5.

Figure 5:
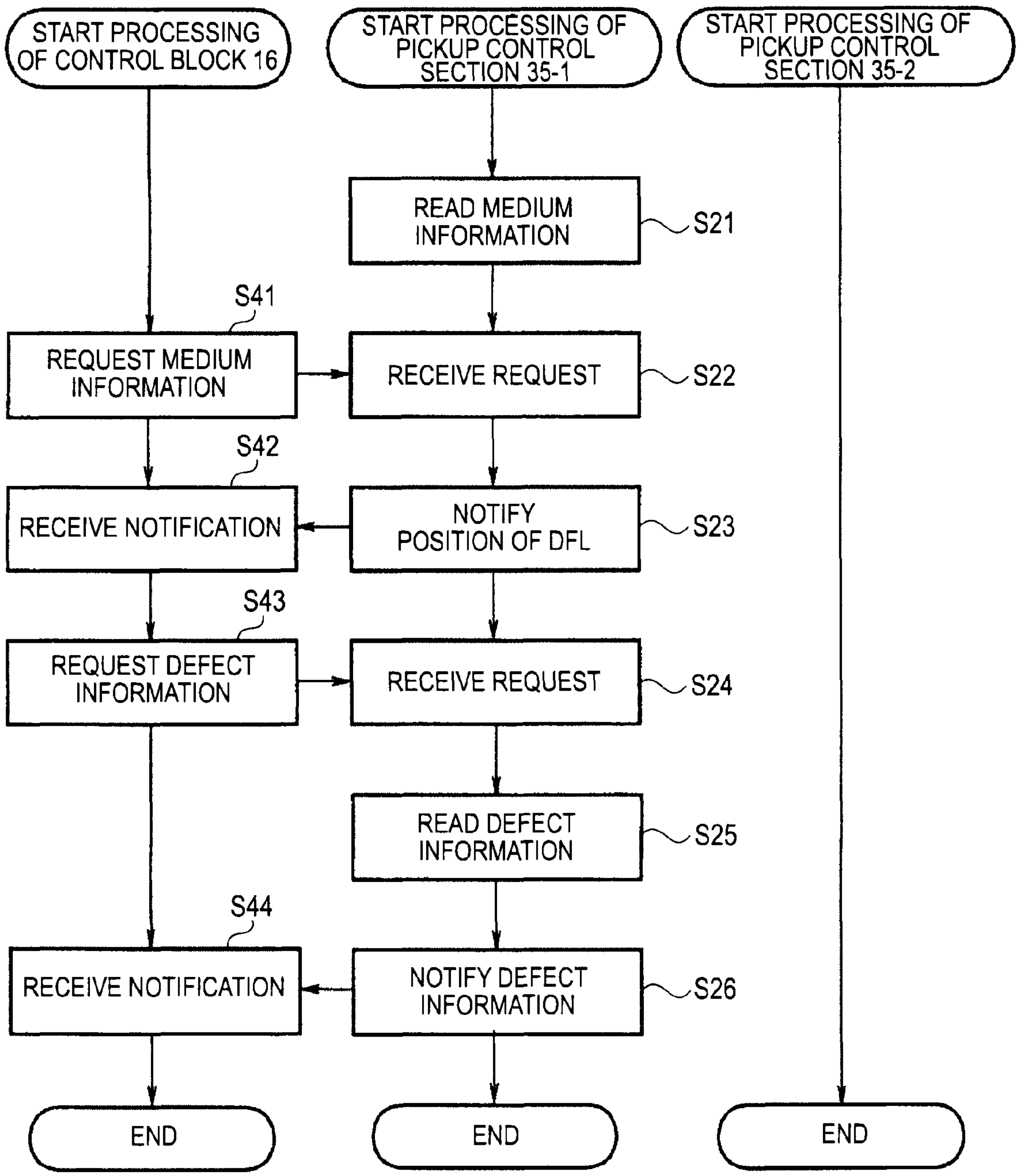
FIG. 5 is a flowchart illustrating the operation of the driving device.

In the flowchart of FIG. 5, the processing which is performed by the control block 16 is performed by the control block 204 in the driving device shown in FIG. 10. The control block 204 manages defect information, such that the pickup control sections 203-1 to 203-4 can share the defect information (perform control on the basis of a single piece of defect information). The read of the defect information is performed by the pickup control section 203-1 serving as a master. That is, in the flowchart of FIG. 5, the processing which is performed by the pickup control section 35-1 is performed by the pickup control section 203-1 in the driving device shown in FIG. 10.

The processing regarding the read of the defect information is performed as described above. The processing is the same as described with reference to the flowchart of FIG. 5, and description thereof will be omitted.

If a command is sent from the host CPU 205 through the control block 204, the pickup control sections 203-1 to 203-4 respectively control the optical pickups 202-1 to 202-4, and data write onto the disc 11 is performed. When data write is performed, if defect occurs due to any reason, information regarding defect is written onto the disc 11.

Next, processing when defect occurs at the time of write will be described. Basic processing is the same as described with reference to the flowchart of FIG. 6. That is, the processing which is performed by the control block 16 in the flowchart of FIG. 6 is performed by the control block 204 in the driving device shown in FIG. 10. Similarly, the pickup control section 203 which detects defect performs the processing which is performed by the pickup control section 35-1 in the flowchart of FIG. 6. The pickup control section 203 which does not detect defect performs the processing which is performed by the pickup control section 35-2 in the flowchart of FIG. 6.

Although basic processing is the same as described with reference to the flowchart of FIG. 6, thus description thereof will be omitted, processing of the pickup control section 203 which detects defect, the pickup control section 203 which does not detect defect is detected, and the control block 204 will be described again with reference to FIGS. 12 to 14.

Figure 12:
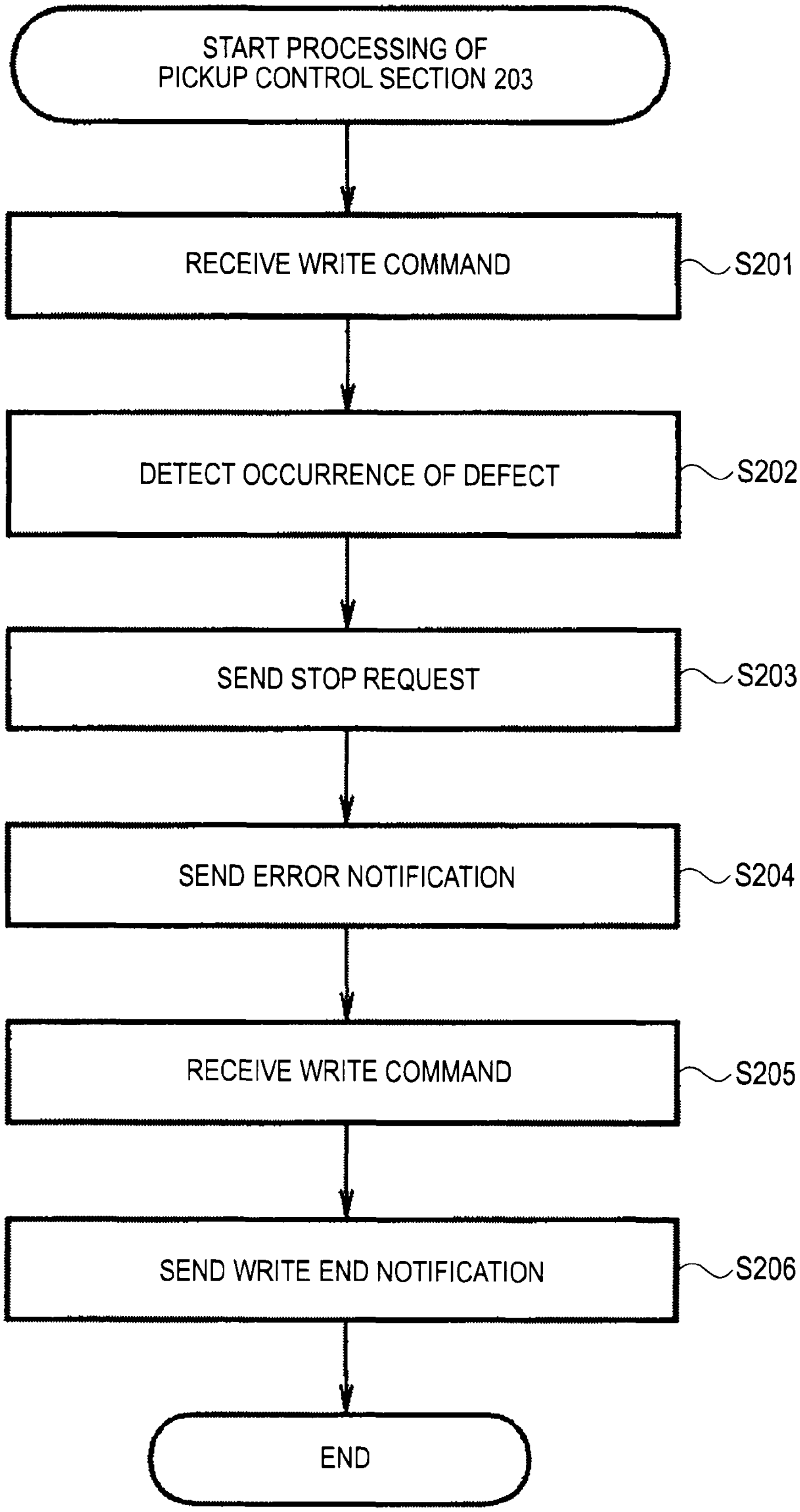
FIG. 12 is a flowchart illustrating processing of a pickup control section.

FIG. 12 is a flowchart illustrating processing which is performed by the pickup control section 203 which detects defect. In Step S201, when receiving a write command from the control block 204, the pickup control section 203 starts write on the basis of the instruction of the write command. When write is performed onto the disc 11, if occurrence of defect is detected (Step S202), occurrence of defect is notified to other pickup control sections 203 and the control block 204.

In Step S203, the pickup control section 203 which detects defect sends a request to stop write to other pickup control sections 203. Meanwhile, in Step S204, an error notification is sent to the control block 204 so as to notify that defect is detected. In this way, if the stop request and the error notification are sent, it waits fro an instruction from the control block 204. When it waits for an instruction, in Step S205, the write command is received from the control block 204. A region which becomes a replacement destination of a region where defect is detected is designated by the write command received in Step S205.

If write normally ends after such a write command has been received, in Step S206, a notification regarding the end of write is sent to the control block 204. In Step S205, when defect is detected again after the write command has been received, the processing of Step S202 is performed and subsequent processing is repeated.

Figure 13:
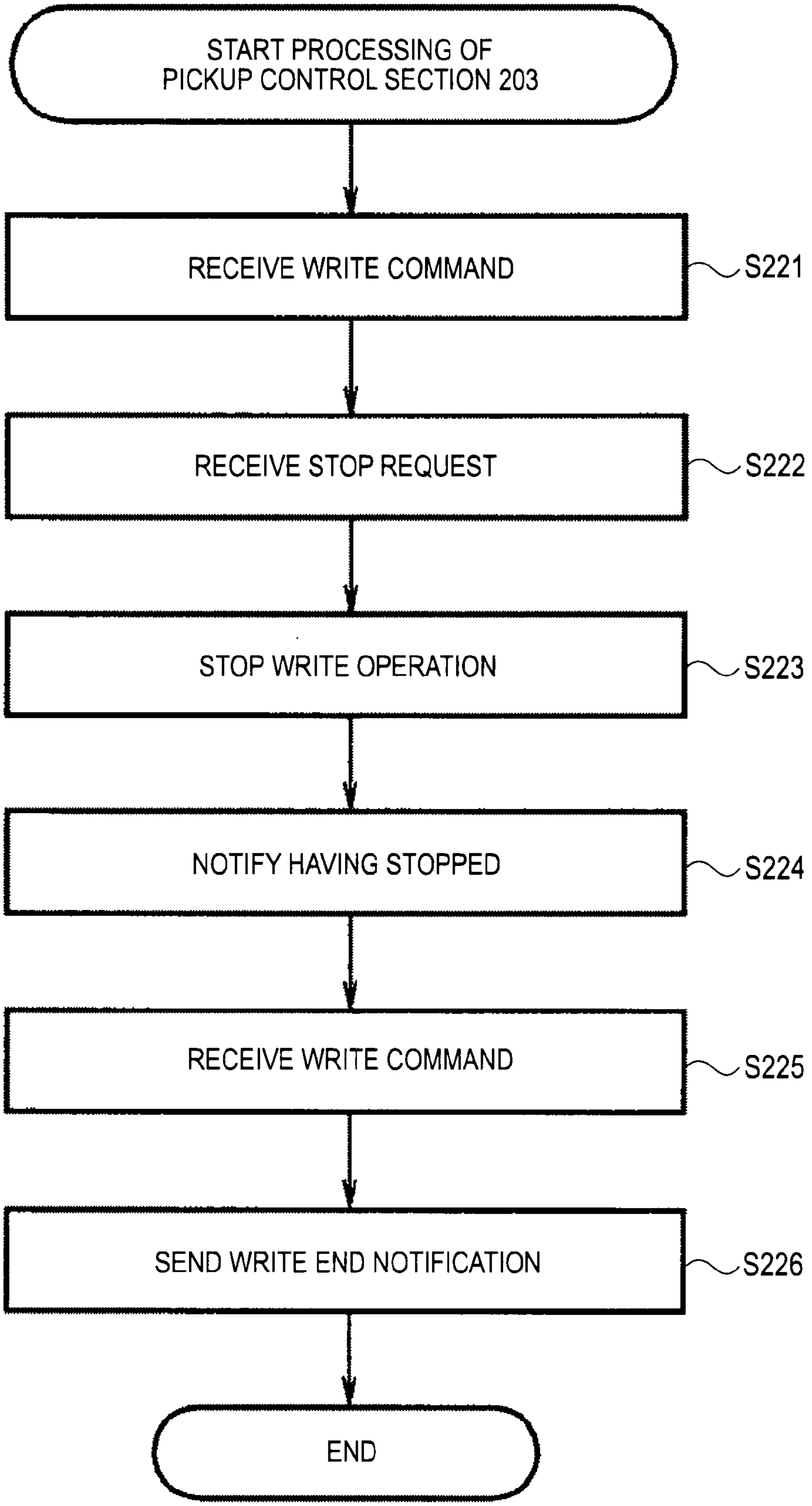
FIG. 13 is a flowchart illustrating processing of the pickup control section.

As described above, while the pickup control section 203 which detects defect performs processing, the pickup control section 203 which does not detect defect performs the processing in the flowchart shown in FIG. 13. That is, first, in Step S221, if the write command is received from the control block 204, the write operation starts.

When write is performed, if defect is detected by another pickup control section 203, in Step S222, a notification which requests to stop the write operation is received from the pickup control section 203 which detects defect. If such a request to stop write is received, in Step S223, the write operation stops, and in Step S224, the stop of the write operation is notified to the control block 204.

Thereafter, in Step S225, if a write command including information regarding a replacement destination is received from the control block 204, the write operation restarts on the basis of the instruction. If write ends, in Step S226, a notification indicating the end of write is sent to the control block 204.

Figure 14:
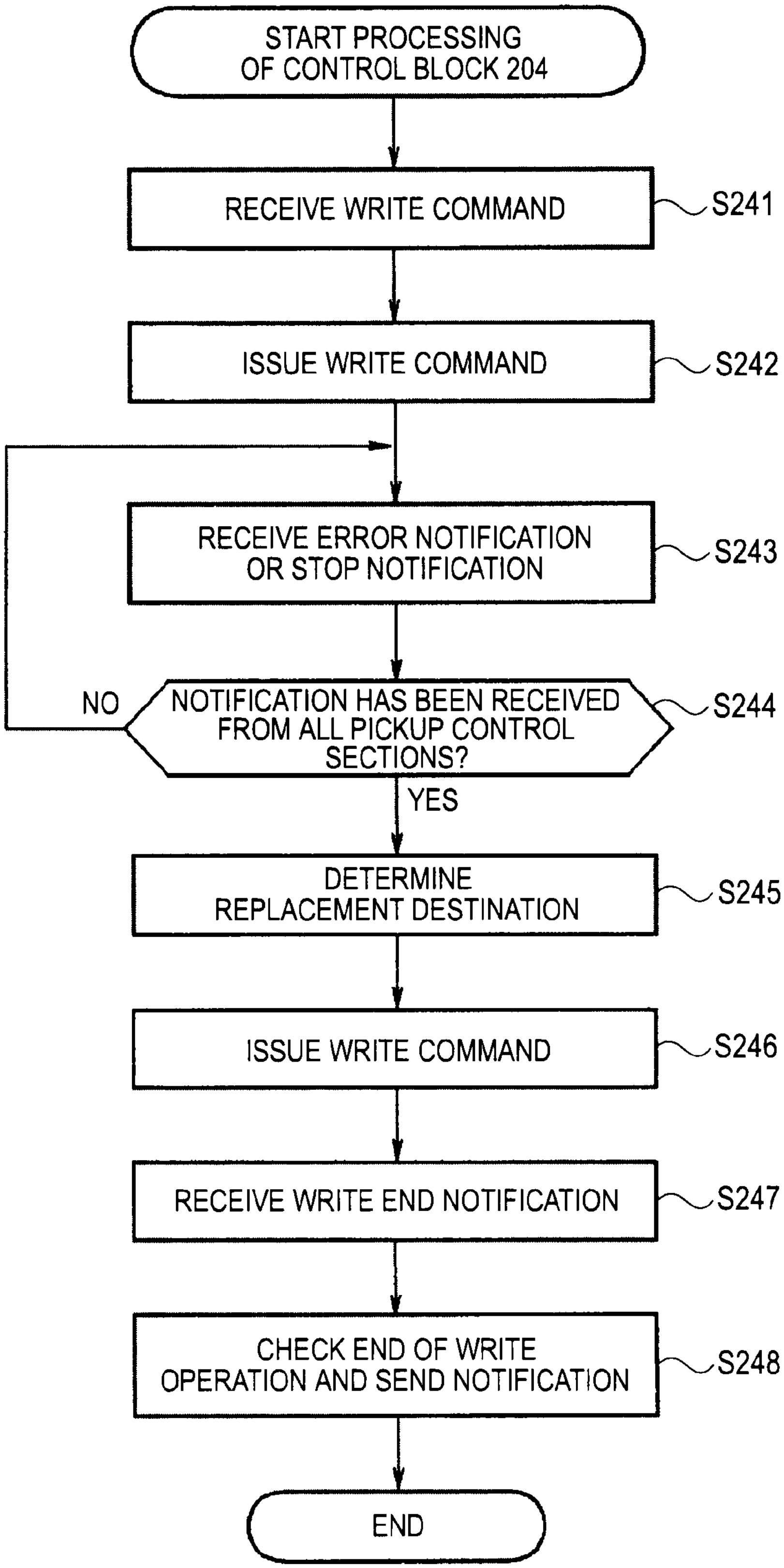
FIG. 14 is a flowchart illustrating processing of a control block.

Processing of the control block 204 in which the notifications are received from the pickup control section 203 which detects defect and the pickup control section 203 which does not detect defect, and a replacement destination is determined will be described with reference to a flowchart of FIG. 14. In Step S241, when a write command is received from the host CPU 205, in Step S242, a write command is issued to the pickup control sections 203-1 to 203-4.

In Step S243, if the error notification or the stop notification is received from one pickup control section 203 from among the pickup control sections 203-1 to 203-4, in Step S244, it is determined whether or not the notifications are received from all of the pickup control sections 203. As described above, since the error notification is sent from the pickup control section 203 which detects defect and the stop notification is sent from the pickup control section 203 which does not detect defect, consequently, the error notification and the stop notification are sent from all of the pickup control sections 203, and the control block 204 receives the error notification and the stop notification.

In Step S244, when it is determined that the notifications have not been received from all of the pickup control sections 203, the process returns to Step S243 and subsequent processing is repeated. In Step S244, when it is determined that the notifications have been received from all of the pickup control sections 203, the process progresses to Step S245.

In Step S245, a replacement destination is determined. Similarly to the first embodiment, the replacement destination is determined on the basis of the pickup control section 203 which detects defect, the number of pickup control sections 203, the type of disc 11, a place where defect occurs, or the like. The determination of the replacement destination will be described below with reference to FIGS. 15A to 28B.

In Step S245, if a replacement destination is determined, the process progresses to Step S246. In Step S246, the determined replacement destination is notified to a corresponding one of the pickup control sections 203-1 to 203-4. If data is normally written in the replacement destination, a write end notification is received from the corresponding pickup control section 203. If the write end notifications are received from all of the pickup control sections 203, in Step S248, the end of the write operation is checked, and the end of write is notified to the host CPU 205.

Description will be provided as to processing related to the determination of the replacement destination which is performed in Step S245 by the control block 204, which performs such control.

[Determination of Replacement Destination]

An example will be described where continuous write data which is requested by the host CPU 205 has 16 blocks and is divided into four channels, in this case, the optical pickups 202-1 to 202-4.

Figures 15A, 15B, 15C, 15D, 15E:
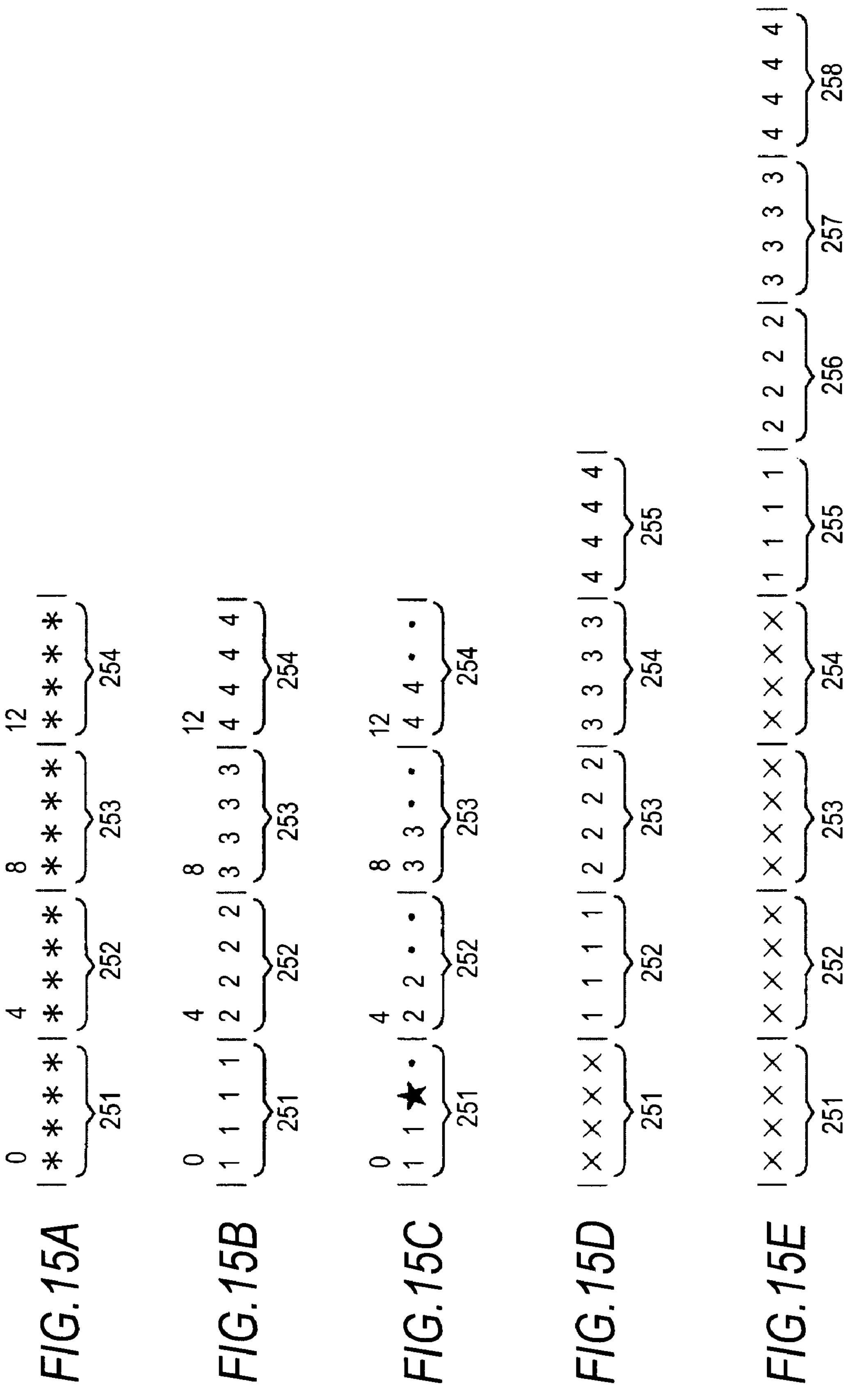
FIGS. 15A to 15E are diagrams illustrating a way to determine a replacement destination.

In order that 16 blocks are written onto the disc 11 by the four optical pickups 202, 4 blocks are assigned to each optical pickup 202. If one block is expressed by "*", assignment is made as shown in FIG. 15A. Four blocks of the blocks 0 to 3 are written in a predetermined region 251 of the disc 11 by the optical pickup 202-1 under the control of the pickup control section 203-1. Four blocks of the blocks 4 to 7 are written in a predetermined region 252 of the disc 11 by the optical pickup 202-2 under the pickup control section 203-2.

Four blocks of the blocks 8 to 11 are written in a predetermined region 253 of the disc 11 by the optical pickup 202-3 under the control of the pickup control section 203-3. Four blocks of the blocks 12 to 15 are written in a predetermined region 254 of the disc 11 by the optical pickup 202-4 under the control of the pickup control section 203-4.

The 16 blocks of the blocks 0 to 15 are written continuously in the regions 251 to 254 in that order. The blocks which are written onto the disc 11 by the optical pickup 202-1 are expressed by "1". The blocks which are written onto the disc 11 by the optical pickup 202-2 are expressed by "2". The blocks which are written onto the disc 11 by the optical pickup 202-3 are expressed by "3". The blocks which are written onto the disc 11 by the optical pickup 202-4 are expressed by the "4". If the blocks 0 to 15 are normally written onto the disc 11, an expression can be made as shown in FIG. 15B.

When data is normally written onto the disc 11, as described above, since data written by the optical pickups 202-1 to 202-4 are written continuously, data can be read continuously at the time of reproducing. The term "continuous" refers to a state where data is written such that, when read is performed, read is performed in the same order as at the time of write, in this case, in order of the blocks 0 to 15. For example, the state where data is written continuously refers to a state where, as described below, even when a predetermined region is non-writable and write is performed to the predetermined region, a pickup which performs read reads data in order in which data has to be read, without large movement.

At the time of reproducing, as shown in FIG. 15B, in a state where data is written continuously and a state where data is written as described below, even when an apparatus at the time of reproducing includes one pickup, data can be read continuously. Even when an apparatus includes two or more pickups, data can be read continuously. Since write is performed by the four optical pickups 202, data can be written onto the disc 11 at quadruple speed.

When defect occurs during write, data is recorded as follows. In the following description, "*" in the drawing indicates a place where defect occurs. "•" indicates a place where write is not performed. "×" indicates a place (unused region) where write is inhibited.

When defect occurs in the optical pickup 202-1, for example, as shown in FIG. 15C, when defect occurs while the block 2 is being written, the region 251 is skipped as an unused region. If write to the region 251 is skipped, for example, it is thought that write is performed as shown in FIG. 15D or 15E.

When the disc 11 is a rewritable recording medium, write can be performed again to even a region where write has already been performed. Thus, write is performed as shown in FIG. 15D. First, as described above, the region 251 is set as an unused region. As shown in FIG. 15C, since the blocks are already written in the regions 252 to 254, these regions can be determined to be rewritable. In such a case, with regard to the region 252, the region 253, and the region 254, data which has already been written is deleted, and then data is written again. Data is also written in a new region 255.

That is, in this case, the replacement destination of the region 251 is set to the region 252, the replacement destination of the region 252 is set to the region 253, and the replacement destination of the region 253 is set to the region 254, and the replacement destination of the region 254 is set to the region 255.

As a specific example of data to be written, the four blocks of the blocks 0 to 3 are written in the region 252 by the optical pickup 202-1, and the four blocks of the blocks 4 to 7 are written in the region 253 by the optical pickup 202-2. The four blocks of the blocks 8 to 11 are written in the region 254 by the optical pickup 202-3, and the four blocks of the blocks 12 to 15 are written in the region 255 by the optical pickup 202-4.

When the disc 11 is a non-rewritable recording medium, write is unable to be performed to a region where write has already been performed. In such a case, write is performed as shown in FIG. 15E. First, as described above, the region 251 is set as an unused region. The regions 252 to 254 are also set as an unused region. Data is written in regions 255 to 258 adjacent to the region 254.

That is, in this case, the replacement destination of the region 251 is set to the region 255, the replacement destination of the region 252 is set to the region 256, the replacement destination of the region 253 is set to the region 257, and the replacement destination of the region 254 is set to the region 258.

As a specific example of data to be written, the four blocks of the blocks 0 to 3 are written in the region 255 by the optical pickup 202-1, and the four blocks of the blocks 4 to 7 are written in the region 256 by the optical pickup 202-2. The four blocks of the blocks 8 to 11 are written in the region 257 by the optical pickup 202-3, and the four blocks of the blocks 12 to 15 are written in the region 258 by the optical pickup 202-4.

As described above, when defect occurs in the region 251 which is a head region from among a plurality of regions where data is written, if the disc 11 is a rewritable recording medium, as shown in FIG. 15D, replacement destinations are determined such that data is written in regions where write has already been performed and no defect has occurred and a region which is newly secured. When the disc 11 is a non-rewritable recording medium, as shown in FIG. 15E, replacement destinations are determined such that all regions where write has already been performed are set as an unused region, and data is written in regions adjacent and continuous to the unused regions.

Figures 16A, 16B, 16C, 16D, 16E, 16F:
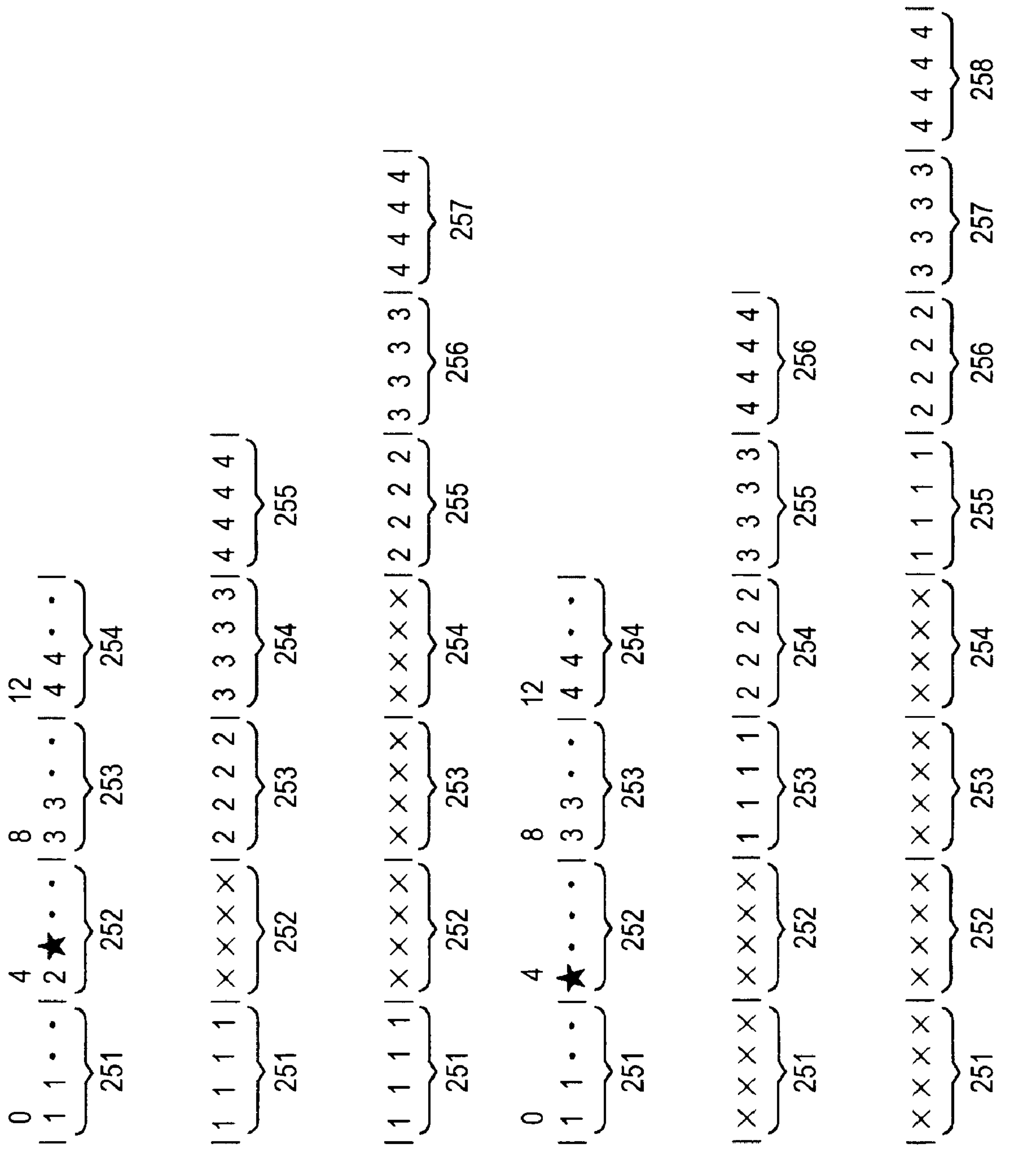
FIGS. 16A to 16F are diagrams illustrating a way to determine a replacement destination.

Next, a case where defect occurs in the region 252 where data is written by the optical pickup 202-2 will be described. When defect occurs in the optical pickup 202-2, for example, as shown in FIG. 16A, when defect occurs while the block 5 is being written, the region 252 is skipped as an unused region. If write to the region 252 is skipped, for example, it is thought that write is performed as shown in FIG. 16B or 16C.

As shown in FIG. 16B, when the disc 11 is a rewritable recording medium, first, as described above, the region 252 where defect occurs is set as an unused region. With regard to the region 251, the region 253, and the region 254, data which has already been written is deleted, and then data is written again. Data is also written in a new region 255.

That is, in this case, the replacement destination of the region 251 is set to the region 251, the replacement destination of the region 252 is set to the region 253, the replacement destination of the region 253 is set to the region 254, and the replacement destination of the region 254 is set to the region 255. With regard to the region 251, the region 251 may be set as a replacement destination and data may be written again, or write may be continued without determining a replacement destination. The term "write is performed continuously" means that, for example, in the state of FIG. 15A, when a write operation stops, write is performed from the block 3 and the block 4 is written subsequently on the basis of an instruction from the control block 204. In the following description, the same meaning is given.

As a specific example of data to be written, the four blocks of the blocks 0 to 3 are written in the region 251 by the optical pickup 202-1, and the four blocks of the blocks 4 to 7 are written in the region 253 by the optical pickup 202-2. The four blocks of the blocks 8 to 11 are written in the region 254 by the optical pickup 202-3, and the four blocks of the blocks 12 to 15 are written in the region 255 by the optical pickup 202-4.

As shown in FIG. 16C, when the disc 11 is a non-rewritable recording medium, since write is unable to be performed to a region where write has already been performed, the regions 252 to 254 are set as an unused region. Then, data is written in the regions 255 to 257 adjacent to the region 254. However, since data has already been written in the region 251 and data is written at the head of the region 252, the portions of the region 251 between the region 251 and the head of the region 252 can be determined as a region where there is little possibility that defect occurs. Thus, data is also written in the region 251.

That is, in this case, the replacement destination of the region 251 is set to the region 251 (a region where data write is continued), the replacement destination of the region 252 is set to the region 255, the replacement destination of the region 253 is set to the region 256, and the replacement destination of the region 254 is set to the region 257.

As a specific example of data to be written, the four blocks of the blocks 0 to 3 are written in the region 251 by the optical pickup 202-1, and the four blocks of the blocks 4 to 7 are written in the region 255 by the optical pickup 202-2. The four blocks of the blocks 8 to 11 are written in the region 256 by the optical pickup 202-3, and the four blocks of the blocks 12 to 15 are written in the region 257 by the optical pickup 202-4.

As described above, when defect occurs in a portion (intermediate portion) other than the head in the region 252 located intermediately from among the four regions where data is written, if the disc 11 is a rewritable recording medium, as shown in FIG. 16B, replacement destinations are determined such that data is written in regions where write has already been performed and no defect has occurred and a region which is newly secured. When the disc 11 is a non-rewritable recording medium, as shown in FIG. 16C, replacement destinations are determined such that data is written as it is in a region where write has already been performed and there is little possibility that defect occurs, other regions where write has already been performed are set as an unused region, and data is written in regions adjacent and continuous to the unused region.

As shown in FIG. 16D, when defect occurs in a portion at the head in the region 252 which is an intermediate region located intermediately from among the four regions where data is written, in other words, in the state shown in FIG. 16D, when defect occurs at the time of write of the block 4, the region 252 is skipped as an unused region. If write to the region 252 is skipped, for example, it is thought that write is performed as shown in FIG. 16B or 16C.

As shown in FIG. 16E, when the disc 11 is a rewritable recording medium, first, as described above, the region 252 where defect occurs is set as an unused region. With regard to the region 253 and the region 254, data which has already been written is deleted, and then data is written again. Data is also written in new regions 255 and 256.

In this case, although data has already been written in the region 251, and defect may not occur in the region 251, since defect occurs at the head of the region 252, there is a possibility that defect occurs in a portion where write is not yet performed (portions where the blocks 2 and 3 will be written) before the head of the region 252, that is, in the second half portion of the region 251. Since there is such a possibility, write to the region 251 is skipped and set as an unused region.

That is, in this case, the replacement destination of the region 251 is set to the region 253, the replacement destination of the region 252 is set to the region 254, the replacement destination of the region 253 is set to the region 255, and the replacement destination of the region 254 is set to the region 256.

As a specific example of data to be written, the four blocks of the blocks 0 to 3 are written in the region 253 by the optical pickup 202-1, and the four blocks of the blocks 4 to 7 are written in the region 254 by the optical pickup 202-2. The four blocks of the blocks 8 to 11 are written in the region 255 by the optical pickup 202-3, and the four blocks of the blocks 12 to 15 are written in the region 256 by the optical pickup 202-4.

As shown in FIG. 16F, when the disc 11 is a non-rewritable recording medium, since write is unable to be performed to a region where write has already been performed, the regions 251 to 254 are set as an unused region. In this case, as described with reference to FIG. 16C, data may be written in the region 251. However, due to the above-described reason described with reference to FIG. 16E, there is a possibility that defect occurs in a portion in the region 251 where data is not yet written. Thus, the region 251 is also set as an unused region. Data is written in the regions 255 to 257 adjacent to the region 254.

That is, in this case, the replacement destination of the region 251 is set to the region 255, the replacement destination of the region 252 is set to the region 256, the replacement destination of the region 253 is set to the region 257, and the replacement destination of the region 254 is set to the region 258.

As a specific example of data to be written, the four blocks of the blocks 0 to 3 are written in the region 255 by the optical pickup 202-1, and the four blocks of the blocks 4 to 7 are written in the region 256 by the optical pickup 202-2. The four blocks of the blocks 8 to 11 are written in the region 257 by the optical pickup 202-3, and the four blocks of the blocks 12 to 15 are written in the region 258 by the optical pickup 202-4.

As described above, when defect occurs at the head in the region 252 which is a region located intermediately from among the four regions where data write is performed, if the disc 11 is a rewritable recording medium, as shown in FIG. 16E, the region where defect occurs and a region near the region are set as an unused region, and replacement destinations are determined such that data is written in regions where write has already been performed and no defect has occurred and a region which is newly secured. When the disc 11 is a non-rewritable recording medium, as shown in FIG. 16F, replacement destinations are determined such that regions where write has already been performed are set as an unused region, and data is written in regions adjacent and continuous to the unused region.

Figures 17A, 17B, 17C, 17D, 17E, 17F:
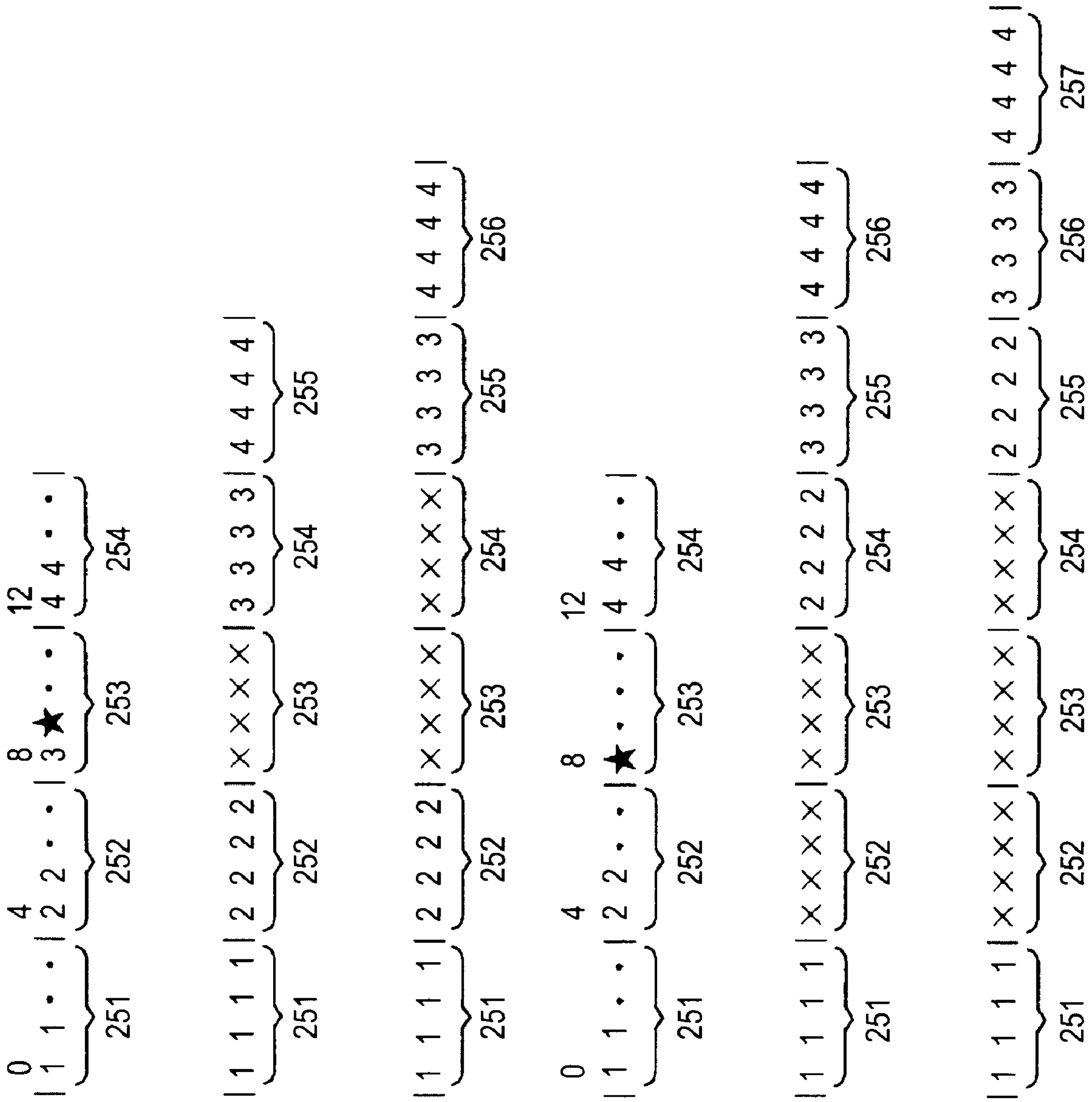
FIGS. 17A to 17F are diagrams illustrating a way to determine a replacement destination.

Next, a case where defect occurs in the region 253 where data is written by the optical pickup 202-3 will be described. When defect occurs in the optical pickup 202-3, for example, as shown in FIG. 17A, if defect occurs while the block 9 is being written, the region 253 is skipped as an unused region. If write to the region 253 is skipped, for example, it is thought that write is performed as shown in FIG. 17B or 17C.

As shown in FIG. 17B, when the disc 11 is a rewritable recording medium, first, as described above, the region 253 where defect occurs is set as an unused region. With regard to the region 251, the region 252, and the region 254, data which has already been written is deleted, and then data is written again. Data is also written in a new region 255. In this case, the rest of data which is already written is continued to be written in the region 251 and the region 252.

That is, in this case, the replacement destination of the region 251 is set to the region 251, the replacement destination of the region 252 is set to the region 252, the replacement destination of the region 253 is set to the region 254, and the replacement destination of the region 254 is set to the region 255. With regard to the region 251 and the region 252, the region 251 and the region 252 may be set as a replacement destination and data may be written again, or the rest of data which is already written may be continued to be written.

As a specific example of data to be written, the four blocks of the blocks 0 to 3 are written in the region 251 by the optical pickup 202-1, and the four blocks of the blocks 4 to 7 are written in the region 252 by the optical pickup 202-2. The four blocks of the blocks 8 to 11 are written in the region 254 by the optical pickup 202-3, and the four blocks of the blocks 12 to 15 are written in the region 255 by the optical pickup 202-4.

As shown in FIG. 17C, when the disc 11 is a non-rewritable recording medium, since write is unable to be performed to a region where write has already been performed, the region 253 and the region 254 are set as an unused region. Data is written in the region 255 and the region 256 adjacent to the region 254. However, since data is already written in the region 252 and data is written at the head of the region 253, a portion of the region 252 between the region 252 and the head of the region 253 can be determined to be a region where there is little possibility that defect occurs. Thus, data is continued to be written in the region 251 and the region 252 as it is.

Although it is thought that, since the region 254 is a region where data has already been written and is not affected by occurred defect, there is little possibility that defect occurs, if data of the region 254 is written as it is, data of the blocks 8 to 11 which will be written in the region 253 where defect has occurred is located after the blocks 12 to 15 which are written in the region 254. Accordingly, since write is performed in a state where the order is shifted, the region 254 is also set as an unused region and controlled such that data is not written therein.

That is, in this case, the replacement destination of the region 251 is set to the region 251, the replacement destination of the region 252 is set to the region 252, the replacement destination of the region 253 is set to the region 255, and the replacement destination of the region 254 is set to the region 256. With regard to the region 251 and the region 252, the rest of data which is already written is continued to be written.

As a specific example of data to be written, the four blocks of the blocks 0 to 3 are written in the region 251 by the optical pickup 202-1, and the four blocks of the blocks 4 to 7 are written in the region 252 by the optical pickup 202-2. The four blocks of the blocks 8 to 11 are written in the region 255 by the optical pickup 202-3, and the four blocks of the blocks 12 to 15 are written in the region 256 by the optical pickup 202-4.

As described above, when defect occurs in a portion (intermediate portion) other than the head in the region 253 which is a region located intermediately from among the four regions where data write is performed, if the disc 11 is a rewritable recording medium, as shown in FIG. 17B, replacement destinations are determined such that data is written in regions where write has already been performed and no defect has occurred and a region which is newly secured. When the disc 11 is a non-rewritable recording medium, as shown in FIG. 17C, replacement destinations are determined such that data is written as it is in a region where write has already been performed and there is little possibility that defect occurs, other regions where write has already been performed are set as an unused region, and data is written in regions adjacent to the unused region.

As shown in FIG. 17D, when defect occurs in a portion at the head of the region 253 which is an intermediate region located intermediately from among the four regions where data write is performed, in other words, in the state shown in FIG. 17D, when defect occurs at the time of write of the block 8, the region 253 is skipped as an unused region. If write to the region 253 is skipped, for example, it is thought that write is performed as shown in FIG. 17B or 17C.

As shown in FIG. 17E, when the disc 11 is a rewritable recording medium, first, as described above, the region 253 where defect occurs is set as an unused region. With regard to the region 251 and the region 254, data which has already been written is deleted, and then data is written again. Data is also written in new regions 255 and 256.

In this case, although data has already been written in the region 252, and defect may not occur in the region 252, since defect occurs at the head of the region 253, there is a possibility that defect occurs in a portion where write is not yet performed (portions where the blocks 6 and 7 will be written) before the head of the region 253, that is, in the second half portion of the region 252. Due to such a possibility, write to the region 252 is also skipped and set as an unused region.

That is, in this case, the replacement destination of the region 251 is set to the region 251, the replacement destination of the region 252 is set to the region 254, the replacement destination of the region 253 is set to the region 255, and the replacement destination of the region 254 is set to the region 256. With regard to the region 251, the region 251 may be set as a replacement destination, or write may be continued.

As a specific example of data to be written, the four blocks of the blocks 0 to 3 are written in the region 251 by the optical pickup 202-1, and the four blocks of the blocks 4 to 7 are written in the region 254 by the optical pickup 202-2. The four blocks of the blocks 8 to 11 are written in the region 255 by the optical pickup 202-3, and the four blocks of the blocks 12 to 15 are written in the region 256 by the optical pickup 202-4.

As shown in FIG. 17F, when the disc 11 is a non-rewritable recording medium, since write is unable to be performed to a region where write has already been performed, the regions 252 to 254 are set as an unused region. In this case, as described with reference to FIG. 17C, data my be written in the region 251. Such a case is shown in FIG. 17F.

That is, in this case, the replacement destination of the region 251 is set to the region 251, the replacement destination of the region 252 is set to the region 255, the replacement destination of the region 253 is set to the region 256, and the replacement destination of the region 254 is set to the region 257. The region 251 is set as a region where write is continued.

As a specific example of data to be written, the four blocks of the blocks 0 to 3 are written in the region 251 by the optical pickup 202-1, and the four blocks of the blocks 4 to 7 are written in the region 255 by the optical pickup 202-2. The four blocks of the blocks 8 to 11 are written in the region 256 by the optical pickup 202-3, and the four blocks of the blocks 12 to 15 are written in the region 257 by the optical pickup 202-4.

As described above, when defect occurs at the head of the region 253 which is a region located intermediately from among the four regions where data write is performed, if the disc 11 is a rewritable recording medium, as shown in FIG. 17E, replacement destinations are determined such that a region where defect occurs and a region near the region are set as an unused region, and data is written in regions where write has already been performed and no defect has occurred and a region which is newly secured. When the disc 11 is a non-rewritable recording medium, as shown in FIG. 17F, replacement destinations are determined such that regions located before and after a region where write has already been performed and defect has occurred are set as an unused region, and data is written in adjacent regions before and after the unused region.

Figures 18A, 18B, 18C, 18D:
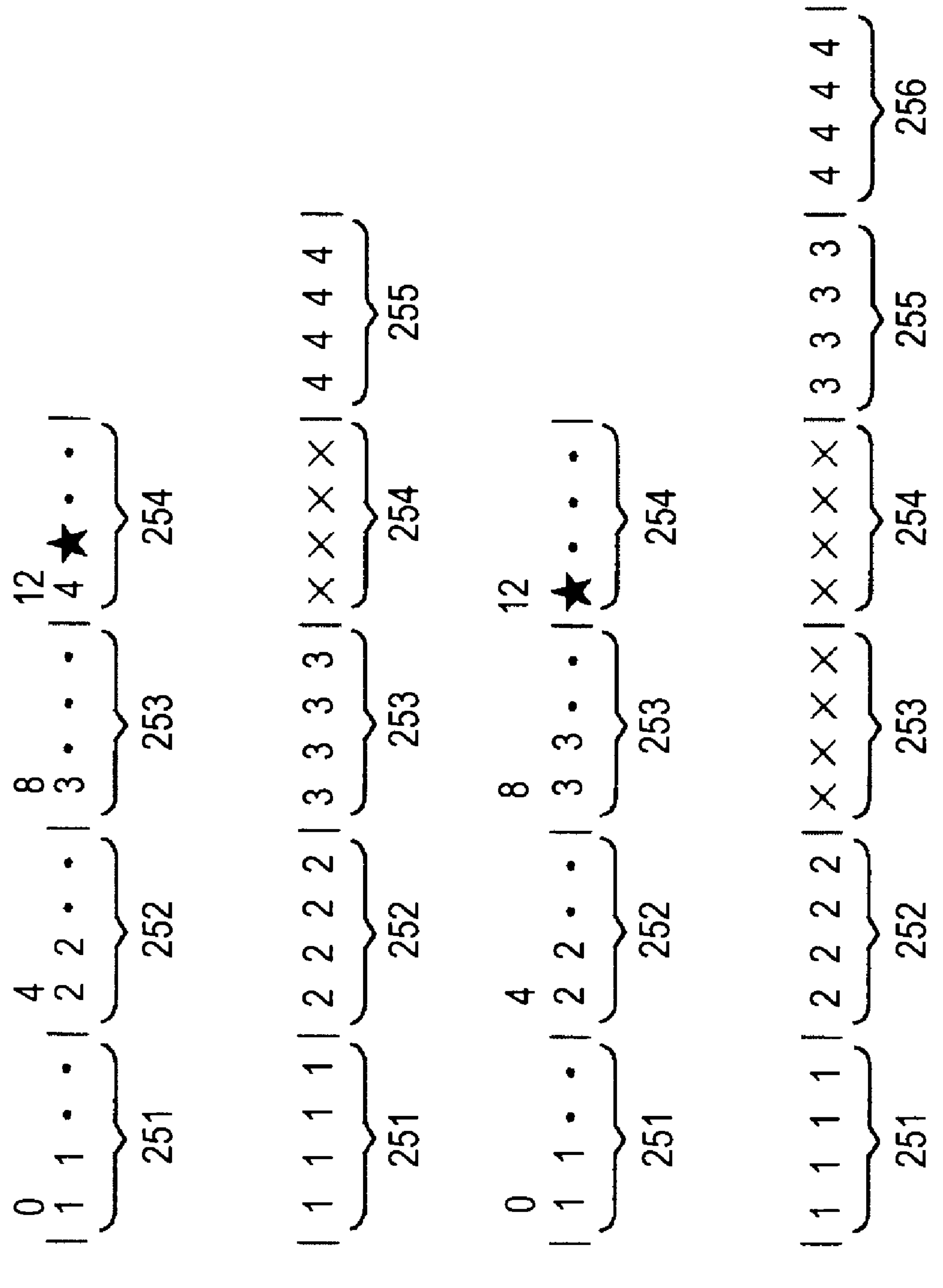
FIGS. 18A to 18D are diagrams illustrating a way to determine a replacement destination.

Next, a case will be described where defect occurs in the region 254 where data is written by the optical pickup 202-4. When defect occurs in the optical pickup 202-4, for example, as shown in FIG. 18A, when defect occurs at the time of write of the block 13, the region 254 is skipped as an unused region. If write to the region 254 is skipped, for example, it is thought that write is performed as shown in FIG. 18B.

As shown in FIG. 18B, when the disc 11 is a rewritable recording medium, first, as described above, the region 254 where defect has occurred is set as an unused region. With regard to the region 251, the region 252, and the region 253, data which has already been written is deleted, and then data is written again. Further, data write is continued. Data is also written in a new region 255. That is, in this case, the replacement destination of the region 254 is set to the region 255.

Specifically, the four blocks of the blocks 0 to 3 are written in the region 251 by the optical pickup 202-1, and the four blocks of the blocks 4 to 7 are written in the region 252 by the optical pickup 202-2. The four blocks of the blocks 8 to 11 are written in the region 253 by the optical pickup 202-3, and the four blocks of the blocks 12 to 15 are written in the region 255 by the optical pickup 202-4.

If defect occurs in the intermediate portion of the region 254, even when the disc 11 is a non-rewritable recording medium, similarly to a rewritable recording medium, write is performed as shown in FIG. 18B. Although detailed description will be omitted, write is performed with the region 255 as the replacement destination of the region 254.

As described above, when defect occurs in the intermediate portion of the region 254 located at the rearmost from among the four regions where data write is performed, regardless of whether the disc 11 is a rewritable recording medium or a non-rewritable recording medium, as shown in FIG. 18B, a region where defect occurs is set as an unused region, a region adjacent to a region where defect occurs is secured as the region of a replacement destination, and data is written in the region.

As shown in FIG. 18C, when defect occurs in a portion at the head of the region 254 located at the rearmost from among the four regions where data write is performed, in other words, in the state shown in FIG. 18D, when defect occurs at the time of write of the block 12, the region 254 is skipped as an unused region. If write to the region 254 is skipped, for example, it is thought that write is performed as shown in FIG. 18D.

As shown in FIG. 18D, when the disc 11 is a rewritable recording medium, first, as described above, the region 254 is set as an unused region. With regard to the region 251 and the region 252, data which has already been written is deleted, and then data is written again. Data is also written in new regions 255 and 256.

In this case, although data has already been written in the region 253, and defect may not occur in the region 253, since defect occurs at the head of the region 254, there is a possibility that defect occurs in a portion where write is not yet performed (portions where the blocks 10 and 11 will be written) before the head of the region 254, that is, in the second half portion of the region 253. Due to such a possibility, write to the region 253 is also skipped and set as an unused region.

That is, in this case, the replacement destination of the region 251 is set to the region 251, the replacement destination of the region 252 is set to the region 252, the replacement destination of the region 253 is set to the region 255, and the replacement destination of the region 254 is set to the region 256. With regard to the region 251 and the region 252, the region 251 and the region 252 may be set as a replacement destination and data may be written again, or write may be continued.

As a specific example of data to be written, the four blocks of the blocks 0 to 3 are written in the region 251 by the optical pickup 202-1, and the four blocks of the blocks 4 to 7 are written in the region 252 by the optical pickup 202-2. The four blocks of the blocks 8 to 11 are written in the region 255 by the optical pickup 202-3, and the four blocks of the blocks 12 to 15 are written in the region 256 by the optical pickup 202-4.

If defect has occurred at the head of the region 254, even when the disc 11 is a non-rewritable recording medium, similarly to the rewritable recording medium, write is performed as shown in FIG. 18D. Although detailed description will be omitted, write is performed with the region 255 and the region 256 as the replacement destinations of the region 253 and the region 254.

As described above, when defect has occurred in the head portion of the region 254 which is the last region, regardless of whether the disc 11 is a rewritable recording medium or a non-rewritable recording medium, as shown in FIG. 18D, replacement destinations are determined such that a region where defect has occurred and a region before the region are set as an unused region, regions adjacent to the region where defect has occurred are secured as the regions of the replacement destinations, and data is written in the regions.

[Determination of Replacement destination when defect has Occurred at Two Places]

Figure 19A:
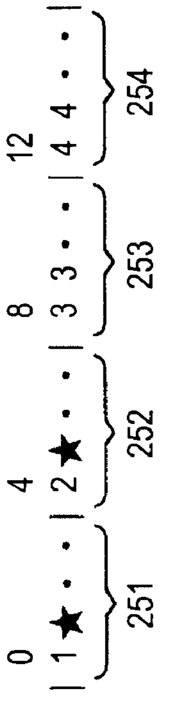
FIGS. 19A to 19C are diagrams illustrating a way to determine a replacement destination.

Next, a case where defect has occurred at two places will be described. First, as shown in FIG. 19A, a case will be described where defect has occurred in the region 251 where data is written by the optical pickup 202-1 and the region 252 where data is written by the optical pickup 202-2.

Figure 19B:
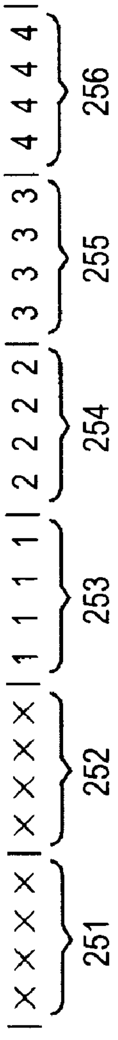

As shown in FIG. 19B, when the disc 11 is a rewritable recording medium, the region 251 and the region 252 where defect has occurred are set as an unused region. With regard to the region 253 and the region 254, data which has already been written is deleted, and then data is written again. Data is also written in new regions 255 and 256.

That is, in this case, the replacement destination of the region 251 is set to the region 253, the replacement destination of the region 252 is set to the region 254, the replacement destination of the region 253 is set to the region 255, and the replacement destination of the region 254 is set to the region 256.

As a specific example of data to be written, the four blocks of the blocks 0 to 3 are written in the region 253 by the optical pickup 202-1, and the four blocks of the blocks 4 to 7 are written in the region 254 by the optical pickup 202-2. The four blocks of the blocks 8 to 11 are written in the region 255 by the optical pickup 202-3, and the four blocks of the blocks 12 to 15 are written in the region 256 by the optical pickup 202-4.

As described above, when defect has occurred at two places, if the disc 11 is a rewritable recording medium, as shown in FIG. 19B, replacement destinations are determined such that regions where defect has occurred are set as an unused region, regions adjacent to the regions where defect has occurred are secured as the regions of the replacement destinations, and data is written in the regions.

Figure 19C:
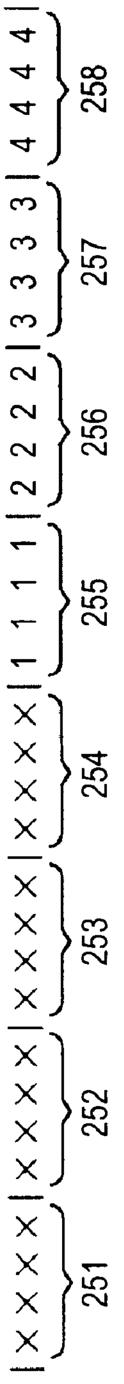

As shown in FIG. 19C, when the disc 11 is a rewritable recording medium, the regions 251 to 254 where defect has occurred are set as an unused region. Data is written in new regions 255 to 258.

That is, in this case, the replacement destination of the region 251 is set to the region 255, the replacement destination of the region 252 is set to the region 256, the replacement destination of the region 253 is set to the region 257, and the replacement destination of the region 254 is set to the region 258.

As a specific example of data to be written, the four blocks of the blocks 0 to 3 are written in the region 255 by the optical pickup 202-1, and the four blocks of the blocks 4 to 7 are written in the region 256 by the optical pickup 202-2. The four blocks of the blocks 8 to 11 are written in the region 257 by the optical pickup 202-3, and the four blocks of the blocks 12 to 15 are written in the region 258 by the optical pickup 202-4.

As described above, when defect has occurred at two places, if the disc 11 is a non-rewritable recording medium, as shown in FIG. 19C, replacement destinations are determined such that all regions where write has been performed, including the regions where defect has occurred, are set as an unused region, regions adjacent to the regions where defect has occurred are secured as the regions of the replacement destinations, and data is written in the regions.

Figures 20A, 20B, 20C, 20D, 20E:
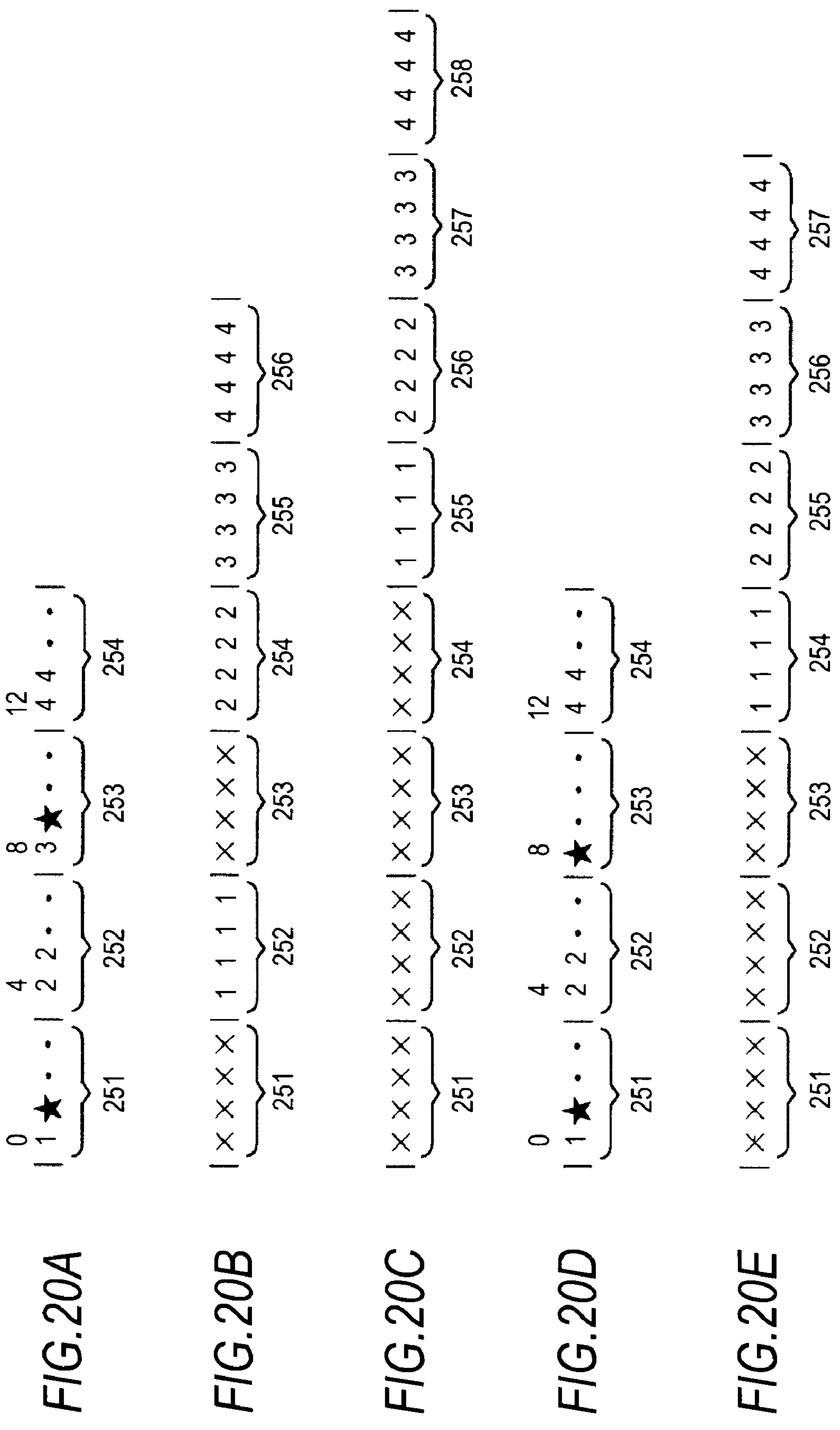
FIGS. 20A to 20E are diagrams illustrating a way to determine a replacement destination.

Next, as shown in FIG. 20A, a case will be described where defect has occurred in the region 251 where data is written by the optical pickup 202-1 and the region 253 where data is written by the optical pickup 202-3. In this case, defect has occurred in the separate regions, and each place where defect has occurred is a place other than the head of the corresponding region.

As shown in FIG. 20B, when the disc 11 is a rewritable recording medium, the region 251 and the region 253 where defect has occurred are set as an unused region. With regard to the region 252 and the region 254, data which has already been written is deleted, and then data is written again. Data is also written in new regions 255 and 256.

That is, in this case, the replacement destination of the region 251 is set to the region 252, the replacement destination of the region 252 is set to the region 254, the replacement destination of the region 253 is set to the region 255, and the replacement destination of the region 254 is set to the region 256.

As a specific example of data to be written, the four blocks of the blocks 0 to 3 are written in the region 252 by the optical pickup 202-1, and the four blocks of the blocks 4 to 7 are written in the region 254 by the optical pickup 202-2. The four blocks of the blocks 8 to 11 are written in the region 255 by the optical pickup 202-3, and the four blocks of the blocks 12 to 15 are written in the region 256 by the optical pickup 202-4.

As described above, when defect has occurred in the two separate regions, and each place where defect has occurred is a portion other than the head of the corresponding region, if the disc 11 is a rewritable recording medium, as shown in FIG. 20B, replacement destinations are determined such that the regions where defect has occurred are set as an unused region, regions adjacent to the regions where defect has occurred are secured as the regions of the replacement destinations, and data is written in the regions.

As shown in FIG. 20C, when the disc 11 is a rewritable recording medium, the regions 251 to 254 where defect has occurred are set as an unused region. Data is written in new regions 255 to 258.

That is, in this case, the replacement destination of the region 251 is set to the region 255, the replacement destination of the region 252 is set to the region 256, the replacement destination of the region 253 is set to the region 257, and the replacement destination of the region 254 is set to the region 258.

As a specific example of data to be written, the four blocks of the blocks 0 to 3 are written in the region 255 by the optical pickup 202-1, and the four blocks of the blocks 4 to 7 are written in the region 256 by the optical pickup 202-2. The four blocks of the blocks 8 to 11 are written in the region 257 by the optical pickup 202-3, and the four blocks of the blocks 12 to 15 are written in the region 258 by the optical pickup 202-4.

As described, when defect has occurred in the two separate regions, and each place where defect has occurred is a portion other than the head of the corresponding region, if the disc 11 is a non-rewritable recording medium, as shown in FIG. 20C, replacement destinations are determined such that all regions where write has been performed, including the regions where defect has occurred, are set as an unused region, regions adjacent to the regions where defect has occurred are secured as the regions of the replacement destinations, and data is written in the regions.

The situation shown in FIG. 20D refers to a case where defect has occurred in the region 251 where data is written by the optical pickup 202-1 and the region 253 where data is written by the optical pickup 202-3. Meanwhile, at least one (in the example shown in FIG. 20D, a place of defect in the region 253 from among the places where defect has occurred is a place at the head of the region.

As shown in FIG. 20E, when the disc 11 is a rewritable recording medium, the region 251 and the region 253 where defect has occurred are set as an unused region. Since there is a possibility that defect occurs in the region 252, the region 252 is also set as an unused region. With regard to the region 254, data which has already been written is deleted, and then data is written again. Data is also written in new regions 255 to 257.

That is, in this case, the replacement destination of the region 251 is set to the region 254, the replacement destination of the region 252 is set to the region 255, the replacement destination of the region 253 is set to the region 256, and the replacement destination of the region 254 is set to the region 257.

As a specific example of data to be written, the four blocks of the blocks 0 to 3 are written in the region 254 by the optical pickup 202-1, and the four blocks of the blocks 4 to 7 are written in the region 255 by the optical pickup 202-2. The four blocks of the blocks 8 to 11 are written in the region 256 by the optical pickup 202-3, and the four blocks of the blocks 12 to 15 are written in the region 257 by the optical pickup 202-4.

As described above, when defect has occurred in the two regions at separate positions from among the four regions where data write is performed, and at least one of the places where defect has occurred is the head portion of the corresponding region, if the disc 11 is a rewritable recording medium, as shown in FIG. 20E, replacement destinations are determined such that the regions where defect has occurred and a region sandwiched between the regions are set as an unused region, regions adjacent to the regions where defect has occurred are secured as the regions of the replacement destination, and data is written in the regions.

When defect has occurred as shown in FIG. 20D, if the disc 11 is a non-rewritable recording medium, as shown in FIG. 20C, the regions 251 to 254 where defect has occurred are set as an unused region. Data is written in new regions 255 to 258. In this case, replacement destinations are determined in the same manner as when defect has occurred as shown in FIG. 20A. In other words, when the disc 11 is a non-rewritable recording medium, if defect has occurred in two separate regions (the region 251 and the region 253), all regions where write has already been performed are set as an unused region, and regions adjacent to the unused region are set as a replacement destination.

As described above, when defect has occurred in the two regions at separate positions from among the four regions where data write is performed, and at least one of the places where defect has occurred is the head portion of the corresponding region, if the disc 11 is a non-rewritable recording medium, as shown in FIG. 20C, replacement destinations are determined such that all regions where write has been performed, including the regions where defect has occurred, are set as an unused region, regions adjacent to the regions where defect has occurred are secured as the regions of the replacement destinations, and data is written in the regions.

Figures 21A, 21B, 21C, 21D, 21E:
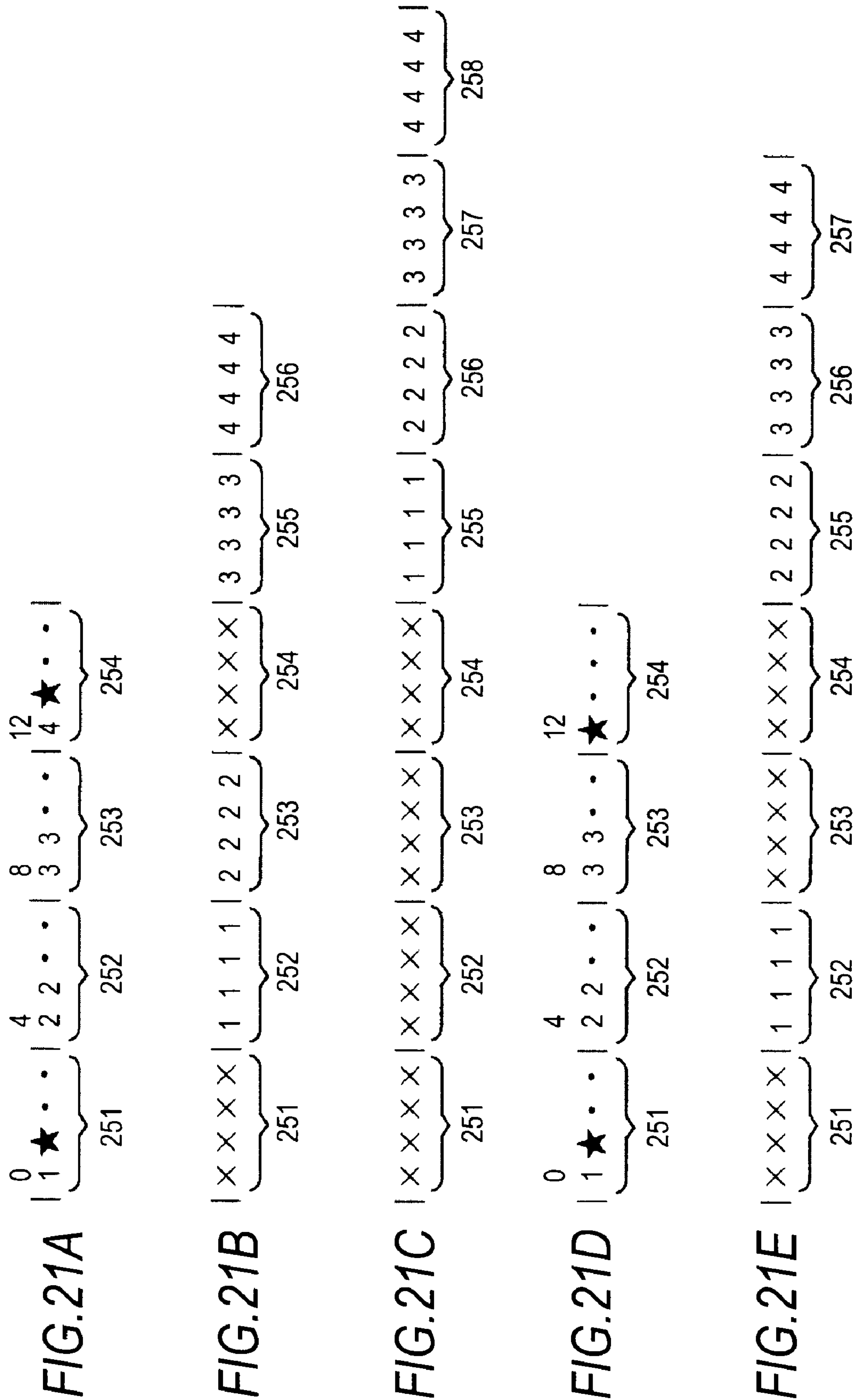
FIGS. 21A to 21E are diagrams illustrating a way to determine a replacement destination.

Next, as shown in FIG. 21A, a case will be described where defect has occurred in the region 251 where data is written by the optical pickup 202-1 and the region 254 where data is written by the optical pickup 202-4. In this case, defect occurs in separate regions, and each place where defect has occurred is a place other than the head of the corresponding region.

As shown in FIG. 21B, when the disc 11 is a rewritable recording medium, the region 251 and the region 254 where defect has occurred are set as an unused region. With regard to the regions 252 and the region 253, data which has already been written is deleted, and then data is rewritten again. Data is also written in new regions 255 and 256.

That is, in this case, the replacement destination of the region 251 is set to the region 252, the replacement destination of the region 252 is set to the region 253, the replacement destination of the region 254 is set to the region 255, and the replacement destination of the region 254 is set to the region 256.

As a specific example of data to be written, the four blocks of the blocks 0 to 3 are written in the region 252 by the optical pickup 202-1, and the four blocks of the blocks 4 to 7 are written in the region 253 by the optical pickup 202-2. The four blocks of the blocks 8 to 11 are written in the region 255 by the optical pickup 202-3, and the four blocks of the blocks 12 to 15 are written in the region 256 by the optical pickup 202-4.

As described above, when defect has occurred in the two separate regions from among the four regions where data is written, and each place where defect has occurred is a portion other than the head of the corresponding region, if the disc 11 is a rewritable recording medium, as shown in FIG. 21B, replacement destinations are determined such that the region where defect has occurred are set as an unused region, regions adjacent to the regions where defect has occurred are secured as the regions of the replacement destinations, and data is written in the regions.

As shown in FIG. 21C, when the disc 11 is a rewritable recording medium, all the regions 251 to 254 including the regions where defect has occurred are set as an unused region. Data is written in new regions 255 to 258.

That is, in this case, the replacement destination of the region 251 is set to the region 255, the replacement destination of the region 252 is set to the region 256, the replacement destination of the region 254 is set to the region 257, and the replacement destination of the region 254 is set to the region 258.

As a specific example of data to be written, the four blocks of the blocks 0 to 3 are written in the region 255 by the optical pickup 202-1, and the four blocks of the blocks 4 to 7 are written in the region 256 by the optical pickup 202-2. The four blocks of the blocks 8 to 11 are written in the region 257 by the optical pickup 202-3, and the four blocks of the blocks 12 to 15 are written in the region 258 by the optical pickup 202-4.

As described above, when defect has occurred in the two separate regions from among the four regions where data is written, and each place where defect has occurred is a portion other than the head of the corresponding region, if the disc 11 is a non-rewritable recording medium, as shown in FIG. 21C, replacement destinations are determined such that all regions where write has been performed, including the regions where defect has occurred, are set as an unused region, regions adjacent to the regions where defect has occurred are secured as the regions of the replacement destinations, and data is written in the regions.

The situation shown in FIG. 21D refers to a case where defect has occurred in the region 251 where data is written by the optical pickup 202-1 and the region 254 where data is written by the optical pickup 202-4. Meanwhile, at least one of the places where defect has occurred is a place at the head of the corresponding region.

As shown in FIG. 21E, when the disc 11 is a rewritable recording medium, the region 251 and the region 254 where defect has occurred are set as an unused region. Since there is a possibility that defect occurs in the region 253, the region 253 is also set as an unused region. With regard to the region 252, data which has already been written is deleted, and then data is written again. Data is also written in new regions 255 to 257.

That is, in this case, the replacement destination of the region 251 is set to the region 252, the replacement destination of the region 252 is set to the region 255, the replacement destination of the region 254 is set to the region 256, and the replacement destination of the region 254 is set to the region 257.

As a specific example of data to be written, the four blocks of the blocks 0 to 3 are written in the region 252 by the optical pickup 202-1, and the four blocks of the blocks 4 to 7 are written in the region 255 by the optical pickup 202-2. The four blocks of the blocks 8 to 11 are written in the region 256 by the optical pickup 202-3, and the four blocks of the blocks 12 to 15 are written in the region 257 by the optical pickup 202-4.

As described above, when defect has occurred in the two separate regions from among the four regions where data is written, and at least one of the places where defect has occurred is the head portion of the corresponding region, if the disc 11 is a rewritable recording medium, as shown in FIG. 21E, replacement destinations are determined such that the regions where defect has occurred and a region before the region where defect has occurred at the head are set as an unused region, regions adjacent to the regions where defect has occurred are secured as the regions of the replacement destinations, and data is written in the regions.

As shown in FIG. 21C, when the disc 11 is a non-rewritable recording medium, all the regions 251 to 254 including the regions where defect has occurred are set as an unused region. Data is written in new regions 255 to 258. In this case, replacement destinations are determined in the same manner as shown in FIG. 21A. In other words, when the disc 11 is a non-rewritable recording medium, if defect has occurred in the two separate regions (the region 251 and the region 254), all regions where write has already been performed are set as an unused region, and regions adjacent to the unused region are set as the replacement destinations.

As described above, when defect has occurred in the two separate regions from among the four regions where data is written, and at least one of the places where defect has occurred is the head portion of the corresponding region, if the disc 11 is a non-rewritable recording medium, as shown in FIG. 21C, replacement destinations are determined such that all regions where write has been performed, including the regions where defect has occurred, are set as an unused region, regions adjacent to the regions where defect has occurred are secured as the regions of the replacement destinations, and data is written in the regions.

Figures 22A, 22B, 22C, 22D, 22E, 22F, 22G, 22H:
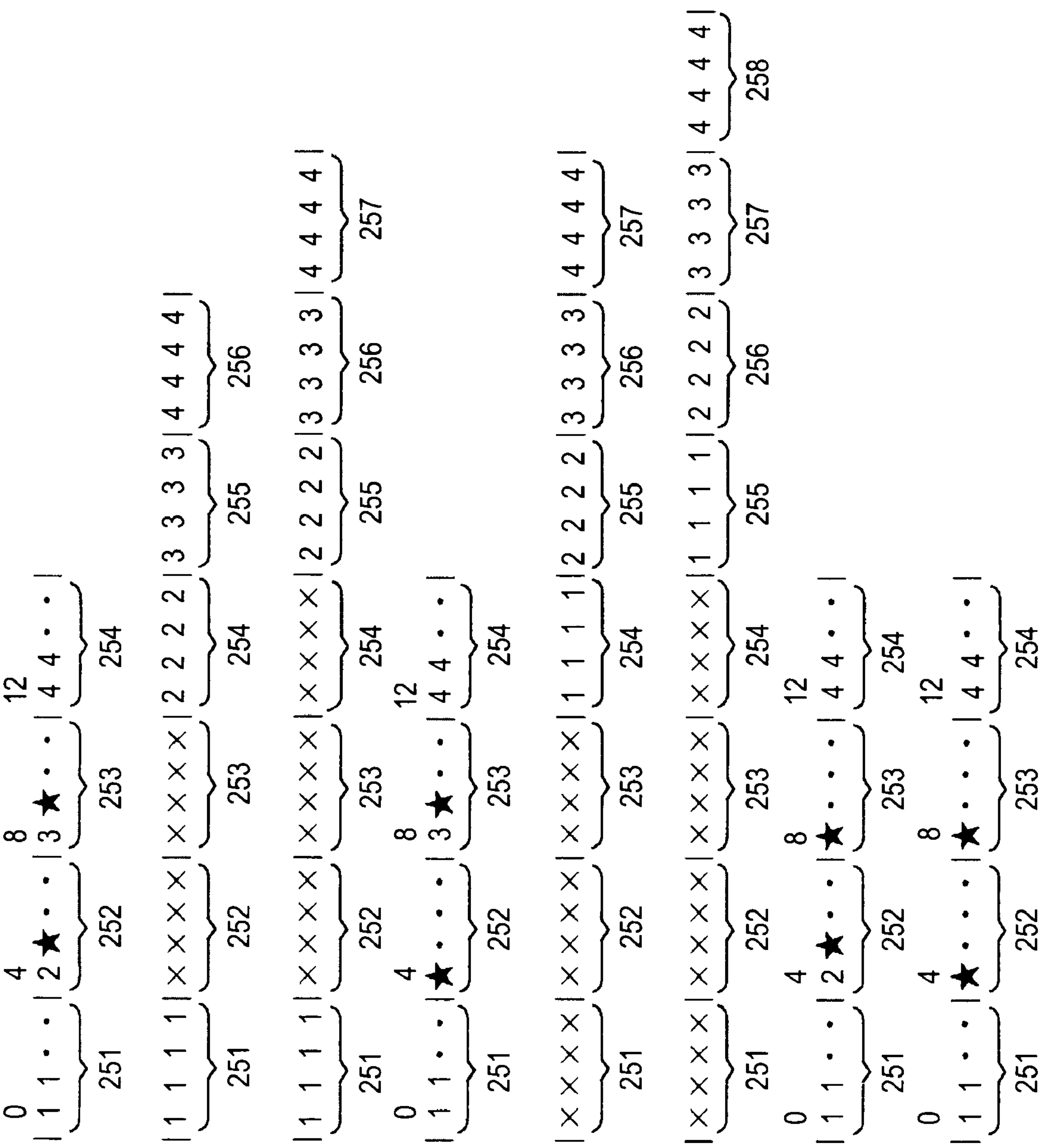
FIGS. 22A to 22H are diagrams illustrating a way to determine a replacement destination.

Next, as shown in FIG. 22A, a case will be described where defect has occurred in the region 252 where data is written by the optical pickup 202-2 and the region 253 where data is written by the optical pickup 202-3. In this case, defect occurs in separate regions, and each place where defect has occurred is a place other than the head of the corresponding region.

As shown in FIG. 22B, when the disc 11 is a rewritable recording medium, the region 252 and the region 253 where defect has occurred are set as an unused region. With regard to the regions 251 and the region 254, data which has already been written is deleted, and then data is written again. Data is also written in new regions 255 and 256.

That is, in this case, the replacement destination of the region 251 is set to the region 251 (in this case, set as a region where data write is continued), the replacement destination of the region 252 is set to the region 254, the replacement destination of the region 253 is set to the region 255, and the replacement destination of the region 253 is set to the region 256.

As a specific example of data to be written, the four blocks of the blocks 0 to 3 are written in the region 251 by the optical pickup 202-1, and the four blocks of the blocks 4 to 7 are written in the region 254 by the optical pickup 202-2. The four blocks of the blocks 8 to 11 are written in the region 255 by the optical pickup 202-3, and the four blocks of the blocks 12 to 15 are written in the region 256 by the optical pickup 202-4.

As described above, when defect has occurred in two regions located intermediately from among the four regions where data is written, and each place where defect has occurred is a portion other than the head of the corresponding region, if the disc 11 is a rewritable recording medium, as shown in FIG. 22B, replacement destinations are determined such that the regions where defect has occurred are set as an unused region, regions adjacent to the regions where defect has occurred are secured as the regions of the replacement destinations, and data is written in the regions.

As shown in FIG. 22C, when the disc 11 is a rewritable recording medium, the region 252 and the region 253 where defect has occurred are set as an unused region. The region 254 is also set as an unused region. Data write is continued to the region 251, and data is written in new regions 255 to 257.

That is, in this case, the replacement destination of the region 251 is set to the region 251 (in this case, set as a region where data write is continued), the replacement destination of the region 252 is set to the region 255, the replacement destination of the region 253 is set to the region 256, and the replacement destination of the region 253 is set to the region 257.

As a specific example of data to be written, the four blocks of the blocks 0 to 3 are written in the region 251 by the optical pickup 202-1, and the four blocks of the blocks 4 to 7 are written in the region 255 by the optical pickup 202-2. The four blocks of the blocks 8 to 11 are written in the region 256 by the optical pickup 202-3, and the four blocks of the blocks 12 to 15 are written in the region 257 by the optical pickup 202-4.

As described above, when defect has occurred in the two regions located intermediately from among the four regions where data is written, and each place where defect has occurred is a portion other than the head of the corresponding region, if the disc 11 is a non-rewritable recording medium, as shown in FIG. 22C, replacement destinations are determined such that multiple regions where write has been performed, including the regions where defect has occurred, are set as an unused region, regions adjacent to the regions where defect has occurred are secured as the regions of the replacement destinations, and data is written in the regions.

The situation shown in FIG. 22D refers to a case where defect has occurred in the region 252 where data is written by the optical pickup 202-2 and the region 253 where data is written by the optical pickup 202-3. Meanwhile, at least one from among the places where defect has occurred is a place at the head of the corresponding region. In this case, the region where defect has occurred at the head is a region located ahead from among the two regions where defect has occurred.

As shown in FIG. 22E, when the disc 11 is a rewritable recording medium, the region 252 and the region 253 where defect has occurred are set as an unused region. Since there is a possibility that defect occurs in the region 251, the region 251 is also set as an unused region. With regard to the region 254, data which has already been written is deleted, and then data is written again. Data is also written in new regions 255 to 257.

That is, in this case, the replacement destination of the region 251 is set to the region 254, the replacement destination of the region 252 is set to the region 255, the replacement destination of the region 253 is set to the region 256, and the replacement destination of the region 253 is set to the region 257.

As a specific example of data to be written, the four blocks of the blocks 0 to 3 are written in the region 254 by the optical pickup 202-1, and the four blocks of the blocks 4 to 7 are written in the region 255 by the optical pickup 202-2. The four blocks of the blocks 8 to 11 are written in the region 256 by the optical pickup 202-3, and the four blocks of the blocks 12 to 15 are written in the region 257 by the optical pickup 202-4.

As described above, when defect has occurred in the two separate regions from among the four regions where data is written, and at least one of the places where defect has occurred is the head portion of the corresponding region, if the disc 11 is a rewritable recording medium, as shown in FIG. 22E, replacement destinations are determined such that the regions where defect has occurred and a region before the region where defect has occurred at the head are set as an unused region, regions adjacent to the regions where defect has occurred are secured as the regions of the replacement destinations, and data is written in the regions.

As shown in FIG. 22F, when the disc 11 is a non-rewritable recording medium, all the regions 251 to 254 including the regions where defect has occurred are set as an unused region. Data is written in new regions 255 to 258.

That is, in this case, the replacement destination of the region 251 is set to the region 255, the replacement destination of the region 252 is set to the region 256, the replacement destination of the region 253 is set to the region 257, and the replacement destination of the region 253 is set to the region 258.

As a specific example of data to be written, the four blocks of the blocks 0 to 3 are written in the region 255 by the optical pickup 202-1, and the four blocks of the blocks 4 to 7 are written in the region 256 by the optical pickup 202-2. The four blocks of the blocks 8 to 11 are written in the region 257 by the optical pickup 202-3, and the four blocks of the blocks 12 to 15 are written in the region 258 by the optical pickup 202-4.

As described above, when defect has occurred in the two separate regions from among the four regions where data is written, and at least one of the places where defect has occurred is the head portion of the corresponding region, if the disc 11 is a non-rewritable recording medium, as shown in FIG. 22F, replacement destinations are determined such that all regions where write has been performed, including the regions where defect has occurred, are set as an unused region, regions adjacent to the regions where defect has occurred are secured as the regions of the replacement destinations, and data is written in the regions.

The situation shown in FIG. 22G refers to a case where defect has occurred in the region 252 where data is written by the optical pickup 202-2 and the region 253 where data is written by the optical pickup 202-3. Meanwhile, at least one of the places where defect has occurred is a place at the head of the corresponding region. In this case, the region where defect has occurred at the head is a region located astern from among the two regions where defect has occurred.

In this case, similarly to a case where defect has occurred as shown in FIG. 22A, when the disc 11 is a rewritable recording medium, the replacement destinations are determined as shown in FIG. 22B, and when the disc 11 is a non-rewritable recording medium, the replacement destinations are determined as shown in FIG. 22C.

The situation shown in FIG. 22H refers to a case where defect has occurred in the region 252 where data is written by the optical pickup 202-2 and the region 253 where data is written by the optical pickup 202-3. Meanwhile, each place where defect has occurred is a place at the head of the corresponding region.

In this case, similarly to a case where defect has occurred as shown in FIG. 22D, when the disc 11 is a rewritable recording medium, the replacement destinations are determined as shown in FIG. 22E, and when the disc 11 is a non-rewritable recording medium, the replacement destinations are determined as shown in FIG. 22F.

Figures 23A, 23B, 23C, 23D, 23E, 23F, 23G, 23H:
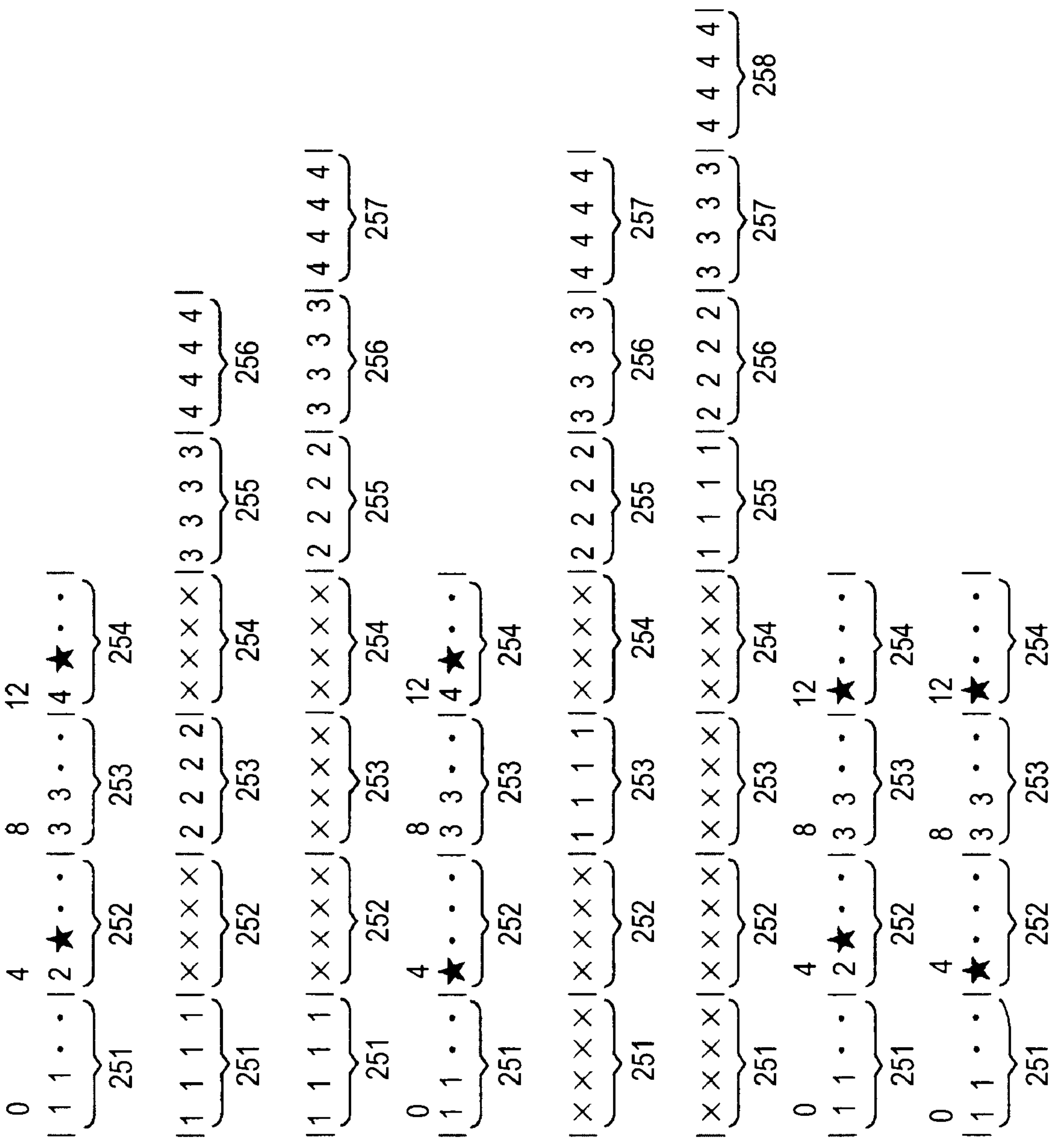
FIGS. 23A to 23H are diagrams illustrating a way to determine a replacement destination.

Next, as shown in FIG. 23A, a case will be described where defect has occurred in the region 252 where data is written by the optical pickup 202-2 and the region 254 where data is written by the optical pickup 202-4. The state shown in FIG. 23A, defect has occurred in separate regions, and each place where defect has occurred is a place other than the head of the corresponding region.

As shown in FIG. 23B, when the disc 11 is a rewritable recording medium, the region 252 and the region 254 where defect has occurred are set as an unused region. With regard to the region 251 and the region 253, data which has already been written is deleted, and then data is written again. Data is also written in new regions 255 and region 256.

That is, in this case, the replacement destination of the region 251 is set to the region 251 (in this case, set as a region where data write is continued), the replacement destination of the region 252 is set to the region 253, the replacement destination of the region 254 is set to the region 255, and the replacement destination of the region 254 is set to the region 256.

As a specific example of data to be written, the four blocks of the blocks 0 to 3 are written in the region 251 by the optical pickup 202-1, and the four blocks of the blocks 4 to 7 are written in the region 253 by the optical pickup 202-2. The four blocks of the blocks 8 to 11 are written in the region 255 by the optical pickup 202-3, and the four blocks of the blocks 12 to 15 are written in the region 256 by the optical pickup 202-4.

As described above, when defect has occurred in the region located intermediately from among the four regions where write is performed and the region located at the rearmost, and each place where defect has occurred is a portion other than the head of the corresponding region, if the disc 11 is a rewritable recording medium, as shown in FIG. 23B, replacement destinations are determined such that the regions where defect has occurred are set as an unused region, regions adjacent to the regions where defect has occurred are secured as the regions of the replacement destination, and data is written in the regions.

As shown in FIG. 23C, when the disc 11 is a rewritable recording medium, the region 252 and the region 254 where defect has occurred are set as an unused region. The region 253 is also set as an unused region. With regard to the region 251, data write is continued, and data is written in new regions 255 and 257.

That is, in this case, the replacement destination of the region 251 is set to the region 251 (in this case, set as a region where data write is continued), the replacement destination of the region 252 is set to the region 255, the replacement destination of the region 254 is set to the region 256, and the replacement destination of the region 254 is set to the region 257.

As a specific example of data to be written, the four blocks of the blocks 0 to 3 are written in the region 251 by the optical pickup 202-1, and the four blocks of the blocks 4 to 7 are written in the region 255 by the optical pickup 202-2. The four blocks of the blocks 8 to 11 are written in the region 256 by the optical pickup 202-3, and the four blocks of the blocks 12 to 15 are written in the region 257 by the optical pickup 202-4.

As described above, when defect has occurred in the region located intermediately from among the four regions where write is performed and the region located at the rearmost, and each place where defect has occurred is a portion other than the head of the corresponding region, if the disc 11 is a non-rewritable recording medium, as shown in FIG. 23C, replacement destinations are determined such that multiple regions where write has been performed, including the regions where defect has occurred, are set as an unused region, regions adjacent to the regions where defect has occurred are secured as the regions of the replacement destinations, and data is written in the regions.

The situation shown in FIG. 23D refers to a case where defect has occurred in the region 252 where data is written by the optical pickup 202-2 and the region 254 where data is written by the optical pickup 202-4. Meanwhile, at least one of the places where defect has occurred is a place at the head of the corresponding region. In this case, the region where defect has occurred at the head is a region located ahead from among the two regions where defect has occurred.

As shown in FIG. 23E, when the disc 11 is a rewritable recording medium, the region 252 and the region 254 where defect has occurred are set as an unused region. Since there is a possibility that defect occurs in the region 251, the region 251 is also set as an unused region. With regard to the region 253, data which has already been written is deleted, and then data is written again. Data is also written in new regions 255 to 257.

That is, in this case, the replacement destination of the region 251 is set to the region 253, the replacement destination of the region 252 is set to the region 255, the replacement destination of the region 254 is set to the region 256, and the replacement destination of the region 254 is set to the region 257.

As a specific example of data to be written, the four blocks of the blocks 0 to 3 are written in the region 253 by the optical pickup 202-1, and the four blocks of the blocks 4 to 7 are written in the region 255 by the optical pickup 202-2. The four blocks of the blocks 8 to 11 are written in the region 256 by the optical pickup 202-3, and the four blocks of the blocks 12 to 15 are written in the region 257 by the optical pickup 202-4.

As described above, when defect has occurred in the two separate regions, and at least one of the places where defect has occurred is the head portion of the corresponding region, if the disc 11 is a rewritable recording medium, as shown in FIG. 23E, replacement destinations are determined such that the regions where defect has occurred and a region before the region where defect has occurred at the head are set as an unused region, regions adjacent to the region where defect has occurred are secured as the regions of the replacement destinations, and data is written in the regions.

As shown in FIG. 23F, when the disc 11 is a non-rewritable recording medium, all the regions 251 to 254 including the regions where defect has occurred are set as an unused region. Data is written in new regions 255 to 258.

That is, in this case, the replacement destination of the region 251 is set to the region 255, the replacement destination of the region 252 is set to the region 256, the replacement destination of the region 254 is set to the region 257, and the replacement destination of the region 254 is set to the region 258.

As a specific example of data to be written, the four blocks of the blocks 0 to 3 are written in the region 255 by the optical pickup 202-1, and the four blocks of the blocks 4 to 7 are written in the region 256 by the optical pickup 202-2. The four blocks of the blocks 8 to 11 are written in the region 257 by the optical pickup 202-3, and the four blocks of the blocks 12 to 15 are written in the region 258 by the optical pickup 202-4.

As described above, when defect has occurred in the two separate regions, and at least one of the places where defect has occurred is the head portion of the corresponding region, if the disc 11 is a non-rewritable recording medium, as shown in FIG. 23F, replacement destinations are determined such that all regions where write has been performed, including the regions where defect has occurred, are set as an unused region, regions adjacent to the regions where defect has occurred are secured as the regions of the replacement destinations, and data is written in the regions.

The situation shown in FIG. 23G refers to a case where defect has occurred in the region 252 where data is written by the optical pickup 202-2 and the region 254 where data is written by the optical pickup 202-4. Meanwhile, at least one of the places where defect has occurred is a place at the head of the corresponding region. In this case, the region where defect has occurred at the head is a region located astern from among the two regions where defect has occurred.

In this case, regardless of whether the disc 11 is a writable recording medium or a non-writable recording medium, the replacement destinations are determined as shown in FIG. 23C, and data write is performed.

The situation shown in FIG. 23H refers to a case where defect has occurred in the region 252 where data is written by the optical pickup 202-2 and the region 254 where data is written by the optical pickup 202-4. Meanwhile, each place where defect has occurred is a place at the head of the corresponding region.

In this case, regardless of whether the disc 11 is a writable recording medium or a non-rewritable recording medium, the replacement destinations are determined as shown in FIG. 23F, and data write is performed.

Figures 24A, 24B, 24C, 24D, 24E, 24F:
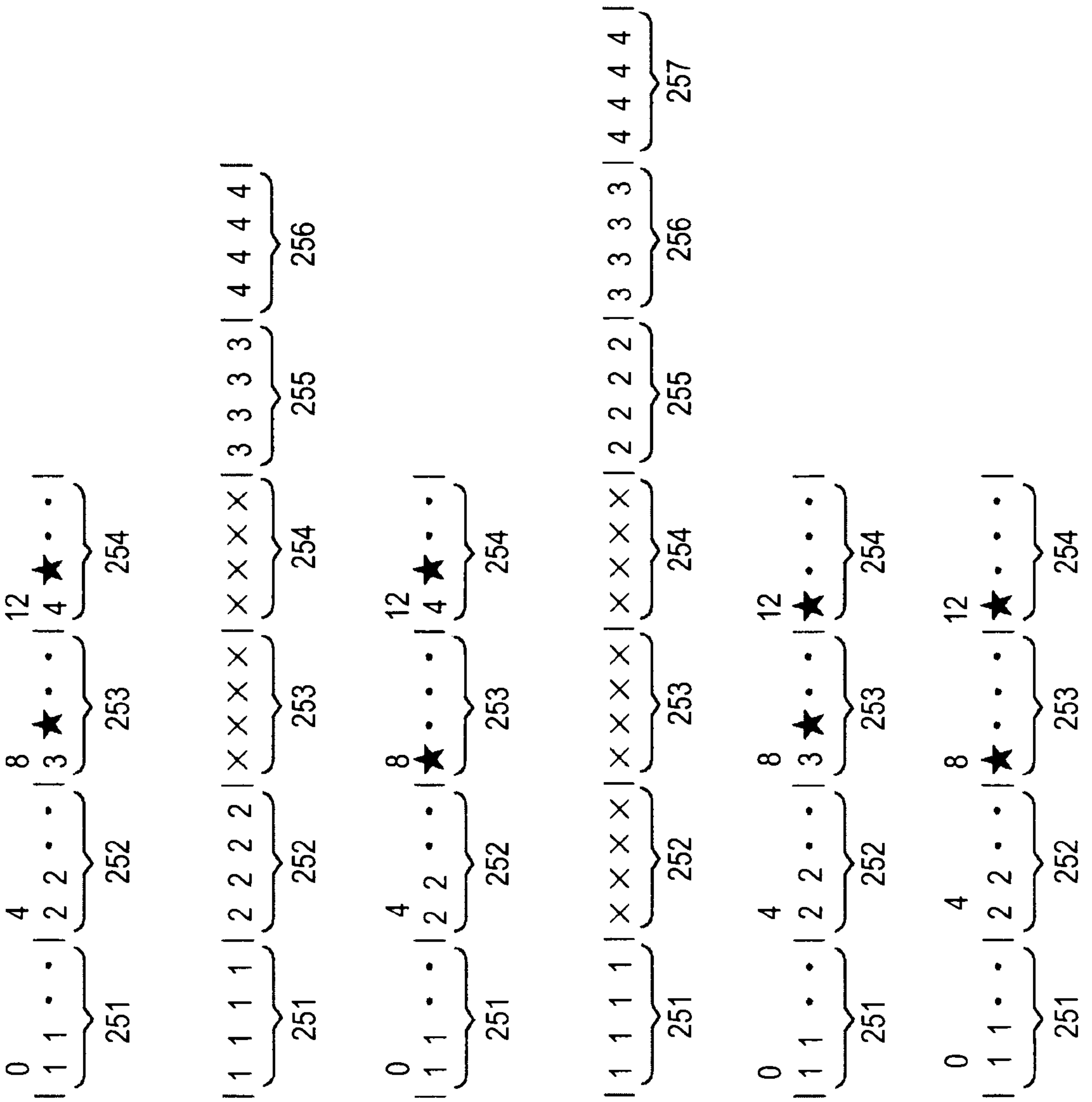
FIGS. 24A to 24F are diagrams illustrating a way to determine a replacement destination.

Next, as shown in FIG. 24A, a case will be described where defect has occurred in the region 253 where data is written by the optical pickup 202-3 and the region 254 where data is written by the optical pickup 202-4. The state shown in FIG. 24A refers to a case where defect occurs in adjacent regions, and each place where defect has occurred is a place other than the head of the corresponding region.

As shown in FIG. 24B, when the disc 11 is a rewritable recording medium, the region 253 and the region 254 where defect has occurred are set as an unused region. With regard to the region 251 and the region 252, data which has already been written is deleted, and then data is written again, or data write is continued. Data is also written in new regions 255 and 256.

That is, in this case, the replacement destination of the region 251 is set to the region 251, and the replacement destination of the region 252 is set to the region 252. The region 251 and the region 252 are set as a region where data write is continued. The replacement destination of the region 253 is set to the region 255, and the replacement destination of the region 254 is set to the region 256.

As a specific example of data to be written, the four blocks of the blocks 0 to 3 are written in the region 251 by the optical pickup 202-1, and the four blocks of the blocks 4 to 7 are written in the region 252 by the optical pickup 202-2. The four blocks of the blocks 8 to 11 are written in the region 255 by the optical pickup 202-3, and the four blocks of the blocks 12 to 15 are written in the region 256 by the optical pickup 202-4.

When the disc 11 is a rewritable recording medium, similarly, data write is performed as shown in FIG. 24B, and the replacement destinations are determined.

As described above, when defect has occurred in the two regions located astern from among the four regions where write is performed, and each place where defect has occurred is a portion other than the head of the corresponding region, regardless of whether the disc 11 is a rewritable recording medium or a non-rewritable recording medium, as shown in FIG. 24B, replacement destinations are determined such that the regions where defect has occurred are set as an unused region, regions adjacent to the regions where defect has occurred are secured as the regions of the replacement destinations, and data is written in the regions.

The situation shown in FIG. 24C refers to a case where defect has occurred in the region 253 where data is written by the optical pickup 202-3 and the region 254 where data is written by the optical pickup 202-4. Meanwhile, at least one of the places where defect has occurred is a place at the head of the corresponding region. In this case, the region where defect has occurred at the head is a region located ahead from among the two regions where defect has occurred.

As shown in FIG. 24D, where the disc 11 is a rewritable recording medium, the region 253 and the region 254 where defect has occurred are set as an unused region. Since there is a possibility that defect occurs in the region 252, the region 252 is also set as an unused region. With regard to the region 251, data which has already been written is deleted, and then data is written again, or data write is continued as it is. Data is also written in new regions 255 to 257.

That is, in this case, the replacement destination of the region 251 is set to the region 251 (set as a region where data write is continued), the replacement destination of the region 252 is set to the region 255, the replacement destination of the region 253 is set to the region 256, and the replacement destination of the region 254 is set to the region 257.

As a specific example of data to be written, the four blocks of the blocks 0 to 3 are written in the region 251 by the optical pickup 202-1, and the four blocks of the blocks 4 to 7 are written in the region 255 by the optical pickup 202-2. The four blocks of the blocks 8 to 11 are written in the region 256 by the optical pickup 202-3, and the four blocks of the blocks 12 to 15 are written in the region 257 by the optical pickup 202-4.

When the disc 11 is a rewritable recording medium, similarly, data write is performed as shown in FIG. 24D, and the replacement destinations are determined.

As described above, when defect has occurred in the two regions located astern from among the four regions where write is performed, and at least one of the places where defect has occurred is the head portion of the corresponding region, regardless of whether the disc 11 is a rewritable recording medium or a non-rewritable recording medium, as shown in FIG. 24D, replacement destinations are determined such that the regions where defect has occurred and a region before the region where defect has occurred at the head are set as an unused region, regions adjacent to the regions where defect has occurred are secured as the regions of the replacement destinations, and data is written in the regions.

The situation shown in FIG. 24E refers to a case where defect has occurred in the region 253 where data is written by the optical pickup 202-3 and the region 254 where data is written by the optical pickup 202-4. Meanwhile, at least one of the places where defect has occurred is a place at the head of the corresponding region. In this case, the region where defect has occurred at the head is a region located astern from among the two regions where defect has occurred.

In this case, regardless of whether the disc 11 is a writable recording medium or a rewritable recording medium, the replacement destinations are determined as shown in FIG. 24B, and data write is performed.

The situation shown in FIG. 24F refers to a case where defect has occurred in the region 253 where data is written by the optical pickup 202-3 and the region 254 where data is written by the optical pickup 202-4. Meanwhile, each place where defect has occurred is a place at the head of the corresponding region.

In this case, regardless of whether the disc 11 is a writable recording medium or a non-writable recording medium, the replacement destinations are determined as shown in FIG. 24D, and data write is performed.

[Determination of Replacement Destination when Defect has Occurred at Three Places]

Figures 25A, 25B, 25C, 25D, 25E, 25F:
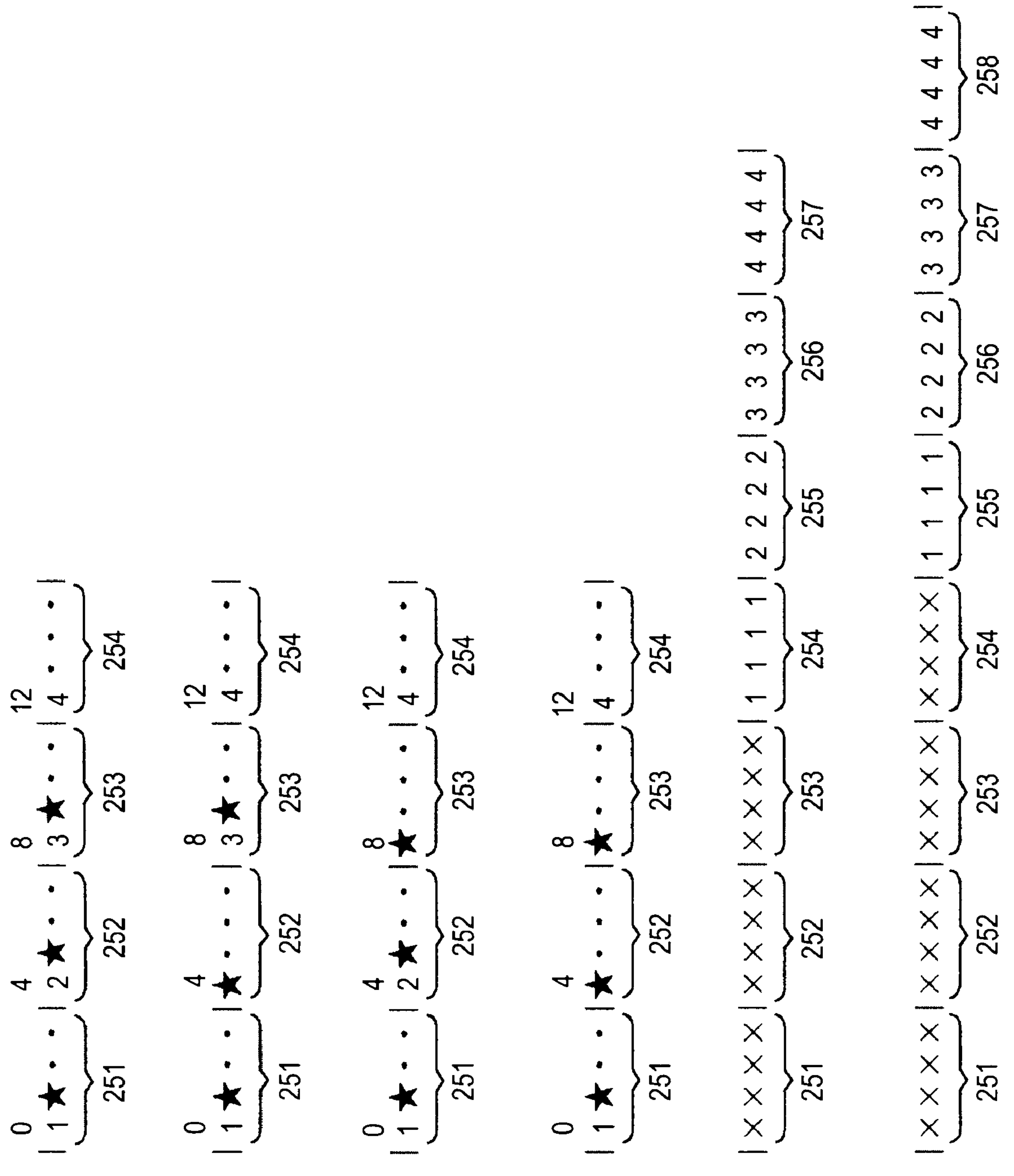
FIGS. 25A to 25F are diagrams illustrating a way to determine a replacement destination.

Next, description will be provided as to determination of replacement destinations when defect has occurred at three places. First, as shown in FIG. 25A, a case will be described where defect has occurred in the region 251 where data is written by the optical pickup 202-1, the region 252 where data is written by the optical pickup 202-2, and the region 253 where data is written by the optical pickup 202-3. The state shown in FIG. 25A refers to a case where defect occurs in adjacent regions, and each place where defect has occurred is a place other than the head of the corresponding region.

The situation shown in FIG. 25B refers to a case where defect has occurred in the region 251 where data is written by the optical pickup 202-1, the region 252 where data is written by the optical pickup 202-2, and the region 253 where data is written by the optical pickup 202-3. Meanwhile, at least one place from among the places where defect has occurred is a place at the head of the corresponding region. In this case, the region where defect has occurred at the head is a region located intermediately from among the three regions where defect has occurred.

The situation shown in FIG. 25C refers to a case where defect has occurred in the region 251 where data is written by the optical pickup 202-1, the region 252 where data is written by the optical pickup 202-2, and the region 253 where data is written by the optical pickup 202-3. Meanwhile, at least one place from among the places where defect has occurred is a place at the head of the corresponding region. In this case, the region where defect has occurred at the head is a region locates astern from among the three regions where defect has occurred.

The situation shown in FIG. 25D refers to a case where defect has occurred in the region 251 where data is written by the optical pickup 202-1, the region 252 where data is written by the optical pickup 202-2, and the region 253 where data is written by the optical pickup 202-3. Meanwhile, at least two places from among the places where defect has occurred are places at the head of the corresponding regions.

In any of the situation shown in FIG. 25A, the situation shown in FIG. 25B, the situation shown in FIG. 25C, and the situation shown in FIG. 25D, as shown in FIG. 25E, when the disc 11 is a rewritable recording medium, the regions 251 to 253 where defect has occurred are set as an unused region. With regard to the region 254, data which has already been written is deleted, and then data is written again. Data is also written in new regions 255 to 257.

That is, in this case, the replacement destination of the region 251 is set to the region 254, the replacement destination of the region 252 is set to the region 255, the replacement destination of the region 253 is set to the region 256, and the replacement destination of the region 254 is set to the region 257.

As a specific example of data to be written, the four blocks of the blocks 0 to 3 are written in the region 254 by the optical pickup 202-1, and the four blocks of the blocks 4 to 7 are written in the region 255 by the optical pickup 202-2. The four blocks of the blocks 8 to 11 are written in the region 256 by the optical pickup 202-3, and the four blocks of the blocks 12 to 15 are written in the region 257 by the optical pickup 202-4.

In any of the situation shown in FIG. 25A, the situation shown in FIG. 25B, the situation shown in FIG. 25C, and the situation shown in FIG. 25D, as shown in FIG. 25F, when the disc 11 is a non-rewritable recording medium, all regions where write has been performed, including the regions 251 to 253 where defect has occurred are set as an unused region. Data is written in new regions 255 to 258.

That is, in this case, the replacement destination of the region 251 is set to the region 255, the replacement destination of the region 252 is set to the region 256, the replacement destination of the region 253 is set to the region 257, and the replacement destination of the region 254 is set to the region 258.

As a specific example of data to be written, the four blocks of the blocks 0 to 3 are written in the region 255 by the optical pickup 202-1, and the four blocks of the blocks 4 to 7 are written in the region 256 by the optical pickup 202-2. The four blocks of the blocks 8 to 11 are written in the region 257 by the optical pickup 202-3, and the four blocks of the blocks 12 to 15 are written in the region 258 by the optical pickup 202-4.

As described, when defect has occurred in the three regions located ahead from among the four regions where write is performed, if the disc 11 is a rewritable recording medium, as shown in FIG. 25E, replacement destinations are determined such that the regions where defect has occurred are set as an unused region, regions adjacent to the regions where defect has occurred are secured as the regions of the replacement destinations, and data is written in the regions.

When the disc 11 is a non-rewritable recording medium, as shown in FIG. 25F, replacement destinations are determined such that all regions where write has been performed, including the regions where defect has occurred, are set as an unused region, regions adjacent to the regions where defect has occurred are secured as the regions of the replacement destinations, and data is written in the regions.

Figure 26A:
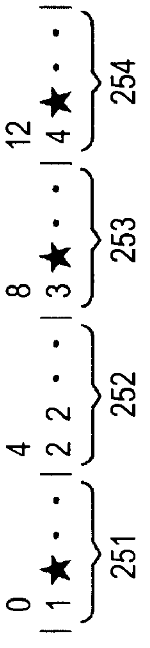
FIGS. 26A to 26F are diagrams illustrating a way to determine a replacement destination.

The situation shown in FIG. 26A refers to a case where defect has occurred in the region 251 where data is written by the optical pickup 202-1, the region 253 where data is written by the optical pickup 202-3, and the region 254 where data is written by the optical pickup 202-4. The state shown in FIG. 26A refers to a case where each place where defect has occurred is a place other than the head of the corresponding region.

Figure 26B:
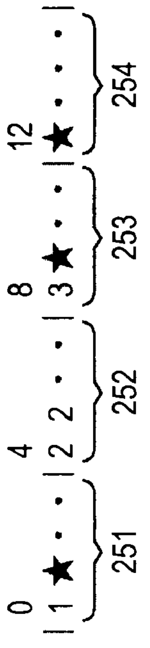

The situation shown in FIG. 26B refers to a case where defect has occurred in the region 251 where data is written by the optical pickup 202-1, the region 253 where data is written by the optical pickup 202-3, and the region 254 where data is written by the optical pickup 202-4. Meanwhile, from among the places where defect has occurred, defect in the region located astern is at the head of the corresponding region.

Figure 26C:
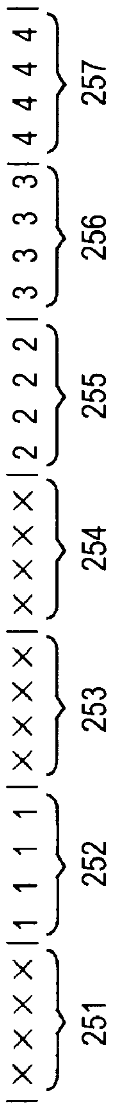

In any of the situation shown in FIG. 26A and the situation shown in FIG. 26B, as shown in FIG. 26C, when the disc 11 is a rewritable recording medium, the region 251, the region 253, and the region 254 where defect has occurred are set as an unused region. With regard to the region 252, data which has already been written is deleted, and then data is written again. Data is also written in new regions 255 to 257.

That is, in this case, the replacement destination of the region 251 is set to the region 252, the replacement destination of the region 252 is set to the region 255, the replacement destination of the region 253 is set to the region 256, and the replacement destination of the region 254 is set to the region 257.

As a specific example of data to be written, the four blocks of the blocks 0 to 3 are written in the region 252 by the optical pickup 202-1, and the four blocks of the blocks 4 to 7 are written in the region 255 by the optical pickup 202-2. The four blocks of the blocks 8 to 11 are written in the region 256 by the optical pickup 202-3, and the four blocks of the blocks 12 to 15 are written in the region 257 by the optical pickup 202-4.

Figure 26D:
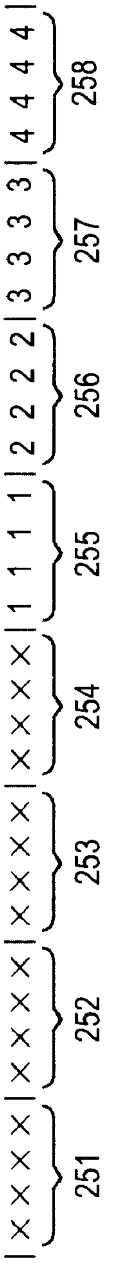

In any of the situation shown in FIG. 26A and the situation shown in FIG. 26B, as shown in FIG. 26D, when the disc 11 is a non-rewritable recording medium, all the regions 251 and 254 where write has been performed, including the regions where defect has occurred, are set as an unused region. Data is written in new regions 255 to 258.

That is, in this case, the replacement destination of the region 251 is set to the region 255, the replacement destination of the region 252 is set to the region 256, the replacement destination of the region 253 is set to the region 257, and the replacement destination of the region 254 is set to the region 258.

As a specific example of data to be written, the four blocks of the blocks 0 to 3 are written in the region 255 by the optical pickup 202-1, and the four blocks of the blocks 4 to 7 are written in the region 256 by the optical pickup 202-2. The four blocks of the blocks 8 to 11 are written in the region 257 by the optical pickup 202-3, and the four blocks of the blocks 12 to 15 are written in the region 258 by the optical pickup 202-4.

As described above, when defect has occurred in the three regions from among the four regions where write is performed, if the disc 11 is a rewritable recording medium, as shown in FIG. 26C, replacement destinations are determined such that the regions where defect has occurred are set as an unused region, regions adjacent to the regions where defect has occurred are secured as the regions of the replacement destinations, and data is written in the regions.

When the disc 11 is a non-rewritable recording medium, as shown in FIG. 26D, replacement destinations are determined such that all regions where write has been performed, including the regions where defect has occurred, are set as an unused region, regions adjacent to the regions where defect has occurred are secured as the regions of the replacement destinations, and data is written in the regions.

Figure 26E:
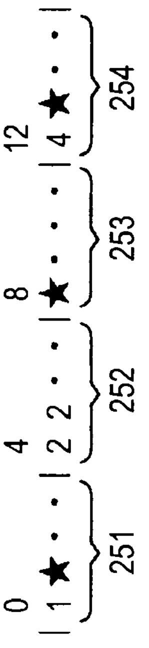

The situation shown in FIG. 26E refers to a case where defect has occurred in the region 251 where data is written by the optical pickup 202-1, the region 253 where data is written by the optical pickup 202-3, and the region 254 where data is written by the optical pickup 202-4. Meanwhile, from among the places where defect has occurred, defect in the region located intermediately from among the three regions is at the head.

In this case, regardless of whether the disc 11 is a writable recording medium or a non-writable recording medium, the replacement destinations are determined as shown in FIG. 26C, and data write is performed.

Figure 26F:
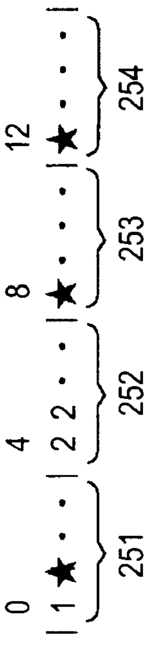

The situation shown in FIG. 26F refers to a case where defect has occurred in the region 251 where data is written by the optical pickup 202-1, the region 253 where data is written by the optical pickup 202-3, and the region 254 where data is written by the optical pickup 202-4. Meanwhile, from among the places where defect has occurred, defect in the region located astern from among the three regions where defect has occurred is at the head.

In this case, regardless of whether the disc 11 is a writable recording medium or a non-writable recording medium, the replacement destinations are determined as shown in FIG. 26D, and data write is performed.

Figures 27A, 27B, 27C, 27D, 27E, 27F, 27G, 27H, 27I:
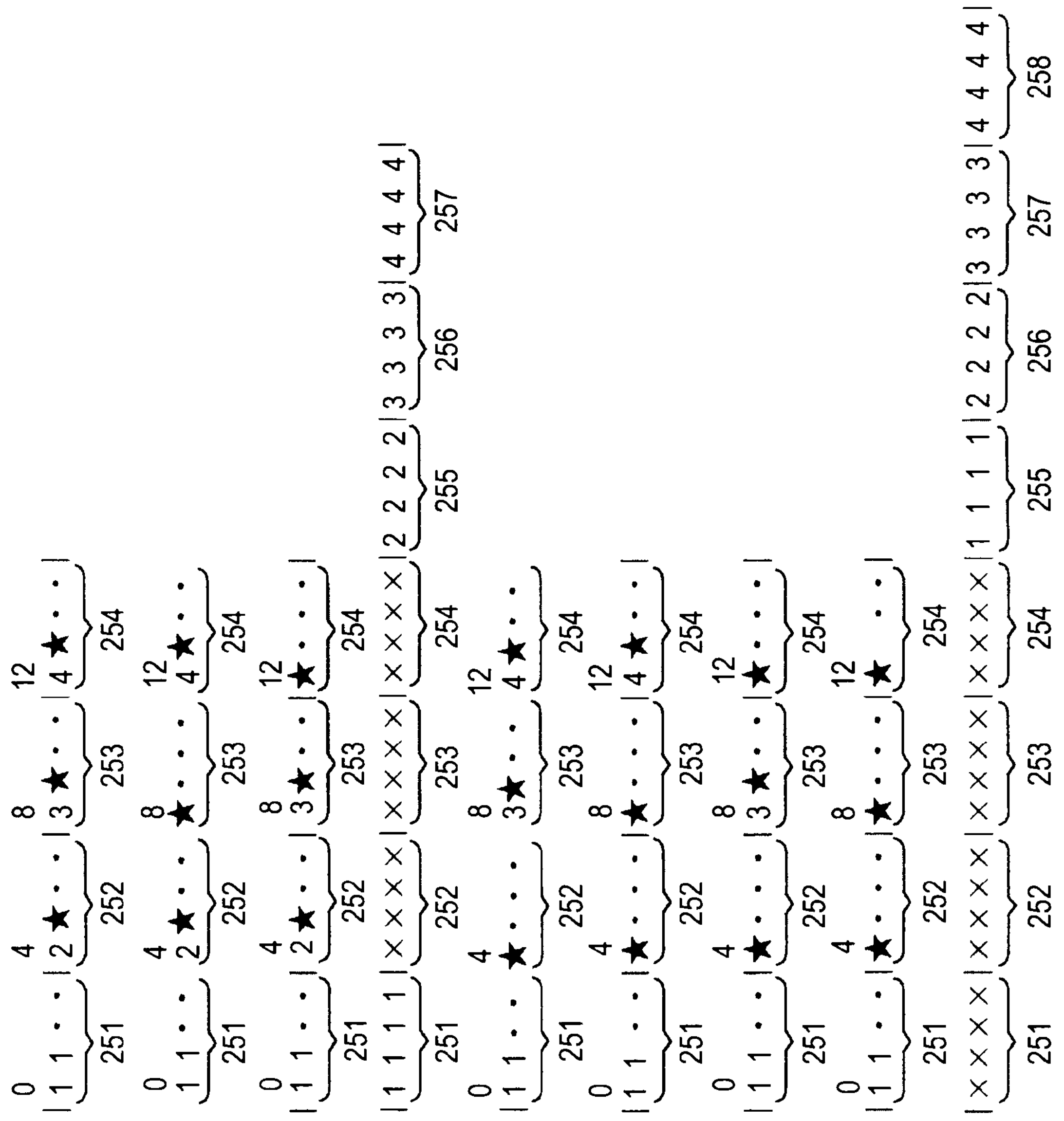
FIGS. 27A to 27I are diagrams illustrating a way to determine a replacement destination.

The situation shown in FIG. 27A refers to a case where defect has occurred in the region 252 where data is written by the optical pickup 202-2, the region 253 where data is written by the optical pickup 202-3, and the region 254 where data is written by the optical pickup 202-4. The state shown in FIG. 27A refers to a case where each place where defect has occurred is a place other than the head of the corresponding region.

The situation shown in FIG. 27B refers to a case where defect has occurred in the region 252 where data is written by the optical pickup 202-2, the region 253 where data is written by the optical pickup 202-3, and the region 254 where data is written by the optical pickup 202-4. In this case, defect in the region 253 located intermediately from among the three regions where defect has occurred occurs at the head.

The situation shown in FIG. 27C refers to a case where defect has occurred in the region 252 where data is written by the optical pickup 202-2, the region 253 where data is written by the optical pickup 202-3, and the region 254 where data is written by the optical pickup 202-4. In this case, defect in the region 253 located astern from among the three regions where defect has occurred occurs at the head.

In any of the situation shown in FIG. 27A, the situation shown in FIG. 27B, and the situation shown in FIG. 27C, as shown in FIG. 27D, regardless of whether the disc 11 is a rewritable recording medium or a non-rewritable recording medium, the regions 252 to 254 where defect has occurred are set as an unused region. With regard to the region 251, data which has already been written is deleted, and then data is written again, or data write is continued as it is. Data is also written in new regions 255 to 257.

That is, in this case, the replacement destination of the region 251 is set to the region 251 (set as a region where data write is continued), the replacement destination of the region 252 is set to the region 255, the replacement destination of the region 253 is set to the region 256, and the replacement destination of the region 254 is set to the region 257.

As a specific example of data to be written, the four blocks of the blocks 0 to 3 are written in the region 251 by the optical pickup 202-1, and the four blocks of the blocks 4 to 7 are written in the region 255 by the optical pickup 202-2. The four blocks of the blocks 8 to 11 are written in the region 256 by the optical pickup 202-3, and the four blocks of the blocks 12 to 15 are written in the region 257 by the optical pickup 202-4.

The situation shown in FIG. 27E refers to a case where defect has occurred in the region 252 where data is written by the optical pickup 202-2, the region 253 where data is written by the optical pickup 202-3, and the region 254 where data is written by the optical pickup 202-4. In this case, defect in the region 252 located ahead from among the three regions where defect has occurred occurs at the head.

The situation shown in FIG. 27F refers to a case where defect has occurred in the region 252 where data is written by the optical pickup 202-2, the region 253 where data is written by the optical pickup 202-3, and the region 254 where data is written by the optical pickup 202-4. In this case, defect in each of the region 252 and the region 253 located ahead and intermediately from among the three regions where defect has occurred occurs at the head.

The situation shown in FIG. 27G refers to a case where defect has occurred in the region 252 where data is written by the optical pickup 202-2, the region 253 where data is written by the optical pickup 202-3, and the region 254 where data is written by the optical pickup 202-4. In this case, defect in each of the regions 252 and the region 254 ahead and astern from among the three regions where defect has occurred occurs at the head.

The situation shown in FIG. 27H refers to a case where defect has occurred in the region 252 where data is written by the optical pickup 202-2, the region 253 where data is written by the optical pickup 202-3, and the region 254 where data is written by the optical pickup 202-4. In this case, defect in each of the three regions where defect has occurred occurs at the head.

In any of the situation shown in FIG. 27E, the situation shown in FIG. 27F, the situation shown in FIG. 27G, and the situation shown in FIG. 27H, as shown in FIG. 27I, regardless of whether the disc 11 is a non-rewritable recording medium or a non-rewritable recording medium, all regions where write has been performed, including the regions where defect has occurred, are set as an unused region. Data is written in new regions 255 to 258.

That is, in this case, the replacement destination of the region 251 is set to the region 255, the replacement destination of the region 252 is set to the region 256, the replacement destination of the region 253 is set to the region 257, and the replacement destination of the region 254 is set to the region 258.

As a specific example of data to be written, the four blocks of the blocks 0 to 3 are written in the region 255 by the optical pickup 202-1, and the four blocks of the blocks 4 to 7 are written in the region 256 by the optical pickup 202-2. The four blocks of the blocks 8 to 11 are written in the region 257 by the optical pickup 202-3, and the four blocks of the blocks 12 to 15 are written in the region 258 by the optical pickup 202-4.

As described above, when defect has occurred in the three regions located astern from among the four regions where write is performed, and a defect occurrence position in the region located intermediately or astern from among the three regions where defect has occurred is the head, regardless of whether the disc 11 is a rewritable recording medium or a non-rewritable recording medium, as shown in FIG. 27D, replacement destinations are determined such that the regions where defect has occurred are set as an unused region, regions adjacent to the regions where defect has occurred are secured as the regions of the replacement destination, and data is written in the regions.

When defect has occurred in the three regions located astern from among the four regions where write is performed, and a defect occurrence position in the region located ahead from among the three regions where defect has occurred is the head, regardless of whether the disc 11 is a rewritable recording medium or a non-rewritable recording medium, as shown in FIG. 27I, replacement destinations are determined such that all regions where write has been performed, including the regions where defect has occurred, are set as an unused region, regions adjacent to the regions where defect has occurred are secured as the regions of the replacement destinations, and data is written in the regions.

[Determination of Replacement destination when Defect has Occurred at Four Places]

Figure 28A:
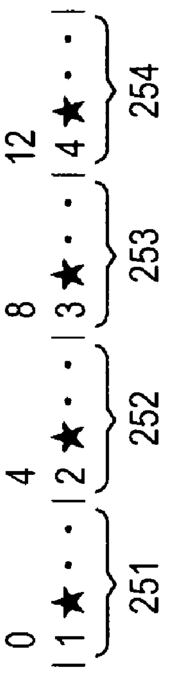
FIGS. 28A and 28B are diagrams illustrating a way to determine a replacement destination.

Next, description will be provided as to determination of replacement destinations when defect has occurred at four places. In this case, as shown in FIG. 28A, a case will be described where the region 251 where data is written by the optical pickup 202-1, the region 252 where data is written by the optical pickup 202-2, the region 253 where data is written by the optical pickup 202-3, and the region 254 where data is written by the optical pickup 202-4.

That is, in this case, defect has occurred in all regions where data write is to be performed. In such a case, regardless of whether defect has occurred at the head of each region or not, and regardless of whether the disc 11 is a rewritable recording medium or a non-rewritable recording medium, the replacement destinations are determined as shown in FIGS. 28A and 28B, and data is written.

That is, in this case, the replacement destination of the region 251 is set to the region 255, the replacement destination of the region 252 is set to the region 256, the replacement destination of the region 253 is set to the region 257, and the replacement destination of the region 254 is set to the region 258.

As a specific example of data to be written, the four blocks of the blocks 0 to 3 are written in the region 255 by the optical pickup 202-1, and the four blocks of the blocks 4 to 7 are written in the region 256 by the optical pickup 202-2. The four blocks of the blocks 8 to 11 are written in the region 257 by the optical pickup 202-3, and the four blocks of the blocks 12 to 15 are written in the region 258 by the optical pickup 202-4.

Figure 28B:
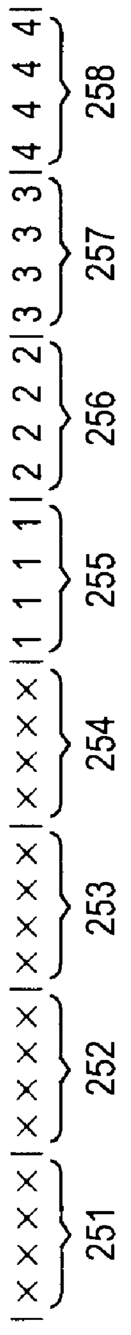

When defect has occurred in all of the four regions where write is performed, regardless of whether the disc 11 is a rewritable recording medium or a non-rewritable recording medium, as shown in FIG. 28B, replacement destinations are determined such that all regions where write has been performed, including the regions where defect has occurred, are set as an unused region, regions adjacent to the regions where defect has occurred are secured as the regions of the replacement destinations, and data is written in the regions.

As described above, when defect has occurred, the replacement destinations are determined and data write is performed such that data is read continuously in order without shifting the order of data.

As described above, the way to determine the replacement destinations differs in accordance with whether the disc 11 is a rewritable recording medium or a non-rewritable recording medium, making it possible to perform data write and to determine the replacement destinations using regions with no defect as many as possible in accordance with the recording medium. It also becomes possible to determine the replacement destinations and to perform write such that, at the time of read, data is read continuously in order with a small amount of movement of the pickups.

The way to determine the replacement destinations differs in accordance with in which of multiple regions where data write is to be performed defect has occurred, or how many regions defect has occurred, making it possible to perform data write and to determine the replacement destinations by using regions with no defect as many as possible in accordance with the position of the region where defect has occurred. It also becomes possible to determine the replacement destinations and to perform write such that, at the time of read, data is read continuously in order with a small amount of movement of the pickups.

The way to determine the replacement destinations differs between when a place in the region where defect has occurred is at the head and when a place is other than the head, making it possible to perform data write and to determine the replacement destinations using regions with no defect as many as possible in accordance with the position of the region where defect has occurred. It also becomes possible to determine the replacement destinations and to perform write such that, at the time of read, data is read continuously in order with a small amount of movement of the pickups.

Although in the above-described embodiments, a case has been described where the way to determine the replacement destinations differs in accordance with whether the disc 11 is a rewritable recording medium or a non-rewritable recording medium, the replacement destinations may be determined by the same processing, regardless of whether the disc 11 is a rewritable recording medium or a non-rewritable recording medium. For example, the determination of the replacement destinations when the disc 11 is a non-rewritable recording medium may be applied and processing may be performed.

Although in the above-described embodiments, a case has been described where the way to determined the replacement destination differs in accordance with in which of multiple regions where data write is to be performed defect has occurred, the replacement destinations may be determined by the same processing, regardless of the position of the region where defect has occurred. Similarly, although in the above-described embodiments, a case has been described where the way to determine the replacement destinations differs between when a place in the region where defect has occurred is at the head and when the a place is other than the head, the replacement destinations may be determined by the same processing, regardless of whether defect occurs at the head of the region or not.

For example, when defect has occurred, all regions where data write is to be performed at that time may be set as an unused region, the regions of the replacement destinations may be set at positions adjacent to the regions which are set as an unused region, and data write may be performed.

Although any method of determining the replacement destinations is applied, the determination of the replacement destinations of the invention is applied, making it possible to write data continuously even when defect has occurred.

[Recording Medium]

A sequence of processing may be performed by hardware or software. When a sequence of processing is performed by software, a program constituting software is installed on the computer. The computer includes a computer in which a program is incorporated in dedicated hardware, or a general-use personal computer which is capable of executing various functions as a result of installing various programs.

Figure 29:
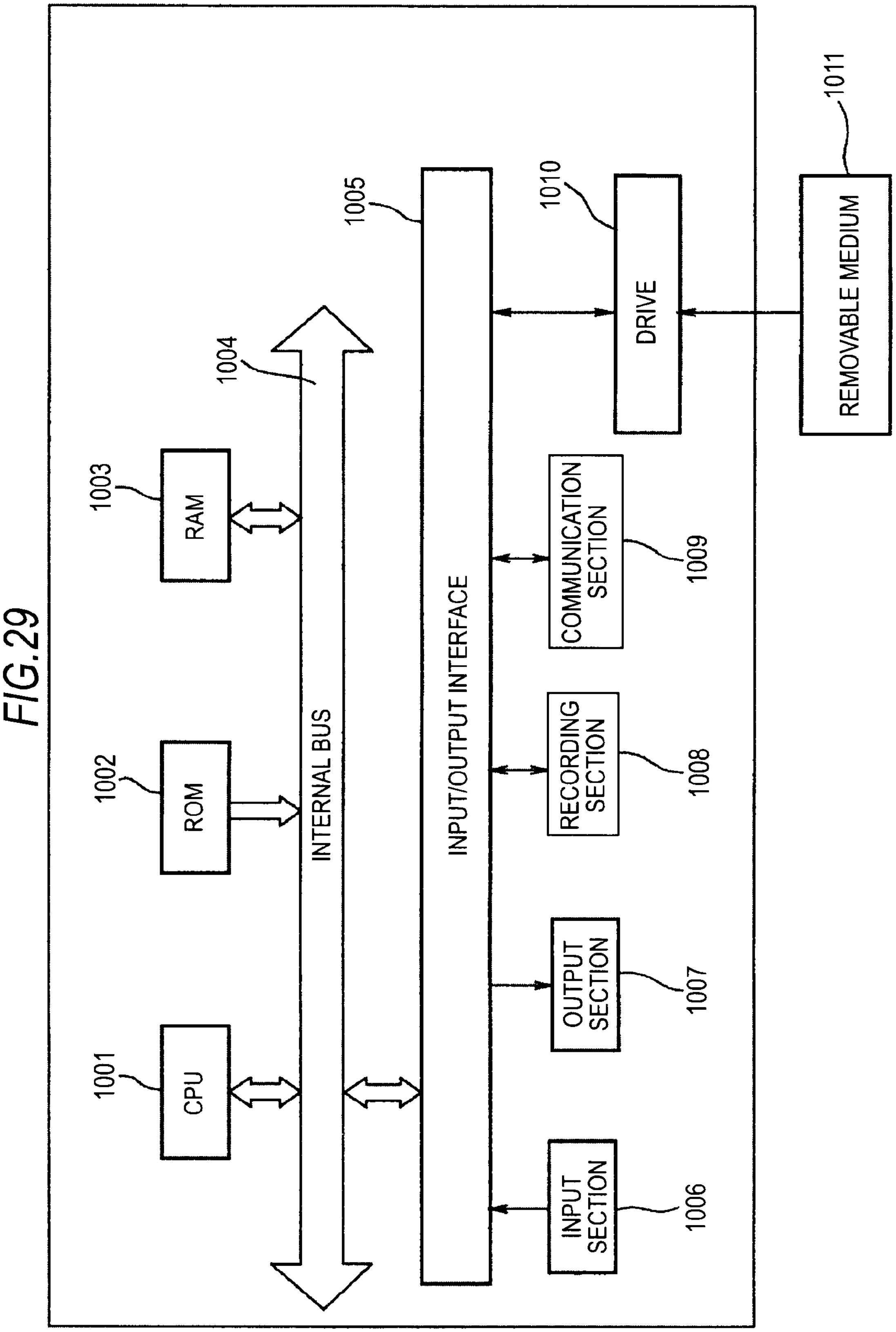
FIG. 29 is a diagram illustrating a recording medium.

FIG. 29 is a block diagram showing an example of the hardware configuration of a computer in which a sequence of processing described above is performed by a program. In the computer, a CPU (Central Processing Unit) 1001, a ROM (Read Only Memory) 1002, and a RAM (Random Access Memory) 1003 are connected to each other through a bus 1004. An input/output interface 1005 is connected to the bus 1004. An input section 1006, an output section 1007, a storage section 1008, a communication section 1009, and a drive 1010 are connected to the input/output interface.

The input section 1006 includes a keyboard, a mouse, a microphone, and the like. The output section 1007 includes a display, a speaker, and the like. The storage section 1008 includes a hard disc, a nonvolatile memory, and the like. The communication section 1009 includes a network interface and the like. The drive 1010 drives a removable medium 1011, such as a magnetic disc, an optical disc, a magneto-optical disc, or a semiconductor memory.

In the computer configured as above, for example, the CPU 1001 loads a program stored in the storage section 1008 to the RAM 1003 through the input/output interface 1005 and the bus 1004, and executes the program, such that a sequence of processing described above is performed.

The program which is executed by the computer (CPU 1001) can be recorded in a removable medium 1011, which is a package medium and provided. The program can be provided through a wired or wireless transmission medium, such as a local area network, Internet, or digital satellite broadcasting.

In the computer, when the removable medium 1011 is loaded to the drive 1010, the program may be installed in the storage section 1008 through the input/output interface 1005. Alternatively, the program may be received by the communication section 1009 through a wired or wireless transmission medium and installed in the storage section 1008. In addition, the program may be installed in advance in the ROM 1002 or the storage section 1008.

The program which is executed by the computer may be a program for performing processing in a time-series manner in accordance with the order described in the specification. Alternatively, the program may be a program for performing processing in parallel or at a necessary timing, such as when calling is performed.

In this specification, the term “system” represents the entire apparatus which includes by a plurality of devices.

The invention is not limited to the above-described embodiments, and various modifications may be made without departing from the gist of the invention.

The present application contains subject matter related to that disclosed in Japanese Priority Patent Application JP 2009-269405 filed in the Japan Patent Office on Nov. 27, 2009, the entire contents of which is hereby incorporated by reference.

What is claimed is:

1. A driving device comprising:

n pickups;

n first control means for respectively controlling the pickups; and second control means for controlling the n first control means to divide data into n sequential blocks of data and to write the divided data in sequential order on a predetermined disc through the n pickups, wherein, when a notification that a defect is detected is received from one of the n first control means while the divided data is being written in sequential order on the predetermined disc, the second control means determines a replacement destination in a sequentially following region relative to the defect and in which the data block to be written by the one of the n first control means is written such that when data regions of the predetermined disc are read in sequential order the data blocks written in the predetermined disc are read in sequential order.

2. The driving device according to claim 1, wherein the replacement destination is determined in accordance with a pickup where the defect has been detected.

3. The driving device according to claim 1 or 2, wherein the replacement destination is determined in accordance with whether the disc is a rewritable recording medium or not.

4. The driving device according to claim 1 or 2, wherein the replacement destination is determined in accordance with whether a place where the defect occurs is a place at the head of a region where the divided data is written.

5. The driving device according to claim 1 or 2, wherein the replacement destination is determined in accordance with the number of pickups where a defect has been detected.

6. A method of driving a driving device including n pickups, n first control units respectively configured to control the pickups, and a second control unit configured to control the n first control units to divide data into n sequential blocks of data and to write the divided data in sequential order on a predetermined disc through the n pickups, the method comprising the step of:

when a notification that a defect is detected is received from one of the n first control units while the divided data is being written in sequential order on the predetermined disc, causing the second control unit to determine a replacement destination in a sequentially following region relative to the defect and in which the data block to be written by the one of the n first control units is written such that when data regions of the predetermined disc are read in sequential order the data blocks written in the predetermined disc are read in sequential order.

7. A non-transitory computer-readable storage medium having a computer-readable program stored thereon that when executed by a computer causes a driving device to perform a method, the driving device including n pickups, n first control for units respectively configured to control the pickups, and a second control unit configured to control the n first control units to divide data into n sequential blocks of data and to write the divided data in sequential order on a predetermined disc through the n pickups, the method comprising the step of:

when a notification that a defect is detected is received from one of the n first control units while the divided data is being written in sequential order on the predetermined disc, causing the second control unit to determine a replacement destination in a sequentially following region relative to the defect and in which the data block to be written by the one of the n first control units is written such that when data regions of the predetermined disc are read in sequential order the data blocks written in the predetermined disc are read in sequential order.

8. A driving device comprising:

n pickups;

n first control units respectively configured to control the pickups; and a second control unit configured to control the n first control units to divide data into n sequential blocks of data and to write the divided data in sequential order on a predetermined disc through the n pickups, wherein, when a notification that a defect is detected is received from one of the n first control units while the divided data is being written in sequential order on the predetermined disc, the second control unit determines a replacement destination in a sequentially following region relative to the defect and in which the data block to be written by the one of the n first control units is written such that when data regions of the predetermined disc are read in sequential order the data blocks written in the predetermined disc are read in sequential order.

9. The driving device according to claim 1, wherein the sequential blocks of data are written in sequential non-defective and writable regions of the predetermined disc.

* * * * *